(12) United States Patent
Krysiak et al.

(10) Patent No.: US 9,724,570 B2
(45) Date of Patent: Aug. 8, 2017

(54) BALL LIGHTING

(71) Applicant: Wilson Sporting Goods Co., Chicago, IL (US)

(72) Inventors: Kevin L. Krysiak, Palatine, IL (US); Rayna L. S. Kearney, Westchester, IL (US); Robert T. Thurman, Plainfield, IL (US); Bradley L. Gaff, Woodridge, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 585 days.

(21) Appl. No.: 14/210,662

(22) Filed: Mar. 14, 2014

(65) Prior Publication Data

US 2014/0221137 A1    Aug. 7, 2014

Related U.S. Application Data

(63) Continuation-in-part of application No. 14/071,384, filed on Nov. 4, 2013.

(Continued)

(51) Int. Cl.
*A63B 43/06* (2006.01)
*A63B 43/00* (2006.01)
*A63B 41/04* (2006.01)
*A63B 41/08* (2006.01)
*G09B 19/00* (2006.01)
(Continued)

(52) U.S. Cl.
CPC ............. *A63B 43/06* (2013.01); *A63B 41/04* (2013.01); *A63B 41/085* (2013.01); *A63B 43/00* (2013.01); *A63B 43/002* (2013.01); *G09B 19/0038* (2013.01); *A63B 43/04* (2013.01); *A63B 47/00* (2013.01); *A63B 71/0622* (2013.01); *A63B 2024/0028* (2013.01); *A63B 2041/005* (2013.01); *A63B 2071/0625* (2013.01); *A63B 2071/0658* (2013.01); *A63B 2102/14* (2015.10); *A63B 2102/18* (2015.10); *A63B 2102/182* (2015.10); *A63B 2220/12* (2013.01); *A63B 2220/34* (2013.01); *A63B 2220/44* (2013.01); *A63B 2220/56* (2013.01); *A63B 2220/62* (2013.01); *A63B 2220/72* (2013.01); *A63B 2220/805* (2013.01); *A63B 2220/833* (2013.01); *A63B 2225/20* (2013.01); *A63B 2225/54* (2013.01); *A63B 2243/007* (2013.01); *A63B 2243/0025* (2013.01); *A63B 2243/0037* (2013.01); *A63B 2243/0066* (2013.01); *A63B 2243/0095* (2013.01)

(58) Field of Classification Search
None
See application file for complete search history.

(56) References Cited

U.S. PATENT DOCUMENTS 2,020,484 A    11/1935    Turner ............................ 240/6.4
2,219,236 A *  10/1940    Nakano .................... A63H 5/00
                                                               446/265

(Continued)

*Primary Examiner* — Milap Shah
*Assistant Examiner* — Robert T Clarke, Jr.
(74) *Attorney, Agent, or Firm* — Terence P. O'Brien; Todd A. Rathe

(57) ABSTRACT

An American style football including an inflatable bladder, a cover surrounding the bladder, a battery carried by the football, and a light emitter. The light emitter is carried by the football and is electrically connected to the battery. At least a portion of the cover transmits light from the light emitter.

14 Claims, 32 Drawing Sheets

Related U.S. Application Data

(60) Provisional application No. 61/724,668, filed on Nov. 9, 2012, provisional application No. 61/798,738, filed on Mar. 15, 2013, provisional application No. 61/788,304, filed on Mar. 15, 2013, provisional application No. 61/799,851, filed on Mar. 15, 2013, provisional application No. 61/800,972, filed on Mar. 15, 2013, provisional application No. 61/891,487, filed on Oct. 16, 2013.

(51) Int. Cl.
*A63B 71/06* (2006.01)
*A63B 43/04* (2006.01)
*A63B 47/00* (2006.01)
*A63B 24/00* (2006.01)
*A63B 41/00* (2006.01)
*A63B 102/14* (2015.01)
*A63B 102/18* (2015.01)

(56) References Cited

U.S. PATENT DOCUMENTS

| | | | |
|---|---|---|---|
| 2,307,362 A | 1/1943 | Dupler | 240/2 |
| 2,849,819 A | 9/1958 | Murphy et al. | 46/230 |
| 2,871,343 A | 1/1959 | Whitney | 240/10 |
| 2,903,820 A | 9/1959 | Bodell | 46/228 |
| 3,011,048 A | 11/1961 | O'Brien | 240/6.4 |
| 3,229,976 A | 1/1966 | Allen, Jr. | 273/58 |
| 3,304,651 A | 2/1967 | Deyerl | 46/228 |
| 3,351,347 A | 11/1967 | Smith et al. | 273/213 |
| 3,458,205 A | 7/1969 | Smith et al. | 273/213 |
| 3,521,886 A | 7/1970 | Bosco | 273/138 |
| 3,580,575 A | 5/1971 | Speeth | 273/58 |
| 3,610,916 A | 10/1971 | Meehan | 240/6.4 |
| 3,745,677 A | 7/1973 | Moran | 40/126 |
| 3,786,246 A | 1/1974 | Johnson et al. | 240/6.4 |
| 3,804,411 A | 4/1974 | Hendry | 273/58 |
| 3,935,669 A | 2/1976 | Potrzuski et al. | 46/228 |
| 4,002,893 A | 1/1977 | Newcomb et al. | 240/6.4 |
| 4,133,528 A | 1/1979 | Koblick | 273/65 |
| 4,479,649 A | 10/1984 | Newcomb et al. | 273/61 |
| 4,542,445 A | 9/1985 | Marletta | 362/96 |
| 4,563,160 A | 1/1986 | Lee | 446/47 |
| 4,607,850 A | 8/1986 | O'Riley | 273/424 |
| 4,701,146 A | 10/1987 | Swenson | 446/130 |
| 4,776,589 A | 10/1988 | Yang | 273/58 |
| 4,801,141 A | 1/1989 | Rumsey | 273/1 |
| 4,963,117 A | 10/1990 | Gualdoni | 446/219 |
| 4,967,596 A | 11/1990 | Rilling et al. | 73/492 |
| 4,997,403 A | 3/1991 | Akman | 446/220 |
| 5,054,778 A | 10/1991 | Maleyko | 273/58 |
| 5,066,011 A | 11/1991 | Dykstra et al. | 273/58 |
| 5,066,012 A | 11/1991 | Stark | 273/65 |
| 5,071,122 A | 12/1991 | Messina | 273/26 |
| 5,080,359 A * | 1/1992 | Thill | A63B 43/008 273/DIG. 24 |
| 5,102,131 A | 4/1992 | Remington | 273/58 |
| 5,170,664 A | 12/1992 | Hirsh et al. | 73/493 |
| 5,186,458 A | 2/1993 | Redondo | 273/65 |
| 5,228,686 A | 7/1993 | Maleyko | 273/58 |
| 5,236,383 A | 8/1993 | Connelly | 446/219 |
| 5,319,531 A | 6/1994 | Kutnyak | 362/184 |
| 5,388,825 A | 2/1995 | Myers et al. | 273/58 |
| 5,403,000 A * | 4/1995 | Woosley | A63B 43/06 273/DIG. 24 |
| 5,564,702 A | 10/1996 | Meffert | 273/153 |
| 5,609,411 A | 3/1997 | Wang | 362/234 |
| 5,635,903 A * | 6/1997 | Koike | A63H 17/34 340/384.1 |
| 5,639,076 A | 6/1997 | Cmiel et al. | 473/570 |
| 5,683,316 A | 11/1997 | Campbell | 473/570 |
| 5,725,445 A | 3/1998 | Kennedy et al. | 473/570 |
| 5,820,484 A | 10/1998 | Terry | 473/356 |
| 5,883,569 A * | 3/1999 | Kolefas | A43B 3/00 273/372 |
| 5,888,156 A | 3/1999 | Cmiel et al. | 473/570 |
| 6,073,086 A | 6/2000 | Marinelli | 702/141 |
| 6,142,894 A | 11/2000 | Lee | 473/570 |
| 6,148,271 A | 11/2000 | Marinelli | 702/141 |
| 6,151,563 A | 11/2000 | Marinelli | 702/141 |
| 6,157,898 A | 12/2000 | Marinelli | 702/141 |
| 6,224,493 B1 | 5/2001 | Lee et al. | 473/223 |
| 6,251,035 B1 | 6/2001 | Fa | 473/570 |
| 6,261,186 B1 * | 7/2001 | Henry | A63G 1/12 239/16 |
| 6,428,432 B1 | 8/2002 | Kachel | 473/570 |
| 6,482,071 B1 | 11/2002 | Wilgosz | 446/486 |
| 6,547,623 B1 | 4/2003 | Collado | 446/47 |
| 6,726,580 B2 | 4/2004 | Peterson | 473/570 |
| 6,780,130 B1 | 8/2004 | Monochello | 473/570 |
| 7,014,581 B2 | 3/2006 | Ng | 473/570 |
| 7,021,140 B2 | 4/2006 | Perkins | 73/493 |
| 7,140,248 B1 | 11/2006 | Brundage | 73/492 |
| 7,179,181 B2 | 2/2007 | Ko | 473/570 |
| 7,234,351 B2 | 6/2007 | Perkins | 73/493 |
| 7,288,037 B2 | 10/2007 | Myers | 473/613 |
| 7,727,097 B2 | 6/2010 | Siegel et al. | 473/577 |
| 7,740,551 B2 | 6/2010 | Nurnberg et al. | 473/570 |
| 7,867,115 B2 | 1/2011 | Zawitz | 473/570 |
| 7,927,253 B2 | 4/2011 | Vincent et al. | 482/9 |
| 8,036,826 B2 | 10/2011 | MacIntosh et al. | 701/213 |
| 8,070,620 B2 | 12/2011 | Rankin | 473/222 |
| 8,172,722 B2 | 5/2012 | Molyneux et al. | 482/1 |
| 8,221,290 B2 | 7/2012 | Vinvent et al. | 482/8 |
| 8,231,487 B2 | 7/2012 | Nurnberg et al. | 473/570 |
| 8,231,506 B2 | 7/2012 | Molyneux et al. | 482/1 |
| 8,353,791 B2 | 1/2013 | Holthouse et al. | 473/415 |
| 8,439,773 B2 | 5/2013 | Silagy | 473/447 |
| 8,506,430 B2 | 8/2013 | Von Der Gruen et al. | 473/570 |
| 8,512,177 B2 | 8/2013 | Krysiak et al. | 473/570 |
| 8,517,870 B2 | 8/2013 | Crowley et al. | 473/570 |
| 8,535,185 B2 | 9/2013 | Englert | |
| 8,562,487 B2 | 10/2013 | Berggren et al. | 482/1 |
| 8,617,008 B2 | 12/2013 | Marty et al. | 473/447 |
| 8,622,832 B2 | 1/2014 | Marty et al. | 463/36 |
| 8,758,172 B2 | 6/2014 | Creguer | |
| 2002/0123386 A1 | 9/2002 | Perlmutter | 473/223 |
| 2002/0137582 A1 | 9/2002 | Yu | 473/570 |
| 2003/0224885 A1 | 12/2003 | Leal et al. | 473/570 |
| 2004/0004828 A1 * | 1/2004 | Chernick | F21S 10/00 362/35 |
| 2004/0220001 A1 * | 11/2004 | Oister | A63B 49/00 473/570 |
| 2005/0288134 A1 | 12/2005 | Smith | 473/570 |
| 2007/0032944 A1 * | 2/2007 | Inagaki | G01C 21/3611 701/532 |
| 2007/0281811 A1 | 12/2007 | Wang | 473/570 |
| 2008/0088303 A1 | 4/2008 | Englert | 324/226 |
| 2008/0274844 A1 * | 11/2008 | Ward | A63B 43/00 473/570 |
| 2009/0040761 A1 | 2/2009 | Huang et al. | 362/253 |
| 2009/0062033 A1 | 3/2009 | Harada | 473/353 |
| 2009/0162197 A1 * | 6/2009 | Klemo | F04D 25/088 416/1 |
| 2009/0191990 A1 | 7/2009 | Smith | 473/570 |
| 2009/0210078 A1 | 8/2009 | Crowley | 700/91 |
| 2010/0035710 A1 * | 2/2010 | Smith | A63B 43/06 473/570 |
| 2010/0069181 A1 | 3/2010 | Lin | 473/570 |
| 2010/0130315 A1 | 5/2010 | Steidle | 473/570 |
| 2010/0184563 A1 | 7/2010 | Molyneux et al. | 482/1 |
| 2010/0304905 A1 * | 12/2010 | Karabed | A63B 43/002 473/603 |
| 2011/0118064 A1 | 5/2011 | Krysiak et al. | 473/603 |
| 2011/0118065 A1 * | 5/2011 | Krysiak | A63B 41/02 473/603 |
| 2011/0136603 A1 | 6/2011 | Lin et al. | 473/570 |
| 2011/0247158 A1 * | 10/2011 | Jungnickel | G09F 13/06 15/167.1 |
| 2011/0269517 A1 | 11/2011 | Englert et al. | 463/7 |
| 2012/0029666 A1 | 2/2012 | Crowley et al. | 700/91 |

(56) References Cited

U.S. PATENT DOCUMENTS

| | | | |
|---|---|---|---|
| 2012/0040785 A1 | 2/2012 | DeSort | 473/570 |
| 2012/0058845 A1 | 3/2012 | Crowley et al. | 473/604 |
| 2012/0071282 A1 | 3/2012 | Smith | 473/570 |
| 2012/0244969 A1 | 9/2012 | Binder | 473/570 |
| 2012/0277890 A1 | 11/2012 | Han | 700/91 |
| 2012/0278023 A1 | 11/2012 | Han | 702/87 |
| 2012/0295740 A1* | 11/2012 | Creguer | A63B 71/0622 473/422 |
| 2013/0012361 A1* | 1/2013 | Smith | A63B 21/22 482/44 |
| 2013/0023365 A1 | 1/2013 | Idoni-Matthews et al. | 473/570 |
| 2013/0068017 A1 | 3/2013 | Perkins et al. | 73/504.02 |
| 2013/0073247 A1 | 3/2013 | Perkins et al. | 702/141 |
| 2013/0073248 A1 | 3/2013 | Perkins et al. | 702/141 |
| 2013/0085006 A1 | 4/2013 | Nilwong et al. | 473/125 |
| 2013/0090750 A1 | 4/2013 | Herrman et al. | 700/92 |
| 2013/0167290 A1 | 7/2013 | Ben Ezra | 2/425 |
| 2014/0018181 A1 | 1/2014 | Blake et al. | 473/277 |
| 2014/0120960 A1 | 5/2014 | Hohteri | 455/466 |
| 2014/0125806 A1 | 5/2014 | Kemppainen et al. | 348/157 |
| 2014/0128182 A1 | 5/2014 | Hohteri | 473/570 |
| 2014/0228155 A1 | 8/2014 | Hohteri | |
| 2014/0295874 A1 | 10/2014 | Hohteri et al. | |
| 2014/0303759 A1 | 10/2014 | Hohteri | |
| 2014/0309058 A1 | 10/2014 | San Juan | |
| 2014/0342329 A1 | 11/2014 | Debenedetto et al. | |

\* cited by examiner

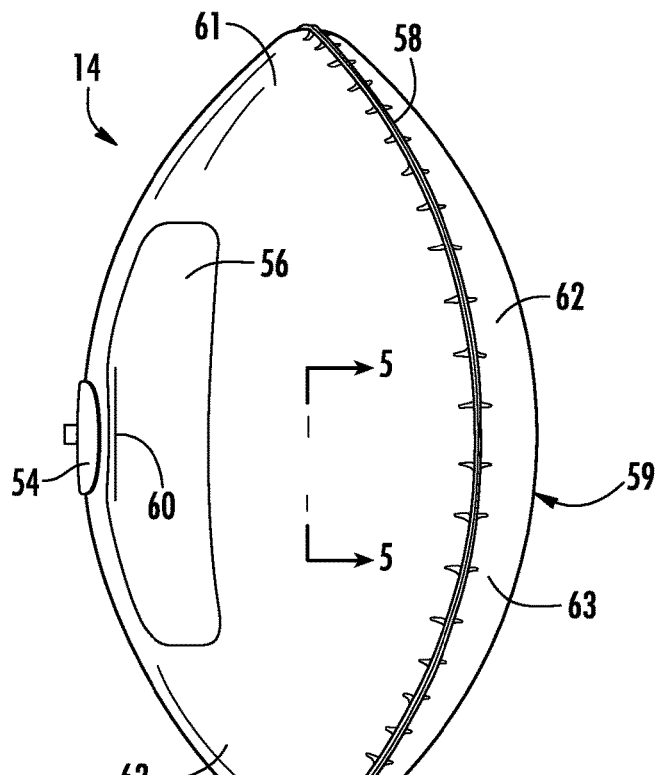
FIG. 3
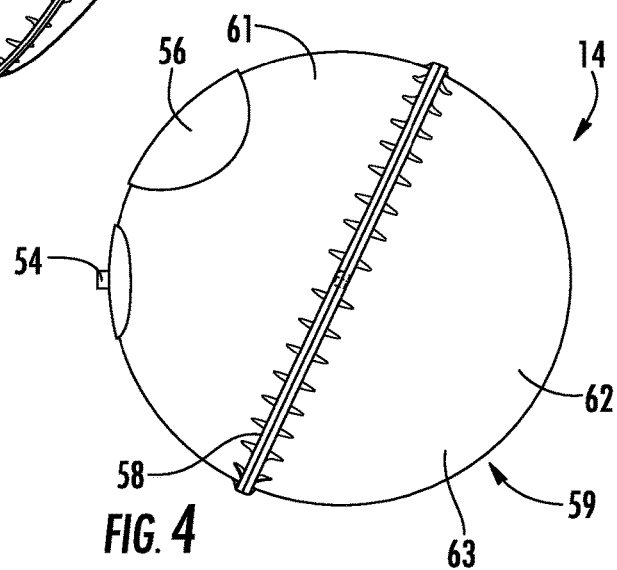
FIG. 4
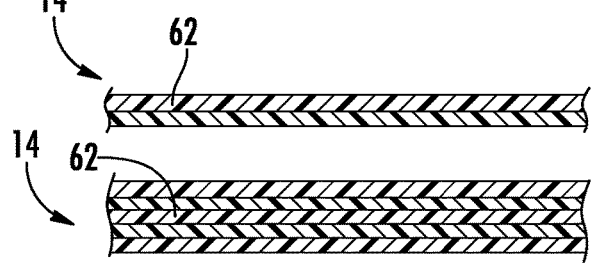
FIG. 5A
FIG. 5B

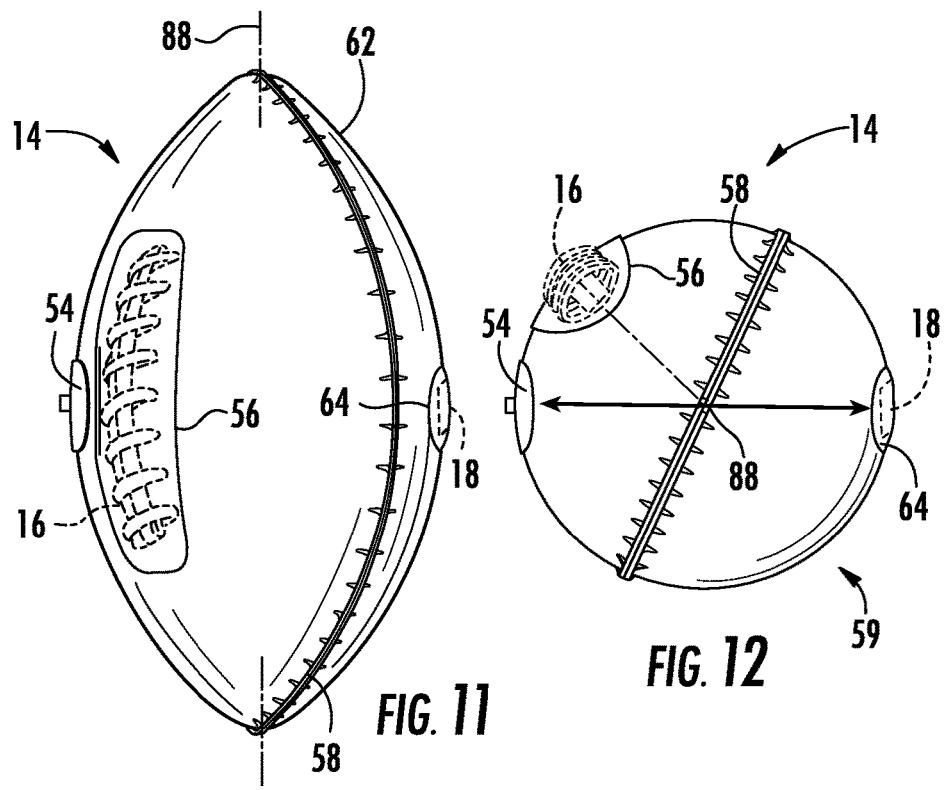
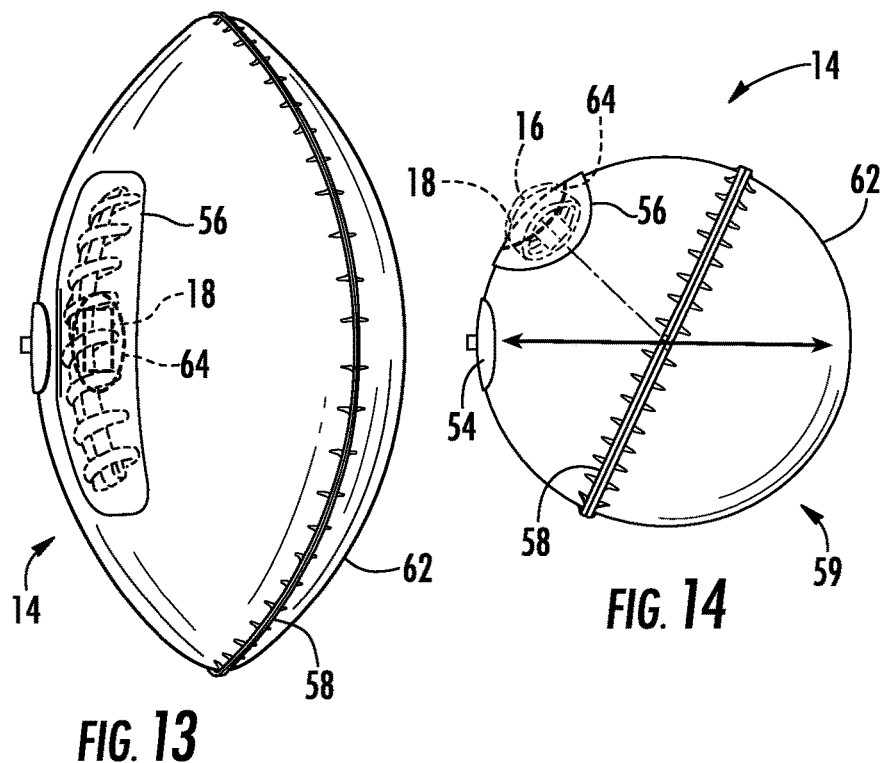

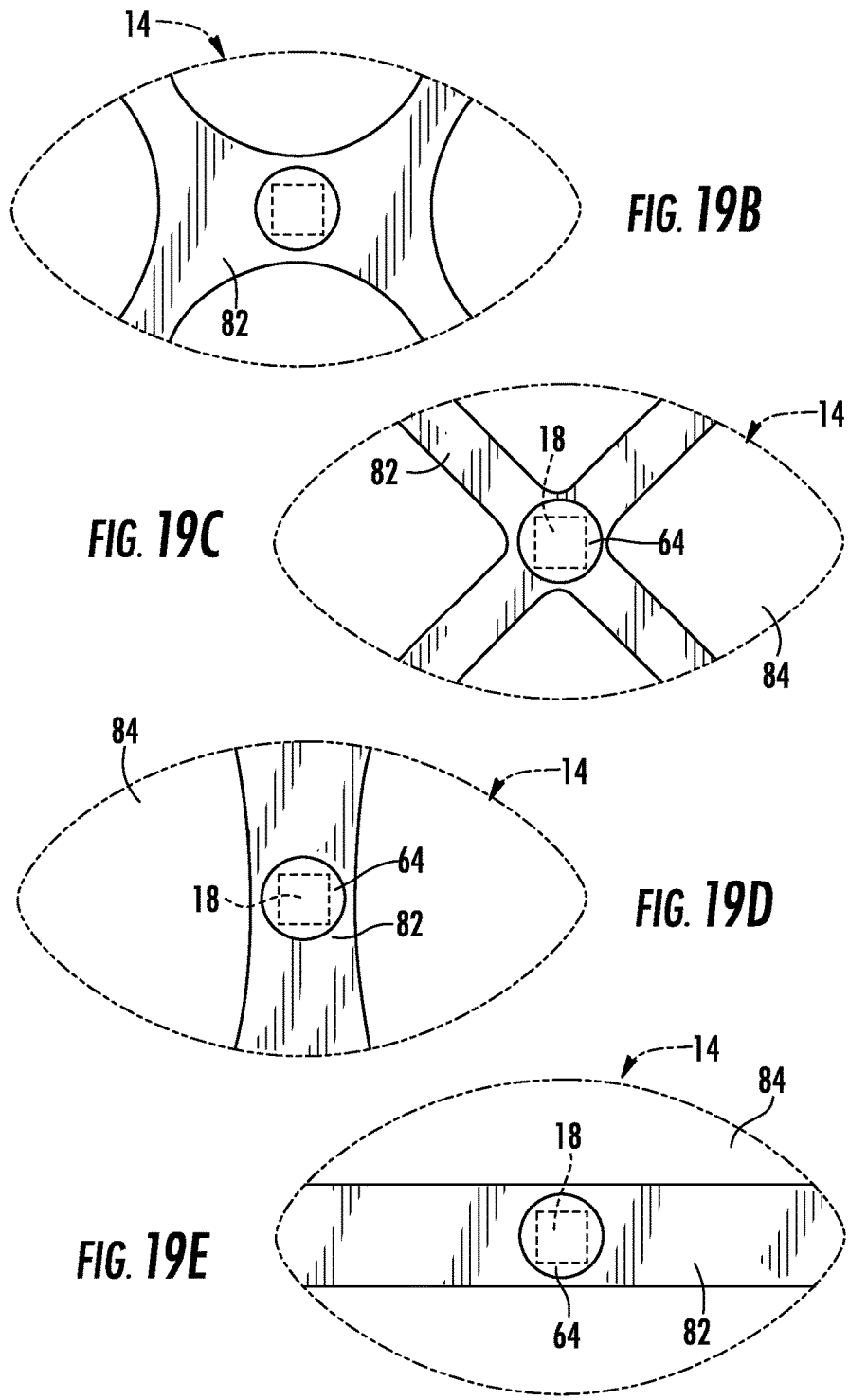

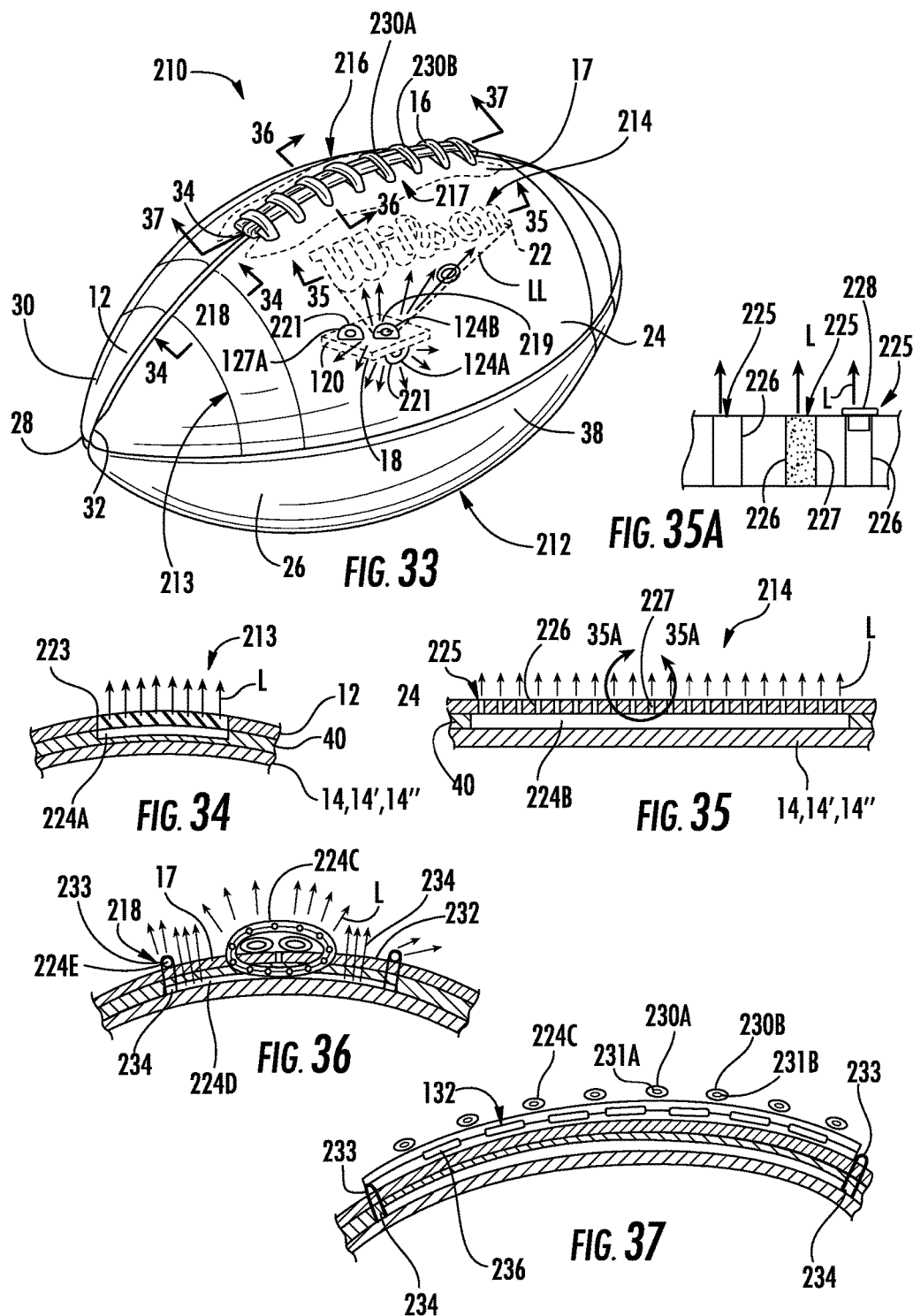

BALL LIGHTING

RELATED APPLICATION DATA

The present application is a continuation-in-part of U.S. patent application Ser. No. 14/071,384 titled SPORT PERFORMANCE SYSTEM WITH BALL SENSING, and filed on Nov. 4, 2013, which claims priority to U.S. Provisional Patent Application Ser. No. 61/724,668 filed on Nov. 9, 2012. The present application claims priority to U.S. Provisional Patent Application Ser. No. 61/800,972 titled BALL LIGHTING, and filed on Mar. 15, 2013, which is hereby incorporated by reference in its entirety. The present application also claims priority to U.S. Provisional Patent Application Ser. Nos. 61/798,738, 61/788,304 and 61/799,851, filed on Mar. 15, 2013, which are hereby incorporated by reference in their entirety. The present invention also claims priority to U.S. Provisional Patent Application Ser. No. 61/891,487 filed on Oct. 16, 2013, which is hereby incorporated by reference in their entirety. The present application is related to co-pending U.S. patent application Ser. No. 14/210,694 filed on the same day herewith, the full disclosure of which is hereby incorporated by reference.

BACKGROUND OF THE INVENTION

Inflatable sports balls such as, for example, American style footballs and basketballs, are used in numerous sports by millions of people throughout the world. Many athletes seek feedback regarding their performance with respect to use of such sports balls. When sports balls are used in low lighting conditions the ball can be hard to see, which can negatively affect performance and the ability to use the ball.

SUMMARY OF THE INVENTION

The present disclosure presents an American style football includes an inflatable bladder, a cover surrounding the bladder, a battery carried by the football, and a light emitter. The light emitter is carried by the football and is electrically connected to the battery. At least a portion of the cover transmits light from the light emitter.

According to one principal aspect of the disclosure, a sports ball includes an inflatable bladder, a battery carried by the ball, at least one light emitting element carried by the ball, a sensor carried by the ball to sense rotation of the ball, and a controller. The controller is in communication with the sensor and the light emitting element. The controller actuates the light emitter based upon sensed rotation of the ball.

BRIEF DESCRIPTION OF THE DRAWINGS

FIG. 3 is a side view of a bladder of the football of FIG. 1.

FIG. 4 is an end view of the bladder of FIG. 3.

FIG. 5A is a cross-sectional view of the bladder taken about line 5-5 of FIG. 3.

FIG. 5B is a cross-sectional view of the bladder taken about line 5-5 of FIG. 3 in accordance with an alternative preferred embodiment of the present invention.

FIG. 11 is a side view of a bladder of a football in accordance with an alternative preferred embodiment of the present invention.

FIG. 12 is an end view of the bladder of the football of FIG. 11.

FIG. 13 is a side view of a bladder of a football in accordance with an alternative preferred embodiment of the present invention.

FIG. 14 is an end view of the bladder of the football of FIG. 13.

FIGS. 19B through 19E are cross-sectional views of a bladder of a football in accordance with other alternative preferred embodiments of the present invention.

FIG. 33 is a top perspective view of another implementation of the football of FIG. 1.

FIG. 34 is a sectional view of the football of FIG. 33 taken along line 34-34.

FIG. 35 is a sectional view of the football of FIG. 33 taken along line 35-35.

FIG. 35A is an enlarged view of the football of FIG. 35 take along line 35A-35A.

FIG. 36 is a sectional view of the football of FIG. 33 taken along line 36-36.

FIG. 37 is a sectional view of the football of FIG. 33 taken along line 37-37.

DETAILED DESCRIPTION OF THE PREFERRED EMBODIMENTS

Figure 1:
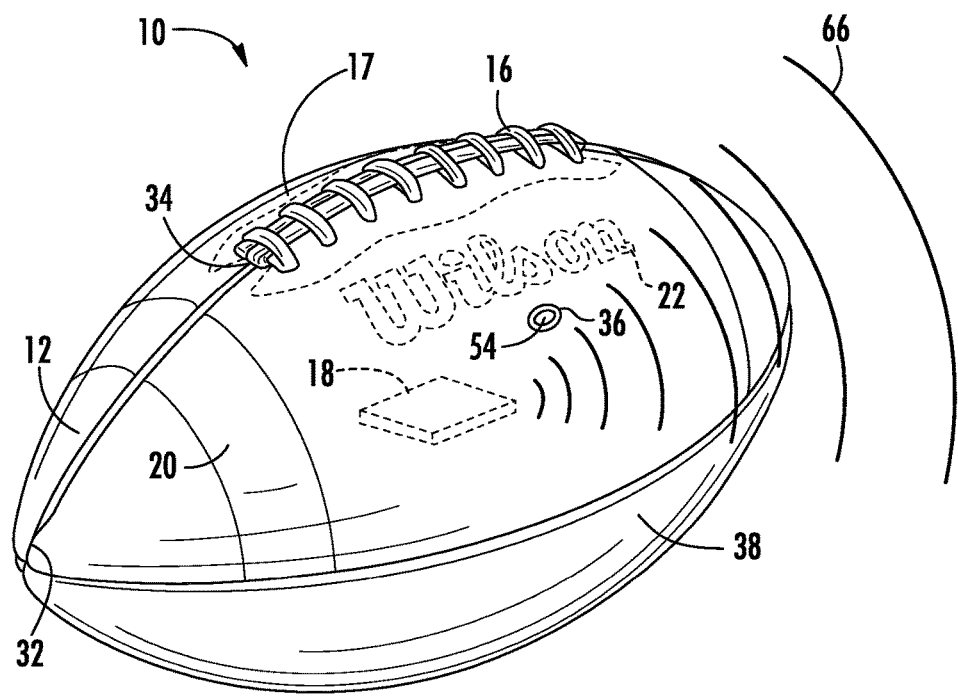
FIG. 1 is a side perspective view of an American football in accordance with a preferred embodiment of the present invention.

Referring to FIG. 1, an American football is indicated generally at 10. The football 10 is one example of an inflatable game ball. The example shown in FIG. 1 is primarily directed toward American footballs, and many features are unique to American footballs. However, other aspects and features of the illustrated example are applicable to other sports games, such as, for example, basketballs, volleyballs, soccer balls, baseballs, softballs, lacrosse balls and rugby balls.

The football 10 is a generally prolate spheroidal shaped inflatable object having a major longitudinal dimension and a minor transverse dimension. The football 10 is configured to be grasped, thrown, caught, kicked, and carried by a player during use. The football 10 includes, a cover 12, a bladder 14 (FIG. 2), a lacing 16, and an electronic chip 18. In some embodiments, the football 10 can also include a plurality of stripes 20 and one or more logos 22.

Figure 2:
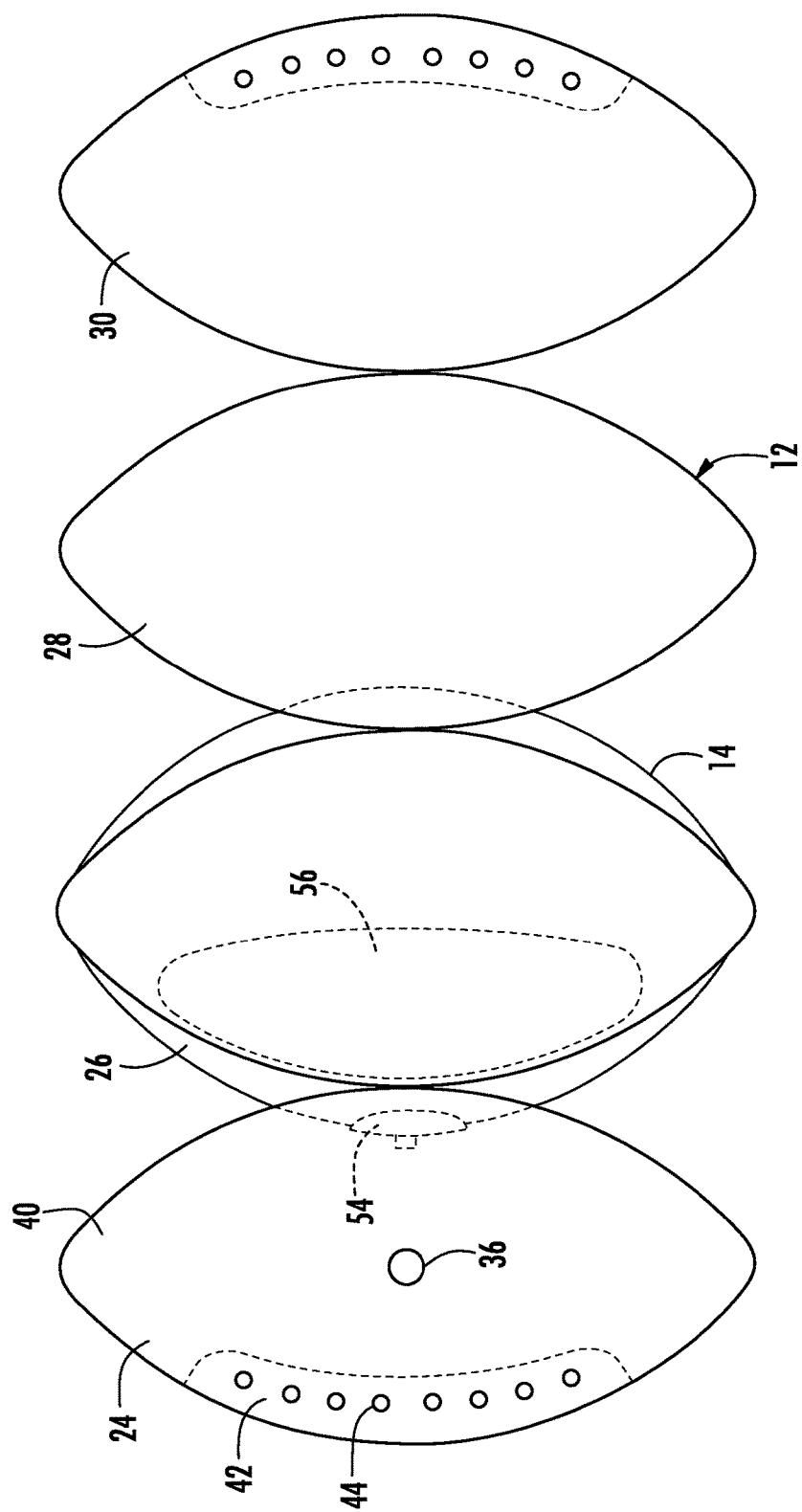
FIG. 2 is a top view of the football of FIG. 1 having four cover panels uncovered from a bladder of the football.
Figure 6:
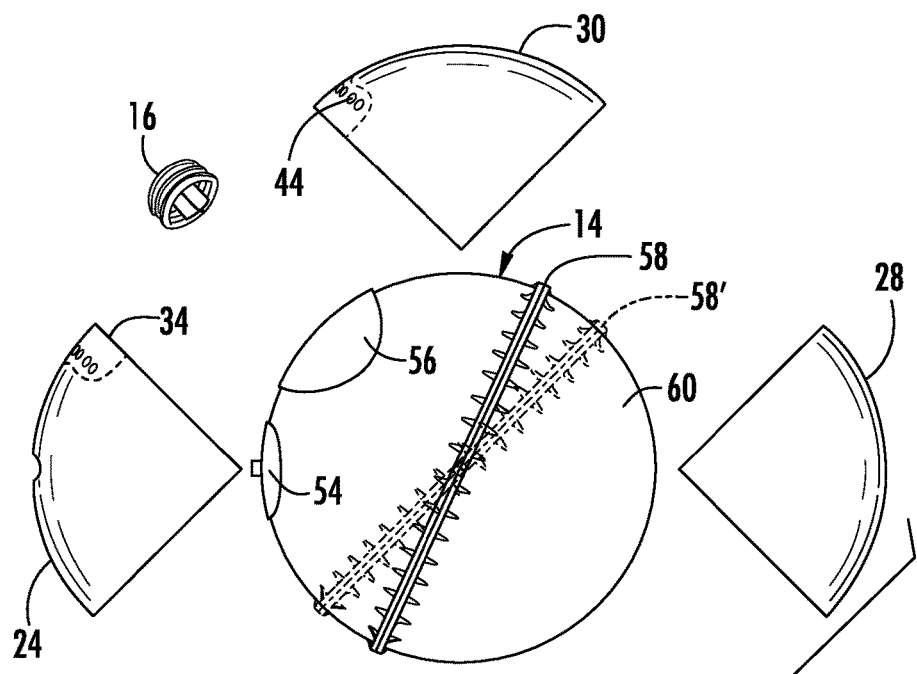
FIG. 6 is an exploded end view of the football of FIG. 1.

Referring to FIGS. 1, 2 and 6, the cover 12 is a prolate spheroidal shaped outer body preferably formed from first, second, third and fourth cover panels 24, 26, 28 and 30 that are joined to one another along generally longitudinally extending seams 32. The panels 24-30 are preferably stitched to each other. In alternative embodiments, the panels can be bonded, fused, stapled or otherwise fastened together with or without stitching. The longitudinal seam 32 connecting the first and fourth cover panels 24 and 30 includes a longitudinally extending slot 34. The slot 34 provides an opening for inserting the bladder 14 and, if applicable, other layers of material that may be applied over the bladder. The first cover panel 24 includes a valve aperture 36. The cover 12 provides the football 10 with a durable and grip-able outer surface. An outer surface of the cover 12 preferably includes a pebbled texture for enhancing the grip and improving the aesthetics of the football 10. In alternative preferred embodiments, the cover 12 can be formed of a single piece or of two, three, five or other numbers of cover panels.

Figure 7A:
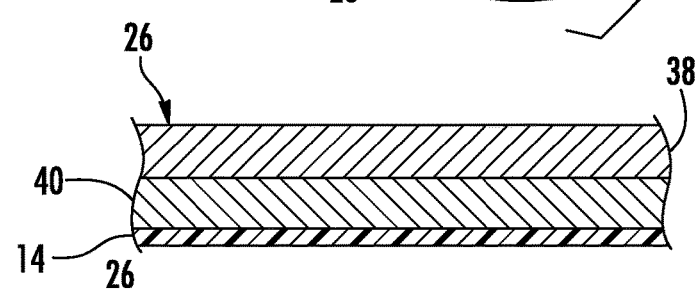
FIG. 7A is a cross-sectional view of a portion of the cover of the football taken about line 7A-7A of FIG. 6.

Referring to FIGS. 6 and 7A, one preferred embodiment of the construction of the cover panel 26 is shown. The cover panel 26 along with cover panels 24, 28 and 30 substantially enclose and protect the bladder 14. In a preferred embodiment, the cover panel 26 includes an outermost layer 38 that is formed of a durable, highly grip-able material, such as, for example, a natural leather. Alternatively, the outermost layer 38 can be formed of other materials, such as, polyurethane, a synthetic leather, rubber, pigskin, other synthetic polymeric materials and/or combinations thereof. In implementations where light emitters 124 (FIG. 1A), or other light emitters, are provided, at least portions of lining 40 are translucent or transparent to facilitate the transmission of light there through. Lining 40 is applied via an adhesive to the inner surface of the outermost layer 38. Alternatively, the lining 40 can be bonded, cured, stitched sewn, press-fit, and/or fastened to the outermost layer 38. In still other embodiments, the lining can be a separate layer unattached to the outermost layer. The lining 40 is a layer of tough, durable material that increases the strength and durability of the football 10. The lining 40 is preferably formed of one or more layers of woven fabric and one or more layers of polyvinylchloride that are cured together to form an impregnated fabric layer. Alternatively, the lining can be formed of unwoven fabric, layers of fibers, rubber, a latex, ethyl vinyl acetate (EVA), other polymeric elastomeric materials and/or combinations thereof. The lining 40 enables the football 10 to retain its desired shape and firmness. Referring to FIG. 2, the cover panels 24 and 30 preferably also include a reinforcing panel 42 at the laced region of the football 10 for providing further strength and structural integrity to the laced region of the football 10. The reinforcing panel 42 is preferably formed of the same material as the lining 40. Alternatively, other lining materials can also be used. Lace holes 44 are formed in the cover panels 24 and 30 at the reinforcing panels 42.

Figure 7B:
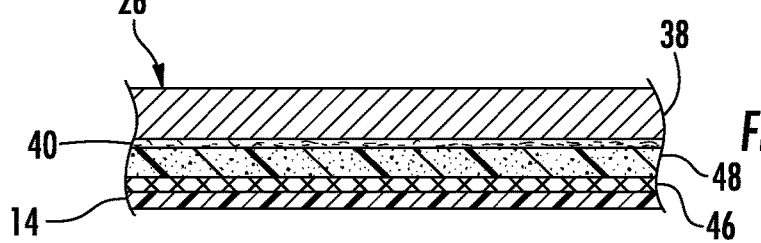
FIG. 7B is a cross-sectional view of a portion of the cover of the football taken about line 7B-7B of FIG. 6 in accordance with an alternative preferred embodiment of the present invention.
Figure 7C:
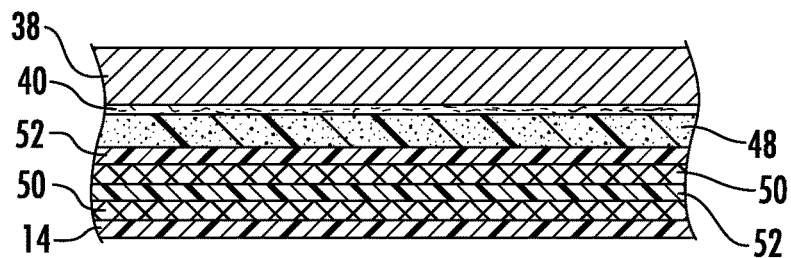
FIG. 7C is a cross-sectional view of a portion of the cover of the football taken about line 7C-7C of FIG. 6 in accordance with an alternative preferred embodiment of the present invention.
Figure 7D:
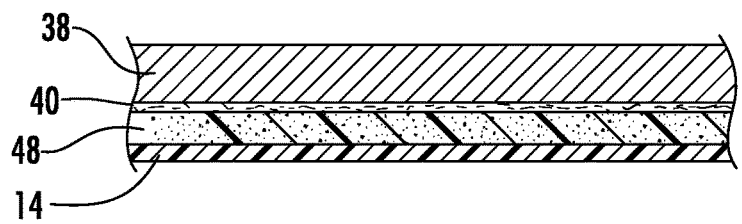
FIG. 7D is a cross-sectional view of a portion of the cover of the football taken about line 7D-7D of FIG. 6 in accordance with an alternative preferred embodiment of the present invention.

In alternative preferred embodiments, the cover 12 can have alternative constructions and one or more of layers of different materials can be formed over the bladder 14 beneath the cover 12. Referring to FIGS. 7B through 7D, alternative constructions of the cover 12 and additional layers of the football 10 are shown. In FIG. 7B, the cover 12 is a multilayered structure including a layer of windings 46 applied over the bladder 14 and a layer of padding 48 such as a sponge rubber layer formed over the layer of windings 46. Alternatively, other types or layers of padding materials can be used such as foams, sponges, and/or fibrous materials. The lining 40 can be formed of varying thicknesses or removed entirely. In FIG. 7C, fabric layers 50 are sandwiched with layers of rubber 52 to form a lining layer positioned over the bladder 14. A layer of padding 48 can be positioned over the layers 50 and 52 and beneath the outermost layer 38 and optionally a liner 40. In FIG. 7D, yet another construction is shown with a layer of padding 48 applied over the bladder 14 with lining 40 and the outermost layer 38 positioned over the layer of padding 48. Accordingly, the present invention contemplates the construction of the football 10 surrounding the bladder 14 taking the form of any combination of an outermost layer, a lining, one or more layers of padding, a winding layer, one or more fabric layers and one or more layers of elastomeric material.

Referring to FIGS. 1 and 2, the lacing 16 is used to further connect the cover panels 24 and 30 and to close the slot 34. The lacing 16 extends through the lace holes 44 of the cover panels 24 and 30. The lacing 16 also provides raised surfaces for a player to contact when passing, catching or holding onto the football 10.

Referring to FIGS. 2 through 4, the bladder 14 is an inflatable air tube preferably having a generally prolate spheroidal shape. The bladder 14 is inserted into the cover 12 through the slot 34. Alternatively, the cover 12, and other layers as applicable, can be formed over, positioned over or applied to the bladder. The bladder 14 receives and retains compressed air through a valve assembly 54 mounted to the bladder 14. The valve assembly 54 is configured to allow air to enter the bladder through use of an inflation needle (not shown) and, when removed, retain the air within the bladder 14. A portion of the valve assembly 54 is configured to extend into the valve aperture 36, which serves to orientate the bladder 14 with respect to the cover 12. In this manner, the position of the bladder 14 within the football 10 can be determined. The bladder 14 preferably includes a flap 56 positioned beneath the location of the lacing 16 for further protecting the bladder 14 from the lacing 16. The flap 56 is formed of a flexible material, preferably a vinyl. At least one edge 60 of the flap 56 is bonded to the bladder 14 through radio frequency (RF) welding. Alternatively, the flap can be formed of other materials, such as, for example, a urethane, a neoprene, a thermoplastic, a fabric, rubber, EVA, leather, a foam layer, other polymeric material, or combinations thereof. In alternative preferred embodiments, the flap can be attached to the inner surface of the cover or another intermediate layer overlying the bladder. In another preferred embodiment, the football can be formed without the flap.

Referring to FIGS. 3 through 6, the bladder 14 is preferably formed of two multilayer sheets 62 of flexible, airtight material that are bonded to each other to form a bladder seam 58 through RF welding. The bladder seam 58 formed by the two sheets 62 defines an expandable cavity within the bladder 14. Alternatively, other means for forming an airtight bond between the two sheets 62 of material can also be used, including, for example, thermally bonded, chemical bonding, adhesive bonding, stitching, press-fitting, clamping and combinations thereof. The sheets 62 can also be referred to as walls, or side walls of the bladder, such as first and second side walls 61 and 63. The bladder seam 58 preferably extends generally longitudinally about the football 10. In alternative embodiments, the bladder seam 58 can be one or more seams extending longitudinally, laterally, in a helical manner or other path about the bladder 14. In another preferred embodiments, the bladder can be seamless and formed of a single or multi-layer sheet of material. The bladder 14 is preferably formed of a polyester urethane or an ether urethane, but can also be formed of other materials including other urethanes, other polymeric materials, rubber, vinyl, EVA and combinations thereof.

Referring to FIG. 6, the location of the bladder seam 58 is also preferably positioned away, or angularly spaced, from the longitudinal seam 32 of the cover 12 with respect to a longitudinal axis 88 of the football 10 so that the seam 32 and the bladder seam 58 do not directly overlay each other. Alternatively, the bladder seam 58' can be rotated such that it is aligned with one or more of the seams 32.

Referring to FIG. 4, the sheets 62 of the bladder 14 are advantageously positioned such that the generally, longitudinally extending bladder seam 58 is positioned such that the bladder seam 58 does not interfere with a typical punt or kick-off of the football 10. The bladder seam 58 is preferably positioned such that it does not interfere with the side of the football opposite of the lacing 16. The flap 56 indicates the location of the lacing 16 over the bladder 14 on the assembled football. Therefore the side of the football 10 opposite the lacing is substantially free from the bladder seam 58. Since punters and kickers typically rotate the football 10 such that the laces are away from the location where the punter or kicker punts or kicks the football, the bladder seam 58 (and the bladder seam 58') is advantageously positioned so as not to extend over an area (kicking/punting region 59) of the football 10 that is likely to be impacted by the foot of the punter or kicker.

Referring to FIGS. 5A and 5B, each multi-layer sheet 62 of the bladder 14 is formed of two or more layers of material. In FIG. 5A, the bladder 14 is formed of two layers and in FIG. 5B the bladder is formed of five layers. In other preferred embodiments, the sheet 62 of the bladder 14 can be a single layer or other multilayer combinations.

Referring to FIG. 1, an electronic chip 18 is shown in association with the football 10. FIGS. 1 and 8 through 30 illustrate examples in which the electronic chip 18 or circuit is optimally positioned on or within the football 10 to optimize the effectiveness of the electronics and to minimize or eliminate any negative impact the electronics may have on the play, feel and/or performance of the football 10. The positioning of the electronic chip 18 can also improve the feel, play and/or performance of the football 10. The electronic chip 18 is a circuit board including one or more electronic circuits and electronic devices. The electronic chip 18 is configured to actively transmit one or more electronic signals 66 used to indicate the location, movement, speed, acceleration, deceleration, rotation, pressure and/or temperature of the football. Alternatively, the electronic chip 18 can include a passive circuit that allows for the detection of the location, movement, speed, acceleration, deceleration, rotation, pressure and/or temperature of the football to be ascertained when subjected to a magnetic field or other sensing system. The electronic chip 18 has a weight of less than 1 ounce, and more preferably, a weight of less than 0.5 ounce.

Figure 1A:
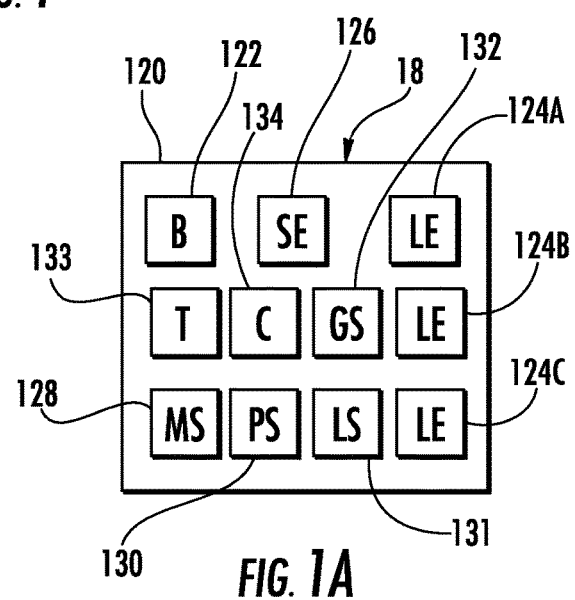
FIG. 1A is a schematic illustration of an example electronic circuit chip of the football of FIG. 1

FIG. 1A schematically illustrates electronic chip 18. As shown by FIG. 1A, in one implementation, electronic chip 18 comprises a substrate 120, battery 122, timer 123, light emitters 124A, 124B, 124C (collectively referred to as light emitters 124), sound emitter 126, motion sensor 128, temperature sensor 129, pressure sensor 130, location sensor 131, gripping sensor 132, transmitter 133, and controller 134. Substrate 120 comprises a chip, platform or panel to support one or more of battery 122, light emitters 124, sound emitter 126, light sensor 127, motion sensor 128, pressure sensor 130, transmitter 133 and controller 134. In one implementation, substrate 120 includes several distinct portions which collectively support the aforementioned components. In one implementation, one or more of such components are supported independent of substrate 120. For example, in one implementation, controller 134 may be supported by chip 18, wherein light emitters 124 are supported by different structures at different locations within or throughout football 10.

Battery 122 comprises an energy storage device with supplies electrical power to at least light emitters 124. In one implementation, battery 122 comprises one or more rechargeable electrical storage devices, such as one or more capacitors, supported by substrate 120 and in electrical connection with light emitters 124, either directly through one or more electrical wires or traces or through controller 134. In another implementation, battery 122 may comprise a battery that is not rechargeable. In one implementation, battery 122 comprises a removable disposable battery supported independent of substrate 120 and electrically connected to one or more components supported by substrate 120. In one implementation, the football or other ball can include a solar charging system operably coupled to the battery for charging the battery. In another implementation, the football or other ball can include a motion charging system operably coupled to the battery for charging the battery.

Timer 123 comprises one or more devices that track the passage of time. In one implementation, timer 123 comprises timer circuitry which electronically or digitally tracks time. Although illustrated as being supported by substrate 120, in other implementations, timer 123 may comprise a separate component provided as part of football 10, but in communication with circuit chip 18. In one implementation, timer 123 may be manually or automatically synced with other timers associated with a football game, scrimmage, practice or the like. In some implementations, timer 123 may serve as the main or sole timer for a football game, scrimmage, practice or the like. In some implementations, timer 123 functions in a manner similar to a stopwatch, being started and stopped in response to signals received through transceiver 133 or in response to sensed inputs received through grip sensor 132 or other sensors. As will be described hereafter, signals from timer 123 or times indicated by timer 123 may be used by controller 134 as a basis for adjusting lighting characteristics of light emitters 124 or output by sound emitter 126. In some implementations, timer 123 may be omitted.

Light emitters 124 comprise devices configured to emit visible light or electromagnetic radiation, wherein the emitted visible illuminates portions of football 10. In one implementation, light emitters 124 are supported by substrate 128 comprise lighting elements such as light emitting diodes. In other implementations, light emitters 124 comprise other light emitting elements using other light emitting technologies. Although football 10 is illustrated as including three distinct light emitters 124, in other implementations, football 10 may include a greater or fewer of such light emitters 124. Although illustrated as being supported on support substrate 120, in other implementations, light emitters 124 may be supported distinct from substrate 120, such as along an electrical wire, an electrical trace or an electrical string supported elsewhere by football 10.

In the example illustrated, each of light emitters 124 is configured to emit a different wavelength or different color of visible light. For example, in one implementation, light emitter 124A emits a red light, light emitter 124B emits a green light and light emitter 124C emits a blue light. In one implementation, light emitters 124 generate different colors of light. In another implementation, light emitters 124 generate a white light, wherein each of light emitted from 124 includes a different filter such that each light emitter 124 emits a different color of light as a result of the different filters. In one implementation, one of light emitters 124 includes a diffusion covering which diffuses the generated light to illuminate an expansive area football 10. In one implementation, one of light emitters 124 includes a light focusing or concentrating covering which focuses the generated light onto a distinct predefined exterior portion of football 10.

In one implementation, one or more of light emitters 124 may additionally be configured to emit light in a controlled fashion. For example, light emitters 124 may emit light in a continuous fashion when on or in intermittent or flashing fashion when on. In one implementation, the frequency of the light emitted by light emitters 124 is fixed, wherein different light emitters 124 emit light at different frequencies. In one implementation, the frequency of light emitted by light emitters 124 is adjustable and is under the control of controller 134.

In various implementations, selected portions of football 10 are formed from materials to facilitate the transmission of light generated by the one or more of light emitters 124. For example, in one implementation, light emitters 124 are supported within a central portion or interior of football 10, within bladder 14. In such an implementation, at least portions of bladder 14 are formed from one or more materials so as to be translucent or transparent to the light emitted by light emitters 124. In one implementation, the entirety of bladder 14 or substantially the entirety of bladder 14 is translucent or transparent. In another implementation, selected portions of bladder 14 are translucent or transparent.

In yet other implementations, one or more of light emitters 124 are configured to emit a display of images or text using light. For example, in one implementation, one or more of light emitters 124 comprise a liquid crystal display protected within football 10, but viewable through translucent or transparent portions of football 10. In one implementation, one or more of light emitters 124 comprise part of an array of organic light emitting diodes (OLEDs) to provide a flexible display within or near a surface of football 10. In such implementations where one or more of light emitters 1244 may display or directly present information, graphics and text may be presented on football 10. Information may be directly communicated instead of indirectly communicating information through the use of colors, intensities, and pulse frequency and duration. In yet other implementations, one or more of light emitters 124 may comprise other display technologies.

In such implementations where light emitters 124 are supported within an interior a separate cavity in football 10 defined by bladder 14, or within the bladder 14 itself, at least portions of which are translucent or transparent, portions of cover 12 are also at least partially formed from one or more materials selected such that cover 12 is also translucent or transparent. As a result, cover 12 and bladder 14 allow light emitted by light emitters 124 to pass through both bladder 14 and cover 12. In one implementation, the entirety of cover 12 is translucent or transparent.

In another implementation, selected portions of cover 12 are translucent or transparent. In one implementation, particular panels 24, 26, 28 and 30 are translucent or transparent all the panels are not translucent or transparent. In one implementation, stripes 20 are translucent or transparent. As a result, portions proximate to the tips of football 10 may be illuminated while a central portion about which football 10 is gripped remain dark. Because stripes 20 only partially extend about the ball 10, the illumination of stripes 20 visibly indicate rotation of football 10 about its axis.

In another implementation, stylized portions of cover 12 are translucent or transparent while adjacent portions a cover 12 are opaque, blocking light. As a result, when light emitters 124 are emitting light, stylized portions are emphasized and highlighted. In the example illustrated, football 10 includes a stylized portion shown as a logo 22 of alphanumeric characters. In one implementation, logo 22 is translucent or transparent while adjacent portions adjacent to logo 22 are not translucent or transparent. In other implementations, football 10 may be divided with other stylized portions which are translucent or transparent while surrounding adjacent portions are opaque. Such stylized portions may be in the form of other logos, designs, graphics, phrases and the like. In one implementation, portions a cover 12 adjacent to logo 22 may also be translucent or transparent, wherein those portions of cover 12 adjacent logo 22 have a different degree, level or light transmissive characteristic as compared to the surrounding portions. For example, logo 22 and adjacent portions a cover 12 may transmit light to different degrees or may change the color or wavelength of the light differently as compared to one another.

In one implementation, portions 17 of cover 12 about laces 16 are translucent or transparent while portions adjacent to the border region 17 differently transmit light or block light. In such an implementation, the illumination provided about laces 17 enable a person to quickly locate laces 17, especially when utilizing football 10 in a darkened environment. Such illumination further enhances the ability of a person to properly grip football 10 with respect to laces 16 in low light environments.

In each of the aforementioned implementations, light emitters 124 may alternatively be supported external to bladder 14, between bladder 14 and cover 12. In such implementations, light emitters may be supported adjacent or in near vicinity to those particular portions of cover 12 which are translucent or transparent. In some implementations, light emitters 124 are supported directly along the exterior surface of cover 12 or within an interior portion of laces 16, wherein at least portions of laces 16 are translucent or transparent. For example, in one implementation, at least one light emitter 124 may be provided as a series or string of light emitting diodes or other light emitting elements within laces 16, wherein light is outwardly transmitted through laces 16.

In some implementations, light emitters 124 may be supported at one or more different locations in or with respect to football 10. For example, in one implementation, light emitter 124A is supported within laces 16, light emitter 124B is supported within an interior of bladder 14 and light emitter 124C is supported between bladder 14 and cover 12 at a particular region of football 10. As noted above, the different light emitters may output or emit light in different fashions with respect to one another depending upon location of such light emitters. For example, in one implementation, stripes 20 may be more brightly illuminated as compared to laces 16 or region 17, providing enhanced illumination of football 10 allowing use of football 10 in lowlight conditions. Logo 22 may be illuminated with a different color as compared to laces 16, region 17 or stripes 20. In one implementation, one or more of stripes 20, region 17, laces 16 or logo 22 may be illuminated at different frequencies (continuous or intermittent). For example, laces 16 may be intermittently illuminated at a first frequency, stripes 20 may be intermittently illuminated at a second different frequency and region 17 may be continuously illuminated. By intermittently illuminating a selected portion or portions of football 10 or providing such portions with a lower level of illumination, battery power may be conserved. Moreover, by intermittently illuminating selected portions of football 10 or providing such portions with a lower level of illumination as compared to other portions, distractive impacts occurring when certain portions of football 10 are illuminated may be avoided or reduced.

Sound emitter 126 comprises a device, such as a speaker, to emit audible sounds in response to control signals from controller 134. In one implementation, sound emitter 126 emits beeps. In another implementation, sound emitter 126 emits speech or words. For example, in one implementation, sound emitter 126 may emit a beep or predefined series or pattern of beeps in response to a particular characteristic detected by either motion sensor 128 or pressure sensor 130, or in response to signals received via transceiver 133. In another implementation, sound emitter 126 may emit words, such as words of status, such as "low-pressure", "first down", "touchdown", words of encouragement such as "nice throw" or words of instruction such as "change grip", "release ball sooner" or "inflate" in response to a control signals from controller 134 based upon sensed values from motion sensor 128, pressure sensor 130, location sensor 131, or in response to signals received via transceiver 133. In some implementations, sound emitter 126 is omitted from football 10, wherein sounds are not generated or wherein separate and distinct sound emitters outside of football 10 and remote from football 10 are utilized to emit sounds in response to signals transmitted by football 10.

Light sensors 127 comprise one or more light sensors that detect ambient lighting with respect to football 10. The detected lighting is transmitted to controller 134. One implementation, light sensors 127 may be located or supported along the exterior surface of football 10. In other implementations, light sensors 127 may be embedded below external surface of football 10, wherein overlying portions are transparent or translucent. Ambient lighting conditions detected by light sensors 127 are communicated to controller 134 for controlling an on-off-state of light emitters 124 or for adjusting the brightness of light provided by light emitters 124. In some implementations, light sensors 127 may be omitted.

Motion sensor 128 comprises one or more sensors to detect motion of football 10. In one implementation, sensor 128 comprises an accelerometer. In one implementation, sensor 128 comprises a sensor to detect 6 degrees of freedom of motion. In one implementation, the 6 degrees of freedom correspond to linear movement or acceleration about x, y and z axes, and rotational movement or acceleration about the x, y and z axes. In one implementation, a 9 degrees freedom of motion sensor can be used that includes the 6 degrees of freedom of motion about the three axes of ball movement plus three axes with respect to gravity. In one implementation, motion sensor 128 may comprise a polar sensor detecting three degrees of freedom with respect to the polar axes (north and south poles). Conditions detected by sensor 128 are transmitted to controller 134. Signals from motion sensor 128 may indicate a rotation or spin a football 10, such as a spiral efficiency of football 10.

Temperature sensor 129 comprises one or more temperature sensing devices supported on substrate 120 or independently supported and electrically connected to or in communication with controller 134. Temperature sensor 129 senses a temperature of the environment in which football 10 is being employed. In one implementation, sensor 129 may be located along the exterior football 10 below outer cover panels. In another implementation, sensor 129 may be located within the interior of football 10, wherein the interior temperature of football 10 corresponds to or is proportional to the environmental temperature in which football 10 is being used. Signals from temperature sensor 129 are transmitted to controller 134, wherein controller 134 may adjust the operation of light emitters 124 or sound emitter 126 based at least in part upon the sensed temperature.

Pressure sensor 130 comprises one or more sensors to detect an internal pressure within bladder 14. One implementation, sensor 130 comprises a pneumatic sensor that detects air pressure changes within bladder 14. The sensor 130 can be used to monitor air pressure within the bladder 14 and serve to activate the electronic circuit when a pressure fluctuation is sensed. In this manner, the sensor 130 can be used as part of the control logic of the electronic chip 18 to maximize available battery life of the electronic sensor and/or circuit. The electronic chip 18 can include shutdown logic that places the electronics of the electronic chip 18 into a standby or sleep mode until the football 10 is put into play. When the football 10 is moved, passed, kicked or punted, the air pressure within the football 10 can fluctuate or change. This change in air pressure is sensed by the sensor 130, which then activates the electronic chip 18 and places it in an operating mode. In an alternative example implementation, the sensor 130 can be a piezoelectric sensor, or other motion sensor.

The air pressure sensor 130 can also be used to indicate the air pressure within the bladder 14 and therefore the pressure of the football 10 itself. The signal produced through the sensor 76 and from the electronic chip 18 can be used to confirm that the air pressure is within a desired range or at a specific desired setting. For example, Official Wilson®, NFL® Footballs have a recommended air pressure range between 11-13 psi. It is generally known that kickers and punters prefer game footballs that are inflated to a higher pressure. The NFL® takes precautions to ensure that the game footballs used for kicking or punting are inflated within the allowable pressure range or recommended operating pressure range (typically 11-13 psi). However, in some organized football leagues, the game footballs may not be tightly controlled and a team, punter or kicker may have the ability to select from a group of game balls. If the game balls have the pressure sensor 130, one could use this information to select the game football that is the most pressurized (having the highest pressure, or the highest pressure within the allowed pressure range). The electronic chip 18 can also include a temperature sensor 129 for monitoring the temperature of the football 10. In cold temperatures, footballs used for kicking or punting are often kept in warmer locations (close to 70 F) to improve the responsiveness and performance of the football when kicked or punted. An electronic chip including a temperature sensor can be used to enable a team, kicker or punter to select the best football (most desirable temperature) for kicking or punting. Additionally, an organized league could implement a temperature range for the football relative to ambient game time temperature (e.g. plus or minus 20 degrees F. of ambient temperature). In some implementations, pressure sensor 130 and/or temperature sensor 129 can be omitted.

Location sensor 131 comprises one or more sensors to detect a location of football 10. In one implementation, location sensor 131 comprises a global positioning system (GPS) sensor/receiver. In another implementation, location sensor 131 may additionally or alternatively comprise a magnetometer which sensors magnetic fields or polar magnetic fields to determine a location or position of football 10. In one implementation, the application instructs the user to stand at the approximate distance from a ferromagnetic goalpost or other ferromagnetic reference structure. The user indicates where he or she is located (yard line) or distance from the ferromagnetic reference structure. The user is then instructed to throw (or kick) the football towards the ferromagnetic reference structure. The system uses the first location as a reference point and the first throw as reference throw (alternatively, the user can also indicate where the ferromagnetic reference structure is located). But with the reference throw, the system knows when it reaches the reference structure (the magnetometer senses the polar magnetic field, but also field from the metallic reference structure). The ferromagnetic reference structure creates the equivalent of some noise or alters the polar magnetic force slightly.

Once the system knows the initial throw or kick position. It knows that the user was facing the reference structure at a known distance feet away, and that the user was directly in front of the reference structure. The location and throw are subsequently utilized as a reference. Then, with all subsequent positions for football 10, such references are used to determine subsequent locations of the football. In one implementation, subsequent passes/throws, punts, kicks and other ball travel or positioning are analyzed using 6 degree of freedom sensors (one sensor covers 3 directions of ball movement with respect to the x, y and z axes, the second sensor is referencing gravitational pull with respect to the x, y and z axes, and the distance to the ground, and the magnetometer measures the strength of the magnetic field to know where it is in relation to north) and the magnetometer. In some implementations, one or more of motion sensor 128, position sensor 130 and location sensor 131 can be omitted.

Grip sensor 132 comprises one or more sensors located in or on football 10 to detect manual gripping of football 10. For example, in one implementation, grip sensors 132 comprise pressure, contact, or other types of sensors on the surface of or within laces 16 or the stripes 20. Such sensors provide electrical signals to chip 18 and controller 134 indicating that football 10 is being manually gripped along laces 16 or how laces 16 are currently being contacted or gripped by a person's hand. In other implementations, gripping sensors 132 may be omitted.

Transceiver 133 comprises a device to transmit and receive signals with respect to a device distinct from football 10. In one implementation, transceiver 133 facilitates communication between controller 134 and a local or wide area network such as a phone network or the Internet. In one implementation, transceiver 133 additionally or alternatively facilitates communication between controller 134 and a portable electronic device, such as a cell phone, a smart phone, a flash player, a personal data assistant, a notebook, netbook or laptop computer, an electronic wrist band, a wrist-top computer, or the like. In one implementation, transceiver 133 may comprise a Bluetooth transceiver. In another implementation, transceiver 133 may comprise a radiofrequency transceiver. In some implementations, transceiver 133 may be omitted.

Controller 134 comprises one or more integrated circuits or processing units to generate control signals directing the operation of light emitters 124 and sound emitter 126 based upon information received from sensors 128, 129, 130, 131 and controller data signals received through transceiver 133. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 134 may be embodied as part of one or more application-specific integrated circuits (ASICs). Unless otherwise specifically noted, the controller is neither limited to any specific combination of hardware circuitry and software, nor to any particular source for the instructions executed by the processing unit.

In one implementation, controller 134 generates control signals that control the emission of light by light emitters 124. In one implementation, controller 134 generates control signals causing light emitter 124A to turn on and emit light in response to signals from motion sensor 128 indicating motion of football 10 satisfying a predefined criteria or threshold. For example, in one implementation, controller 134 generates control signals causing light emitter 124A (or additional light emitters 124) to begin to emit light when football 10 is rotating about its axis above a predefined minimum velocity or, in another implementation, at a certain degree of wobble (spiral efficiency). When the rotational velocity of football 10, or in another implementation, the spiral efficiency of football 10, falls below the predefined threshold, controller 134 terminates emission of light by light emitter 124A.

In one implementation, controller 134 adjusts the non-zero emission of light by light emitter 124A dependent upon signals from motion sensor 128. For example, controller 134 may generate control signals causing light emitter 124A to increase an intensity of light being emitted as the rotational velocity increases or, in another implementation, as a degree of detected wobble (spiral efficiency) increases or decreases. This light intensity adjustment may be made in a continuous ramped fashion or may be made in a stepwise fashion as predefined thresholds are satisfied.

In yet another implementation, controller 134 adjusts the frequency or duration of pulses of light emitted by light emitter 124A (and/or other light emitters 124) dependent upon the sensed motion of football 10. For example, controller 134 may generate control signals causing light emitter 124A to emit light pulses having a frequency or duration upon a predefined minimum rotational velocity, or in another implementation, a minimum spiral efficiency) being detected. In such an implementation, controller 134 may further generate control signals causing the intensity and/or duration of the light pulses to be increased as the rotational velocity or in another implementation, the spiral efficiency, of football 10 increases.

In one implementation, controller 134 generates control signals adjusting both the pulse frequency/duration and the light brightness or intensity to indicate different detected characteristics. For example, in one implementation, controller 134 may adjust or control the frequency/duration of the pulses based upon rotational velocity and the brightness or intensity of such pulses based upon spiral efficiency. In other implementations, controller 134 may adjust or control the frequency/duration of pulses based upon spiral efficiency and the brightness or intensity of such pulses based upon rotational velocity.

In yet another implementation, controller 134 generates control signals controlling a color of light being emitted by light emitters 124 based upon detected motion of football 10. For example, controller 134 may cause light emitters 124 to emit a first color of light upon a predefined threshold for rotational velocity being satisfied and may cause light emitters 124 to emit different colors of light as different rotational velocity thresholds are satisfied. Similarly, in another implementation, controller 134 may cause light emitters 124 to emit a first color of light upon a predefined threshold for spiral efficiency being satisfied and may cause light emitters 124 to emit different colors of light as different spiral efficiency thresholds are satisfied. In some implementations, each of light intensity/brightness, pulse duration/frequency and light color may be controlled and adjusted to indicate when each of different predefined motion thresholds (velocity, spiral efficiency and the like) are being satisfied.

In one implementation, controller 134 adjusts lighting characteristics of one or more portions of football 10 in response to football 10 having a first rotational velocity of at least 3 revolutions per second (RPS). In another implementation, the lighting characteristics can change in response to football 10 having a first rotational velocity of at least 5 RPS. In one implementation, controller 134 further adjust lighting characteristics of football 10 in response to football 10 having a second greater rotational velocity of at least 10 RPS. In another implementation, controller 134 adjusts lighting characteristics of one or more portions of football 10 in response to motion sensor 128 indicating that football 10 has a spiral efficiency ratio of 1.0 or less, wherein the spiral efficiency ratio is wobble (W) over spin rate (S) or W/S. In one implementation, controller 134 further adjust lighting characteristics of football 10 in response to football 10 having a second greater spiral efficiency ratio of at 0.7 or less. In another implementation, the spiral efficiency ratio can be approximately 0.6 to initiate a change in the lighting characteristics. In such implementations, controller 134 may generate control signals changing a color of light being emitted as different thresholds are satisfied. In other implementations, controller 134 may generate control signals adjusting other lighting characteristics of football 10 as such thresholds are satisfied.

In other implementations, controller 134 may additionally or alternatively generate control signals to adjust one or more lighting characteristics of one or more light emitters 124 based upon other motion characteristics of football 10. For example, controller 134 may be configured to generate control signals adjusting lighting characteristics based upon an arc or trajectory of football 10 during a pass or following a kick. Controller 134 may be configured to generate control signals adjusting lighting characteristics based upon a sensed end-over-end motion of football 10 such as during the kickoff or field goal attempt. Such adjustments may be made when one or more predefined threshold settings for such motions of football 10 have been satisfied during a pass, kick or punt.

In one implementation, controller 134 generates control signals causing light emitter 124B to differently emit light based upon signals received from pressure sensor 130. For example, in response to receiving signals from pressure sensor 130 indicating the internal pressure within bladder 14, controller 134 may generate control signals causing light emitter 124B to emit different colors of light dependent upon inflation level of bladder 14. Controller 134 may cause light emitter 124B to emit a red light when football 10 has a pressure below a predefined minimum to indicate football 10 being underinflated. Similarly, controller 134 may cause light emitter 124C to emit a green light when football 10 other pressure above the predefined minimum to indicate football 10 being appropriately inflated. In a similar fashion, controller 134 may alternatively control light intensity or pulse/duration characteristics to indicate inflation levels for bladder 14 and football 10.

In one implementation, controller 134 generates control signals causing light emitter 124B to have different lighting characteristics depending upon in what pressure range the current pressure of football 10 lies. For example, controller 134 may cause light emitter 124B to emit a first color of light when the pressure of football 10 is within a predefined pressure range that enhances kicking. Controller 134 may cause light emitter 124B to emit a second different color of light when the pressure of football 10 is within a second predefined pressure range that enhances passing performance. In one implementation, controller 134 generates control signals causing emitter 124B to emit a first light when the pressure of football 10 has a pressure most beneficial for passing between 10 and 15 psi, to emit a second light different than the first light when the pressure of football 10 is most beneficial for kicking between 12 and 20 psi, and to emit a third light different than the first light in the second light when the pressure of football 10 has a pressure adequate for both kicking and passing between 12 and 15 psi.

In one implementation, controller 134 generates control signals causing light emitter 124C to differently emit light based upon a detected positioning of football 10, based at least partially upon signals received from location sensor 131. For example, controller 134 may generate control signals adjusting an on-off state, a light brightness, a color or a pulse frequency/duration dependent upon the momentary positioning of football 10 (horizontal distance or height) or traveling velocity of football 10.

In one implementation, controller 134 may generate control signals adjusting one or more light characteristics based upon a distance traveled by football 10 such as during a punt, pass and kick competition. In one implementation, controller 134 may base the adjustment of the one or more like characteristics upon threshold established by other competitors. For example, controller 134 may receive signals through transceiver 133 indicating distances achieved by other competitors. Based upon the distance traveled by football 10 in relationship to the other prior recorded distances, controller 134 may generate control signals causing football 10 to have a certain predetermined light characteristic. In another implementation where football 10 is being used by all the competitors, controller 134 may store and record the distance phase from the other competitors and generate control signals causing football 10 to emit light with a certain light characteristic based upon how the current or just completed punt/pass/kick compares to the recorded distances or scores.

In one implementation, controller 134 generates control signals causing light emitter 124C to turn on and emit light for a predefined period of time when signals from location sensor 131 indicate that football 10 has satisfied a predetermined location threshold, such as when football 10 has crossed a first down marker, when football 10 has crossed a goal line or when football 10 has traveled through goalposts. In another implementation, controller 134 generates control signals causing the light emitted by light emitter 124C to change in brightness, color or pulse frequency/duration, for a predetermined time period, after such location thresholds have been satisfied. For example, based upon signals received from motion sensor 128 and motion of football 10, controller 134 may determine the initiation of a play or down. If during the play or down, controller 134 further receives signals from location sensor 131 indicating that football 10 has traveled across a location threshold (next first down, goal line etc.), controller 134 may generate control signals causing football 10 (or portions of football 10) to change from a darkened to an illuminated state, to change from a continuous illumination to a flashing illumination, to change from a first color to a second color or to change from a first brightness to a second brightness, or combinations thereof.

In some implementations, controller 134 may generate control signals adjusting lighting characteristics of one or more of light emitters 324 based upon an estimated or predicted success of a game or sport objective or an estimated target accuracy given one or more detected characteristics of football 10. For example, given a detected trajectory, travel velocity, end-over end movement of football 10 from motion sensor 128 and location sensor 131 as well as a sensed force being placed upon the ball 10 at detected by pressure sensor 130, controller 134 determine the likelihood that a particular field goal kick from a predetermined location and position (and possibly additionally based upon existing wind or weather conditions) is successful. In such an instance, controller 134 may generate control signals adjusting a lighting characteristic of football 10 based upon the estimated likelihood of success. For example, in one implementation, if controller 134 determine is that a field goal would've been successful from a particular distance (even though no goalposts may be present), controller 134 may generate control signals changing the color of light being emitted through football 10. Controller 134 may cause football 10 to emit different colors for when the football is determined to have been wide left, wide right or short, providing a visible indication of serving as a training motivator. Controller 134 may adjust lighting from football 10 based upon other estimated target accuracies such as target accuracy for a pass or target accuracy for a punt (landing of football within the 10 yard line or out of bounds at a particular yard marker).

In some implementations, controller 134 stores and keeps track of results, wherein controller 134 adjusts lighting characteristics of football 10 as different predetermined thresholds or milestones are met. For example, in one implementation, controller 134 tracks field goal makes versus attempts, wherein controller 134 generates different control signals causing football 10 to emit a different characteristic light (such as a different color, frequency, brightness etc.) based upon the current field-goal percentage of a person using football 10. For example, when a player achieves a field-goal percentage of at least 50% from a particular yardage, controller 134 generates control signals causing a first color light to emitted by football 10 and when the player achieves a second greater field-goal percentage from the same yardage of say, at least, 60%, controller 134 generates control signals causing a second different color light to be emitted by football 10. If a player's field-goal percentage falls below a predefined threshold, controller 134 generates control signals once again changing the color of light emitted by football 10. In such an implementation, the color, pulse frequency, brightness etc. of football 10 provides the player with a visual motivational tool. In some implementations, the visible color may further indicate to others, such as a player's coach, the current field-goal percentage, offering additional opportunities for encouragement. In addition to tracking field-goal percentages, controller 334 may be configured to track and adjust lighting characteristics based upon other statistics such as punt distances, kickoff distances, kickoff trajectories, throw distance, average throw velocity, maximum throw velocity, average spiral efficiency, maximum spiral efficiency, minimum spiral efficiency and the like.

In one implementation, transceiver 133 is configured to read or receive player identification signals, wherein controller 134 associates and stores data for multiple players in a game or practice. For example, in one implementation, each of multiple players may wear a distinct radio frequency identification (RFID) tag. In one implementation, each player may be provided with a removable RFID tag clip which is clipped onto clothing or equipment worn by the player. In another implementation, the player's helmet may include an embedded or attached RFID tag clip.

Transceiver 133 or another RFID reading device provided as part of the ball 10 is configured to read the particular player's RFID tag when the particular player is currently handling football 10. If the particular player carries, throws or catches the football, data, such as catches, yards gained, yards gained after the catch, first down gained and the like, sensed by one or more sensors of football 10 and/or determined by controller 134, is associated with a particular player and stored in a memory on chip 118. Such data may be subsequently transmitted by transceiver 133 to an external or remote portable electronic device for further statistical analysis and visual representation. As a result, football 10 allows the multiple individual players who may handle a football in a practice, scrimmage or an informal pickup game (or coaches) to later view their statistics (catches, completion percentage, yards rushing, yards passing, yards per carry, touchdowns) on their portable electronic devices, on a website to which the data is uploaded or on a computer to which the data is uploaded.

In some implementations, controller 134 may adjust lighting characteristics of football 10 based upon a comparison of detected motion or travel of football 10 (as determined using signals from motion sensor 128, pressure sensor 130 and location sensor 131) with stored or obtained ball travel results achieved by a celebrity. For purposes of this disclosure, a "celebrity" shall mean a person who has attained notoriety for his or her performance in the sport. Examples of such celebrities include college and professional football players. Although controller 134 may include a memory serving as a celebrity storage for storing user data pertaining to travel of the ball, in other implementations, controller 134 may obtain celebrity ball travel characteristics or results from a remote location using transceiver 133. For example, celebrity ball travel results or characteristics may be alternatively provided at a remote server which may be accessed across a local or wide area network.

Based upon signals received from one or more of motion sensor 328, temperature sensor 129, pressure sensor 130 and location sensor 131, controller 134 compares a person's results with that of a celebrity and adjusts lighting characteristics of football 10 accordingly. For example, in one implementation, controller 134 may compare detected parameters or characteristics of a user's throwing of the football with a celebrity's throwing of the football. For example, controller 134 may compare of a user's throw of the football with the throwing of a football by a well-known football celebrity such as Aaron Rodgers of the Green Bay Packers or Tom Brady of the New England Patriots. Based upon this comparison, controller 134 generates control signals causing one or more lighting characteristics of football 10 to be adjusted. For example, if a particular throw by user has characteristics that satisfy predefined thresholds typical of a celebrity college or professional quarterback, controller 134 may change the color of light being emitted by football 10 during the throw and/or for a predetermined period of time following the throw, providing a user with a reward or complement and encouragement. In such an implementation, controller 134 and the light being emitted by football 10 provide a user with a motivational tool by allowing the user to visually determine or see how his or her individual parameters pertaining to travel of the football compare to the same individual parameters of a celebrity having above-average skills in the sport. Similar implementations may be made with respect to other college or professional football positions (kickers, punters).

In yet other implementations, controller 134 includes one or more timers or receives signals from an external timer or timing source through transceiver 133 indicating time periods associated with the game being played. Based upon such signals, controller 134 generates control signals adjusting illumination provided by one or more of light emitters 124. For example, in one implementation, controller 134 generates control signals adjusting illumination provided by light emitter 124B based upon the time allowed to initiate a play (snap of the ball) to avoid a delay of game penalty. For example, controller 134 may change the color of light being an emitted from one or more portions of football 10 as an end of a play clock time period is approaching. In another implementation, controller 334 may adjust a frequency or duration a light pulses being emitted by football 10 as an end of a play clock time period approaches. In some implementations, controller 334 may adjust lighting characteristics in response to the end of a predefined time. Similar adjustments may be made by controller 134 based upon an approaching end of a quarter or half.

In some implementations, controller 134 may adjust an on-off state, color, pulse frequency or duration or the like of light being emitted based upon an elapsed time following the snap of the ball. In such an implementation, the light being emitted by the football 10 may indicate that the quarterback should have released (thrown) the ball given an anticipated pass rush. In such an implementation, light being emitted by football 10 may indicate to a kicker or punter that the ball should have been punted or kicked given an anticipated rush. With such an implementation, a quarterback, punter or kicker has an immediate visual indication of when the quarterback is holding onto the ball too long and risking pressure or a sack or when a kicker/punter is delaying the kick/punt for a time prolonged time so as to subject the kick or punt to being blocked. Such an implementation may be beneficial during practice or training even when no pass or kick rush is actually present.

In other implementations, the time period indicated by lighting or the lack thereof may be the time following a snap of a football that defensive players must wait before initiating a pass rush, such as rush delay counts that are sometimes used in flag or touch football. For example, after expiration of the delay count, controller 134 may cause football 10 to begin to emit light, indicating that a pass rush is legal. Alternatively, after expiration of the delay count, controller 134 may cause football 10 to have different lighting characteristics, indicating a pass rush is legal. In yet other implementations, after expiration of the delay count, controller 134 may terminate lighting, indicating a pass rush is legal. In one implementation, this time is selectable or adjustable to accommodate different pass rush delay counts.

In another such implementation, controller 134 may be configured to adjust lighting of football 10 based upon a hang time following the punting of football 10. In one implementation, controller 134 determines when a ball is actually kicked based upon signals from pressure sensor 130 (the impact of the kicker's foot upon the ball) based upon signals from motion sensor 128 and/or location sensor 131. Based upon signals indicating a lapse of time, controller 132 adjusts one or more characteristics of light being emitted by football 10. In one implementation, controller 132 adjusts the color being emitted by football 10 when the hang time of football 10 during a punt (or a kickoff) has exceeded a predefined threshold. In one implementation, controller 132 may adjust the color being emitted by football 10 multiple times as a series of incremental thresholds are satisfied for hang time. In other implementations, controller 132 adjusts an on-off state of light emitters 124 and/or adjusts a pulse frequency or duration of the light being emitted by one or more of light emitters 124 as one or more hang time thresholds are satisfied. In some implementations, controller 134 causes light emitters 324 to continue to emit the adjusted light characteristic (on-off, color, pulse frequency, pulse duration) after hang time is ended or after a play has completed to allow sufficient time for the value to be noticed and/or recorded.

In some implementations, football 10 may have dedicated portions of cover 12 which are translucent or transparent for outwardly transmitting light indicative of the current pressure level of bladder 14 of football 10. For example, logo 22 may be translucent or transparent so as to transmit light by light emitter 124B indicating a current pressure within bladder 14, wherein other transparent or translucent portions of football 10 do not emit light from light emitter 124B indicating pressure, but emit light from other light emitters 124 to provide other information. Similarly, other particular portions of the football 10 may be dedicated to present particular predefined information. For example, in one implementation, stripes 20 may transmit light from a light emitter 124A indicating rotational velocity or spiral efficiency. Region 17 may be continuously illuminated by light emitter 124C to provide lighting about laces 16 to facilitate gripping. Alternatively, region 17 may be illuminated by light emitter 124C to indicate ball location.

In one implementation, controller 134 additionally controls one or more light emitters 124 based upon signals received from grip sensor 132. In one implementation, in response to receiving signals indicating that laces 16 are being manually contacted or gripped, controller 134 actuates one or more of sensors 128, 130, 131 from a standby or sleep mode or state to an active state, effectively turning on several the functions of football 10. In such an implementation, battery power is conserved. In one implementation, in response to receiving signals indicating that laces 16 are being manually contacted or gripped, controller 134 initiates or begins countdown of a timer counting down to termination of lighting of one or more of light emitters 124. In such an implementation, after prolonged periods of nonuse or undetected gripping of laces 16, light emitters 124 are turned off to conserve power.

In yet another implementation, controller 134 utilizes signals from gripping sensor 132 to determine how football 10 is being gripped by determining what locations along laces 16 are being contacted by a person's fingers. Upon making such a determination, controller 134 generates control signals causing one or more of light emitters 124 or sound emitter 126 to notify a person of whether he or she is correctly gripping football 10. In one implementation, controller 134 generates control signals causing a light emitter to illuminate laces 16 or region 17 with a particular color (i.e. red) when laces 16 are being improperly gripped and another color (i.e. green) when laces 16 are being properly gripped. In another implementation, controller 134 generates control signals causing sound emitter 126 to emit a particular sound when laces 16 are being improperly gripped and another sound when laces 16 are being properly gripped. In some implementations, different portions of laces 16 may have dedicated light emitters, wherein controller 134 generates control signals actuating the dedicated light emitters to specifically indicate what locations along laces 16 a person is to place his or her fingers when gripping football 10. In such instances, football 10 may facilitate training and guidance for youth.

In yet other implementations, controller 134 may utilize signals received from grip sensor 132 for receiving input, commands or selections. For example, grip sensor 132 may comprise a plurality of individual pressure or contact sensors, wherein different combinations of touches (as detected by pressure or contact) correspond to different commands or selections. In one implementation, controller 134 may offer a person with a variety of selectable options or settings such as options as to predefined sets of settings based upon a person's current skill level (beginner, amateur, high school, college, professional), wherein a person may select one of the set of settings by contacting laces 16 in a predefined manner at predefined locations or in a predefined order during a setup phase. In another implementation, controller 134 may offer a person with a variety of selectable options or settings as to how information is communicated (if at all) through light emitters 124 or sound emitter 126, whether through changes in on-off states, color, duration, pulse frequency or duration, sound and the like, wherein a person may select one or more of the communication options by contacting laces 16 in a predefined matter at predefined locations or in a predefined order during a setup phase. In another implementation, controller 134 may alternatively or additionally offer a person with a variety of selectable options or settings as to what portions of football 10 are illuminated or as to what portion of football 10 is assigned to communicating particular information through illumination, wherein a person may select one or more of the football portion illumination options by contacting laces 16 in a predefined matter at predefined locations or in a predefined order during a setup phase. For example, by contacting laces 16 in a first particular manner during a setup phase, a person may establish a first setting wherein stripes 20 communicate spiral efficiency and logo 22 communicates inflation pressure through illumination and by contacting laces 16 in a second different particular manner during a setup phase, a person may establish a second setting wherein stripes 20 communicate football location while logo 22 communicates spiral efficiency through illumination. In such implementations, once selections or commands are made, controller 134 may generate control signals causing light emitters 124 or sound emitter 126 to confirm the selection using illumination or sound.

Transceiver 133 comprises a device to transmit and receive communication signals. In one implementation, transceiver 133 is configured to facilitate communication between controller 134 and an external electronic device. In one implementation, transceiver 133 is configured to facilitate communication between controller 134 and a portable electronic device, such as a smart phone, cellular phone, personal data assistant, notebook, tablet computer, laptop computer, an electronic wristband, a wrist-top computer, a wristwatch, flash memory player (IPOD) and the like using radiofrequency (RF) waves, radio waves, Bluetooth, Wi-Fi, ZigBee radio communication signals, near field communication and the like. In one implementation, controller 134 utilizes transceiver 133 to communicate with a portable electronic device so as to allow a person to receive data or information regarding football 10 and to further potentially store such information for later review or analysis. For example, controller 134 may utilize transceiver 133 to communicate information pertaining to motion of football 10 such as velocity or spiral efficiency, inflated pressure of bladder 14 of football 10, the location of football 10 such as at when football 10 may have crossed a first down marker or a goal line, or detected gripping of football 10, allowing correlation between motion of football 10 (such as spiral efficiency) to how a person gripped football 10 on a particular throw. Any of the information, signals or data discussed above in relation to light or audible signals can be stored or otherwise transmitted or communicated in chip, controller or a portable electronic device in lieu or in combination with the emitting of light or sound.

In one implementation, controller 134 further utilizes transceiver 133 to additionally receive commands or settings. For example, in one implementation, controller 134 may offer a person with a variety of selectable options or settings such as options as to predefined sets of settings based upon a person's current skill level (beginner, amateur, high school, college, professional), wherein a person may select one of the set of settings using a portable electronic device which is in communication with controller 134 using transceiver 133. In another implementation, controller 134 may offer a person with a variety of selectable options or settings as to how information is communicated (if at all) through light emitters 124 or sound emitter 126, whether through changes in on-off states, color, duration, pulse frequency or duration, sound and the like, wherein a person may select one or more of the communication options by communicating with controller 134 using transceiver 133 and a portable electronic device or another communication device. In another implementation, controller 134 may alternatively or additionally offer a person with a variety of selectable options are settings as to what portions of football 10 are illuminated or as to what portion of football 10 is assigned to communicating particular information through illumination, wherein a person may select one or more of the football portion illumination options by communicating to controller 134 using transceiver 133. For example, a person may establish a first setting wherein stripes 20 communicate spiral efficiency and logo 22 communicates inflation pressure through illumination and by contacting laces 16 in a second different particular manner during a setup phase, a person may establish a second setting wherein stripes 20 communicate football location while logo 22 communicates spiral efficiency through illumination. In such implementations, once selections or commands are made, controller 134 may generate control signals causing light emitters 124 or sound emitter 126 to confirm the selection using illumination or sound.

In other implementations, in lieu of communicating with external or remote electronic devices in a wireless fashion, transceiver 133 may alternatively facilitate communication using contact or induction. For example, transceiver 133 and alternatively to indicate using an RFID tag or through an electrical jack or plug. In one implementation, an electrical contact may be situated along or about inflation port 54 (or a separate independent port), allowing a jack or plug-in to be inserted into port 54 and into contact with the electrical contacts to facilitate "wired" communication with controller 34. In other implementations, transceiver 133 may be omitted.

FIGS. 8 through 23 illustrate the electronic chip 18 retained within a pocket 64 within or on the bladder 14. In other implementations, alternative means for securing the electronic chip to or within the bladder can also be employed. In alternative implementations, the electronic chip 18 can be bonded, fused, clipped, retained, fastened through hook and loop fasteners, buckles or other fasteners to the bladder.

Figure 9:
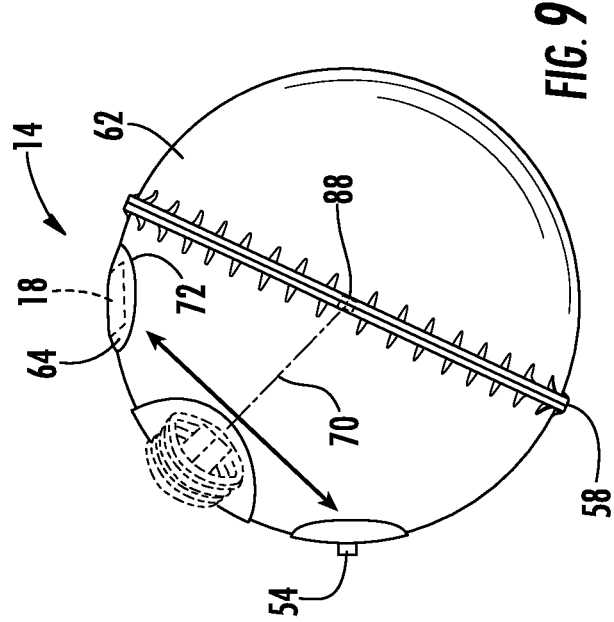
FIG. 9 is an end view of the bladder of the football of FIG. 8.
Figure 8:
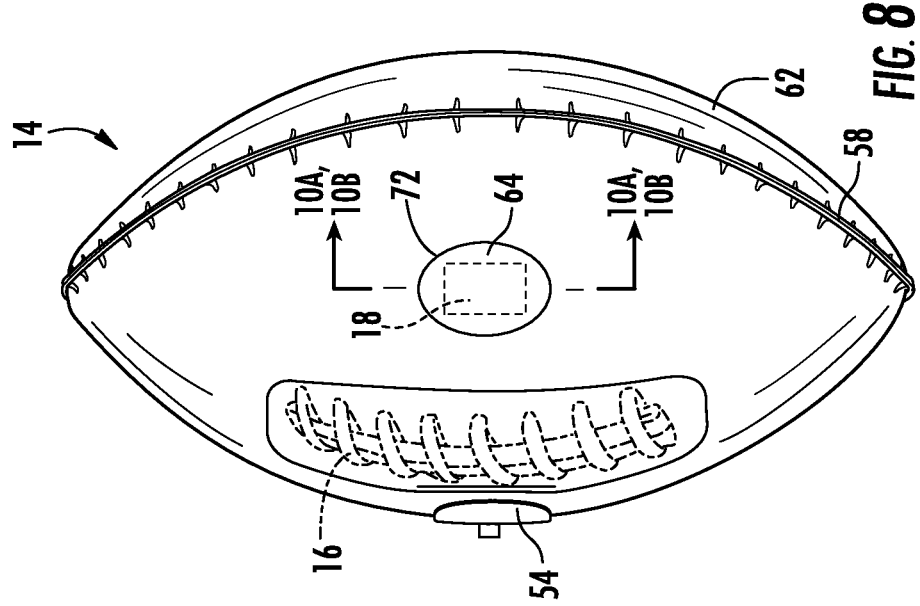
FIG. 8 is a side view of a bladder of a football in accordance with a preferred embodiment of the present invention.

Referring to FIGS. 8 and 9, one example implementation is illustrated. The lacing 16 is shown in silhouette over the flap 56 to indicate the position of the lacing 16 on the football 10. The electronic chip 18 is positioned in the pocket 64 formed by the multi-layer sheet 62 of the bladder 14 or applied to the bladder 14. The pocket 64 is preferably formed at a location that is symmetrical with the valve assembly 54. In particular, the pocket 64 and the valve assembly 54 are symmetrically positioned or substantially equidistant from a longitudinally extending first plane 70. The first plane 70 extends through the longitudinal center of the lacing 16 and the longitudinal axis 88 such that the pocket 64 and the electronic chip 18 are balanced about, or symmetrical about, the plane 70 with respect to the valve assembly 54. In one particularly preferred embodiment, the weight of the electronic chip 18 can be configured to be substantially the same as the weight of the valve assembly 54. The position of the electronic chip 18 is also advantageously positioned away from the kicking or punting side of the football 10 (kicking/punting region 59). Therefore, the electronic chip 18 is less likely to receive or be affected by the blunt impact of a kick or punt during play. Further, by positioning the electronic chip 18 on or within the bladder 14, the electronic chip 18 is protected by the cover panel 30 from the outside environment, including moisture, rain, snow and mud. Additionally, through placement of the electronic chip 18 in the pocket 64 on the sheet 62 of the bladder 15, the electronic chip 18 can be maintained in a relatively fixed position or location with respect to the cover 12 of the ball. Given the air pressure of the bladder 14, the durability and strength of the cover 12 and the location of the electronic chip 18 on the bladder 14, the electronic chip 18 can be maintained in a generally predetermined position during play, with minimal movement apart from the cover 12 or the lacing 16 of the football 10.

Figure 10A:
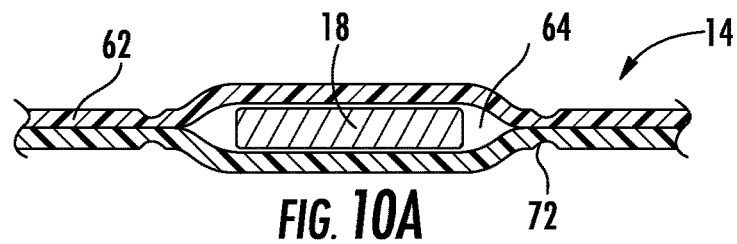
FIG. 10A is a cross-sectional view of a portion of the bladder taken about line 10A-10A of FIG. 8.

Referring to FIG. 10A, the electronic chip 18 is shown positioned between two layers of the multi-layer sheet 62 forming the bladder 14. The multi-layered sheet 62 is heat sealed, preferably through RF welding, around the perimeter of the electronic chip 18 to create a pocket seal 72 forming the pocket 64. The pocket 64 retains the electronic chip 18 in a fixed position or within a confined area. The sheet 62 can be formed to exactly follow the contour of the electronic chip such that little or no space exists in the pocket 64 around the chip 18 and thereby retaining the electronic chip 18 in a substantially fixed position. Alternatively, the electronic chip 18 can be bonded, attached or fastened directly to the bladder 14 with or without a pocket surrounding the electronic chip 18. In implementations where chip 18 includes one or more light emitters 124, at least portions of sheet 62 are translucent or transparent, allowing light to emitted through sheet 62. In some implementations, sheet 62 may additionally or alternatively comprise openings, such as perforations, through which light emitted from one or more light emitters 124 may pass.

Figure 10B:
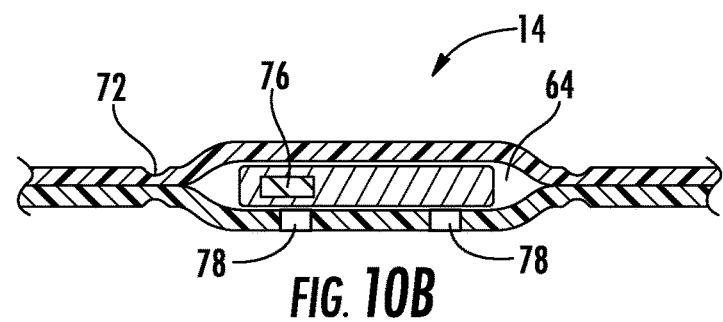
FIG. 10B is a cross-sectional view of a portion of the bladder taken about line 10B-10B of FIG. 8 and in accordance with an alternative preferred embodiment of the present invention.

Referring to FIG. 10B, an alternative preferred embodiment of the pocket 64 of the bladder 14 is shown. The electronic chip 18 can include a pneumatic sensor or a pressure sensor 76 for sensing air pressure changes within the bladder 14. The sensor 76 can be used to monitor air pressure within the bladder 14 and serve to activate the electronic circuit when a pressure fluctuation is sensed. In this manner, the sensor 76 can be used as part of the control logic of the electronic chip 18 to maximize available battery life of the electronic sensor and/or circuit. The electronic chip 18 can include shutdown logic that places the electronics of the electronic chip 18 into a standby or sleep mode until the football 10 is put into play. When the football 10 is moved, passed, kicked or punted, the air pressure within the football 10 can fluctuate or change. This change in air pressure is sensed by the sensor 76, which then activates the electronic chip 18 and places it in an operating mode. In order to allow for the electronic chip 18 and the sensor 76 to sense changes of air pressure within the bladder 14, one or more pocket openings 78 are formed in the inner layer or layers of the multilayered sheet 62 of the bladder 14. The pocket openings 78 enable the sensor 76 to sense air pressure fluctuations within the bladder 14 while enabling the bladder 14 to maintain its structural integrity and retain air within the bladder 14. In an alternative preferred embodiment, the sensor 76 can be a piezoelectric sensor or other form of motion sensor that enables the circuitry of the electronic chip 18 to activate when the football 10 is placed in motion, and enter a standby or sleep mode when the football 10 is at rest for a predetermined amount of time. The predetermined amount of time is preferably set at a value within the range of 5 minutes to 120 minutes.

The air pressure sensor 76 can also be used to indicate the air pressure within the bladder 14 and therefore the pressure of the football 10 itself. The signal produced through the sensor 76 and from the electronic chip 18 can be used to confirm that the air pressure is within a desired range or at a specific desired setting.

Figure 10C:
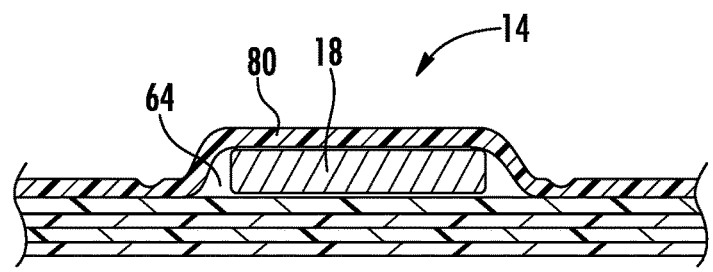
FIG. 10C is a cross-sectional view of a portion of the bladder in accordance with another alternative preferred embodiment of the present invention.

Referring to FIG. 10C, the pocket 64 can be formed by adding an additional sheet 80 of material to the inner or outer surface of the bladder 14. The sheet 80 can be thermally sealed to the bladder 14, preferably through RF welding, to retain the electronic chip 18 on the inner or outer surface of the bladder 14. Alternatively, the additional sheet 80 can be attached to the bladder 14 through other fastening means. In implementations where chip 18 comprises one or more light emitters 124, sheet 80 has at least portions which are translucent or transparent and/or includes opening through which light may be transmitted.

Referring to FIGS. 11 and 12, an alternative implementation is illustrated. The position of the lacing 16 relative to the bladder 14 is shown in silhouette. The electronic chip 18 and the pocket 64 can be positioned at a location on or within the multi-layered sheet 62 of the bladder 14 that is opposite of the valve assembly 54 with respect to the longitudinal axis 88. In this configuration, a second plane that also intersects the longitudinal axis 88 can also intersect at least a portion of the valve assembly 54 and at least a portion of the electronic chip 18. In this location, the electronic chip 18 is balanced by the valve assembly 54. The electronic chip 18 can be configured to have a weight that is substantially the same as the valve assembly 54 thereby improving the balance of the football 10 about the longitudinal axis 88. The distance of the valve assembly 54 and the electronic chip 18 can be substantially equidistant from the axis 88. The location is also away from primary kicking and punting location (kicking/punting region 59) on the football 10 opposite the lacing 16.

Referring to FIGS. 13 and 14, an alternative implementation is illustrated. The position of the lacing 16 relative to the bladder 14 is shown in silhouette. The electronic chip 18 and the pocket 64 can be positioned at a location on or within the multi-layered sheet 62 of the bladder 14 that is underneath the lacing 16 and the flap 56. In this location, the electronic chip 18 is protected from impacts during play by the lacing 16, the cover 12 (FIG. 1), and the flap 56. Further, the location of the electronic chip 18 is directly opposite the kicking/punting region 59 on the football 10. The location on the bladder 14 beneath the lacing 16 on the football 10 is very advantageous because the electronic chip 18 is protected from a vast majority of the foreseeable impacts that occur to the football during play. Further, the location of the electronic chip 18 at the sheet 62 of the bladder 14 adjacent the cover and the lacing keeps electronic chip 18 in a generally fixed position during use. In implementations where light emitters 124 are located within laces 16 or beneath/about laces 16, the proximity of the electronic chip 18 facilitates electrical connection of chip 18 two such light emitters 124. In one preferred embodiment, the electronic chip 18 is used to provide a small amount of additional weight near the laced region of the football 10 that can enhance the player's ability to impart rotation or spin to the football 10 as it is thrown or passed. In other preferred embodiments, weight is removed from the lacing or the cover to compensate for the small amount of additional weight added from the electronic chip 18.

Figure 15:
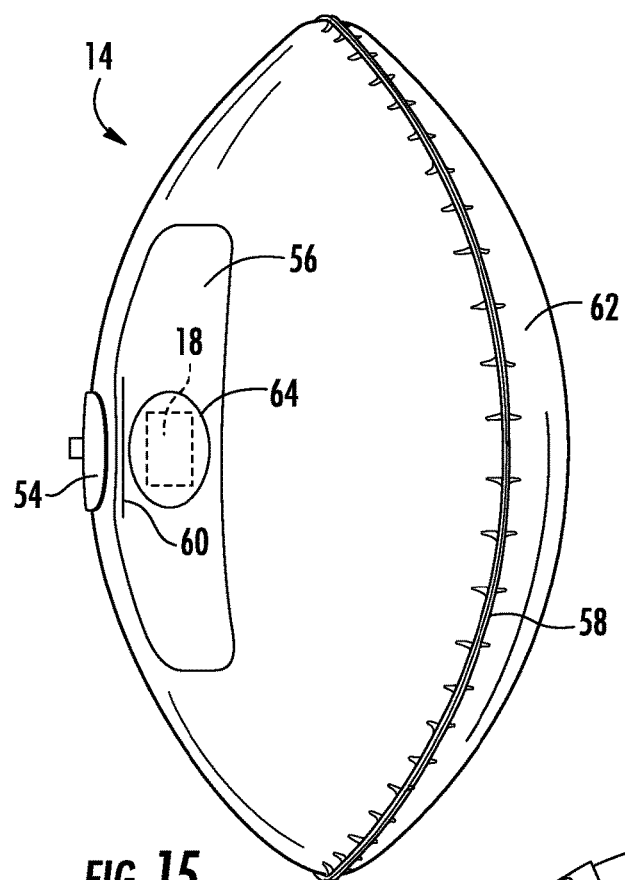
FIG. 15 is a side view of a bladder of a football in accordance with an alternative preferred embodiment of the present invention.
Figure 16:
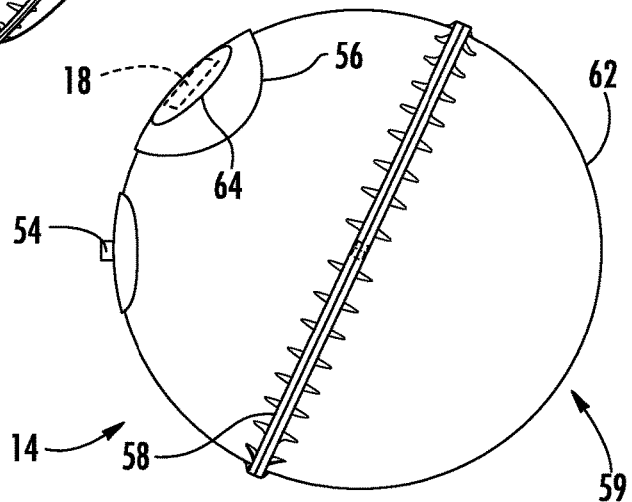
FIG. 16 is an end view of the bladder of the football of FIG. 15.

Referring to FIGS. 15 and 16, an alternative implementation is illustrated. The electronic chip 18 and the pocket 64 can be positioned on the flap 56 at a location that is underneath the lacing 16. In this location, the electronic chip 18 is protected from impacts during play by the lacing 16, and the cover 12 (FIG. 1). Further, the location of the electronic chip 18 is directly opposite the kicking/punting region 59 on the football 10. In one preferred embodiment, the electronic chip 18 is used to provide a small amount of additional weight near the laced region of the football 10 that can enhance the player's ability to impart rotation or spin to the football 10 as it is thrown or passed. In other preferred embodiments, weight is removed from the lacing or the cover to compensate for the small amount of additional weight added from the electronic chip 18.

Figure 17:
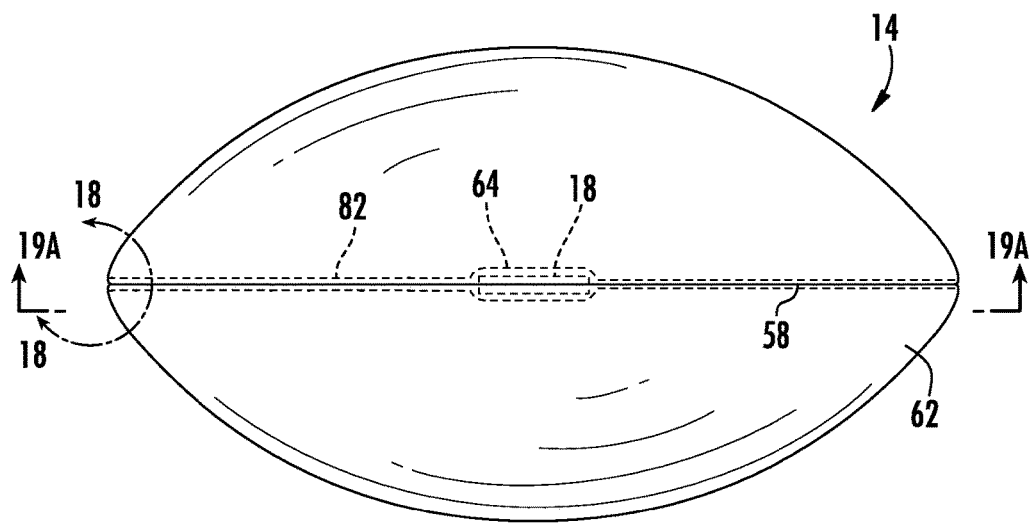
FIG. 17 is a side view of a bladder of a football in accordance with an alternative preferred embodiment of the present invention.
Figure 18:
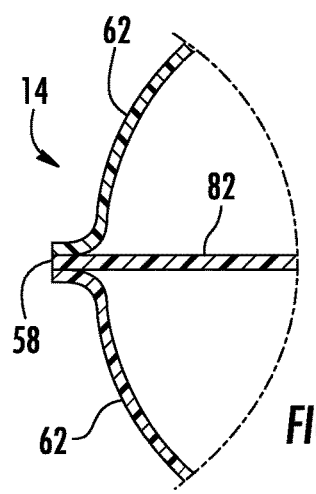
FIG. 18 is a cross-sectional view of a portion of the bladder taken about curved line 18-18 of FIG. 17.
Figure 19A:
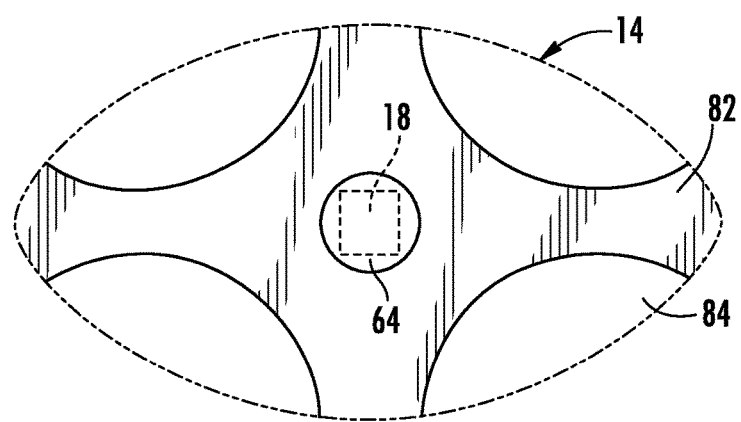
FIG. 19A is a cross-sectional view of the bladder taken about line 19A-19A of FIG. 17.

Referring to FIGS. 17, 18 and 19A, an alternative implementation is illustrated. The electronic chip 18 and the pocket 64 can be positioned on a cross-member 82 longitudinally extending across the bladder 14. The cross-member 82 can be a planar, single or multi-layered sheet of material used to support the electronic chip 18 within the internal volume of bladder 14. In one particularly preferred embodiment, the cross-member 82 is a sheet that is bonded, preferably through RF welding, between first and second multi-layered sheets 62 of the bladder 14. The cross-member 82 thereby becomes part of the bladder seam 58, which provides generally uniform structural support to the cross-member 82. The cross-member 82 can be formed of a mixture of vinyl and polyester urethane. The mixture can be new material or a regrind of such materials. Alternatively, it can be formed of vinyl, other urethanes, fabric, a thermoplastic, other polymeric materials, rubber and combinations thereof. In implementations where electronic chip 18 comprises one or more light emitters 124, cross-member 82 is formed from one or more translucent or transparent materials and/or includes openings there through allowing emitted light to pass through cross-member 82.

The cross-member 82 provides support to the electronic chip 18 in two dimensions across a plane. The uniform support provided by the bladder seam 58 enables the electronic chip 58 to be supported in the single plane. The material of the cross-member 82 and the tightness, tautness, or tension created during the formation of the bladder 14 can be varied to produce the desired operating position for the electronic chip 18. A stiffer, more rigid and/or higher tensioned material forming the cross-member 82 can be used to inhibit movement of the electronic chip 18 during play. In one preferred embodiment the cross-member 82 has a thickness of at least 0.004 inch, has an ultimate tensile strength of at least 3000 psi and has an ultimate elongation of at least 250 percent. In a particularly preferred embodiment, the cross-member has a thickness of at least 0.005 inch, an ultimate tensile strength of at least 7000 psi and an ultimate elongation of at least 400 percent.

The cross-member 82 preferably includes one or more openings 84 for allowing air within the bladder 14 to move freely from one side of the cross-member 84 to the other, and to readily equalize within the bladder during use. Without the openings 84, upon a sudden impact, such as a punt, a kick-off or a field goal attempt, a portion of the cover, typically opposite of the lacing, deflects inward thereby increasing the pressure of the air on kicked side of the football. Without the openings 84, the further pressurized air cannot communicate with the volume of air on the opposite side of the cross-member to equalize the pressure within the football. The pressure difference can have a negative effect on the flight and performance of the football, such as kicking distance, and the feel of the football. The openings 84 eliminate this issue by allowing for pressure to readily equalize throughout the internal volume of the bladder 14 following an impact.

Referring to FIG. 19A, the cross-member 82 supports the electronic chip 18 longitudinally and laterally about a plane defined by the cross-member 82. The cross-member 82 and the bladder seam 58 define the four symmetrically spaced openings 84.

The cross-member 82 can be formed of a very rigid and/or taut material inhibiting movement of the electronic chip 18 during movement of the football 10 and following impacts to the cover 12 of the football 10. Accordingly, when the bladder 14 within the football 10 is inflated to the recommended operating pressure range, the bladder 14 expands under the pressure. The expansion of the bladder 14 and the bladder seam 58 can render the cross-member taut and applies a tensile load to the cross-member 82 to keep the cross-member 82 in a taut position. The inflation of the bladder 14 to the recommended operating pressure can place a tensile load onto the cross-member 82. The tensile load is preferably at least 10 psi. In a particularly preferred embodiment, the tensile load is at least 50 psi. Additionally, the inflation of the bladder 14 to the recommended operating pressure can also cause the cross-member 82 to elongate in one or more direction depending upon the points of attachment of the cross-member 82 to the bladder side walls at the bladder seam 58. The elongation of the cross-member 82 is preferably within the range of 10 to 300 percent in at least one direction about the cross-member 82. In alternative embodiments, the cross-member 82 can be formed of a flexible material that more readily absorbs impacts during use.

Referring to FIGS. 19B and 19C, two alternative implementations of the cross-member 82 within the bladder 14 are shown. In each embodiment, the openings 84 are defined by the cross-member 82 and the bladder seam 58. In each embodiment, the electronic chip 18 is supported bi-directionally about the plane defined by the cross-member 82 and the bladder seam 58. In implementations where electronic chip 18 comprises one or more light emitters 124, cross-member 82 is formed from one or more translucent or transparent materials and/or includes openings there through allowing emitted light to pass through cross-member 82.

Referring to FIGS. 19D and 19E, two additional alternative implementations of the cross-member 82 within the bladder 14 are shown. In FIG. 19D, the cross-member 82 extends laterally or transversely across the internal volume of the bladder 14. In FIG. 19E, the cross-member 82 extends longitudinally across the internal volume of the bladder 14. In each embodiment, the cross-member 82 and the bladder seam 58 define two large openings 84. In other alternative preferred embodiments, the cross-member 82 can be formed of a plurality of threads, cords, wires, strings, springs, straps, bands, sheets or combinations thereof that support the electronic chip 18 within the bladder 14. In implementations where electronic chip 18 comprises one or more light emitters 124, cross-member 82 is formed from one or more translucent or transparent materials and/or includes openings there through allowing emitted light to pass through cross-member 82.

Figure 20A:
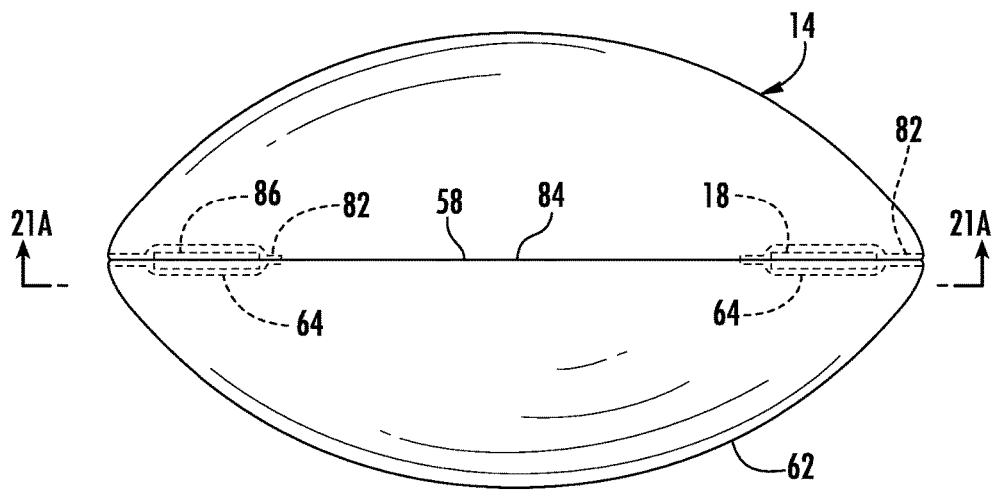
FIG. 20A is a side view of a bladder of a football in accordance with another alternative preferred embodiment of the present invention.
Figure 20B:
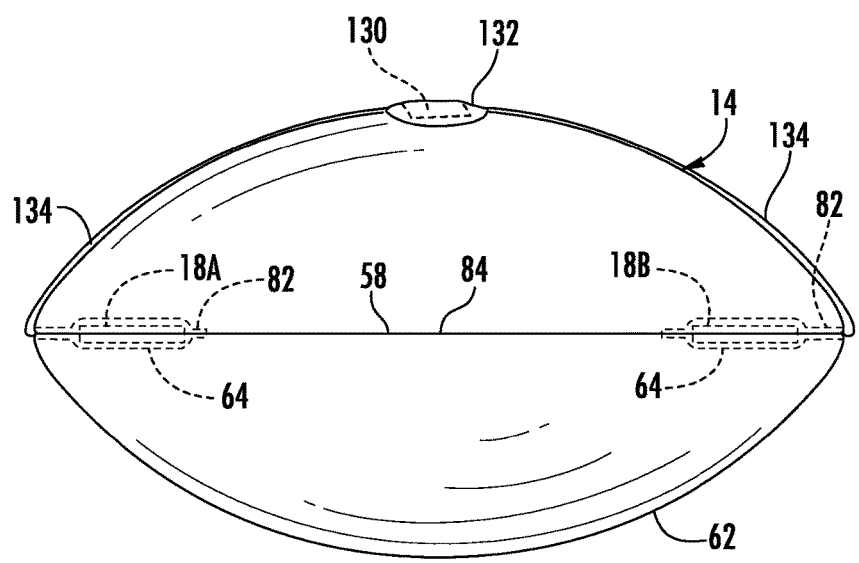
FIG. 20B is a side view of a bladder of a football in accordance with another alternative preferred embodiment of the present invention.
Figure 21A:
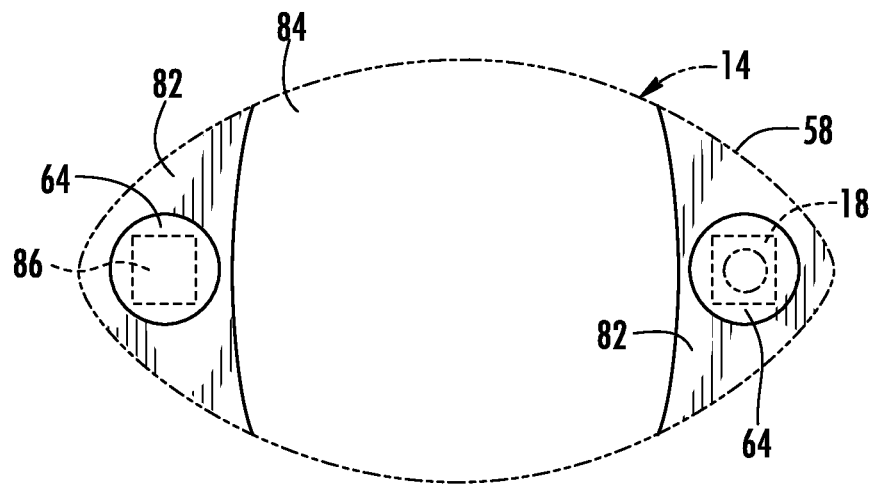
FIG. 21A is a cross-sectional view of the bladder taken about line 21A-21A of FIG. 20.

Referring to FIGS. 20 and 21A, another alternative implementation is shown. The bladder 14 can be formed with one or more cross-members 82 extending across the bladder 14 along a plane defined by the cross-member 82. Each of the cross-members 82 is positioned between the sheets 62 of the bladder 14 and is secured to the bladder 14 at the bladder seam 58. In implementations where electronic chip 18 comprises one or more light emitters 124, cross-member 82 is formed from one or more translucent or transparent materials and/or includes openings there through allowing emitted light to pass through cross-member 82.

In FIGS. 20 and 21A, two cross-members 82 are formed and positioned at opposite ends of the bladder 14. Each cross-member 82 can include the pocket 64 for receiving an electronic chip 18 or a counterweight 86. Two separate electronic chips 18 can be used in this preferred embodiment, or a single electronic chip 18 can be positioned on one cross-member 82 and the counterweight 86 can be positioned at the opposite end of the bladder 14. In this embodiment, the electronic chip 18 is suspended within the bladder 14 by one of the cross-members 82 at a position that is close to one end of the bladder 14. The distance between the electronic chip 18 and the bladder seam 58 is very small reducing the ability of the cross-member 82 and the electronic chip 18 to deflect during use. Further, the end of the football 10 is inherently more rigid and stable than the central regions of the football 10. The ends of the football 10 deflect significantly less than the central regions of the football 10 upon impact. Therefore, the electronic chip 18 is less likely to be affected by impacts to the cover of the football 10. The counterweight 86 can be positioned in a second cross-member 82, located at the opposite end of the bladder 14, to counterbalance the electronic chip 18. The counterweight 86 can have substantially the same weight as the electronic chip 18. Although FIGS. 20 and 21A illustrate a separate cross-member 82, one at each end of the bladder 14 with an electronic chip and a counterweight positioned in the pockets of the separate cross-members, in an alternative preferred embodiment, a single cross-member 82 positioned at one end of the bladder and having a pocket 64 with the electronic chip within it can be used. In this embodiment, neither an electronic chip nor a counterweight is positioned at the opposite end of the bladder.

Figure 21B:
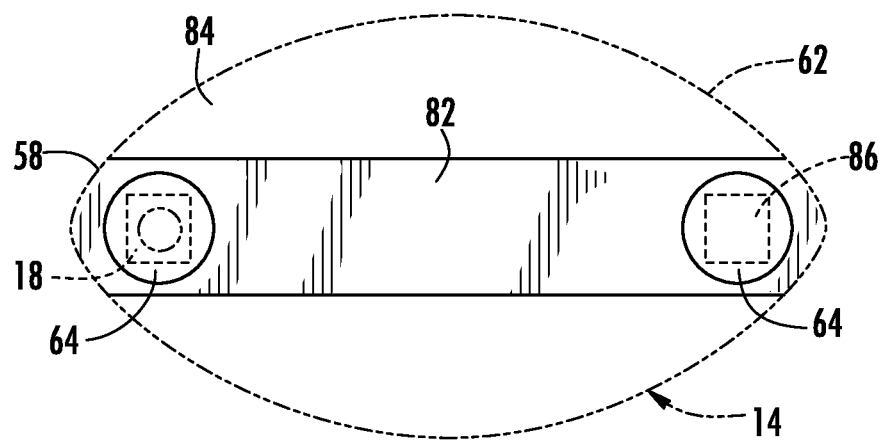
FIG. 21B is a cross-sectional view of a bladder of a football in accordance with another alternative preferred embodiment of the present invention.

Referring to FIG. 21B, in another alternative implementation, a single cross-member 82 can be used to support both the electronic chip 18 and/or the counterweight 86 (or a second electronic chip). Preferably, the electronic chip 18 and the counterweight 86 are positioned at or near opposite ends of the internal volume of the bladder 14. In this embodiment, the single cross-member 82 includes two pockets 64 (one at each end of the bladder 14). One pocket 64 retains the electronic chip and the second pocket 64 contains either the counterweight 86 or a second electronic chip. The single cross-member 82 is shown extending longitudinally about the bladder 14 in a plane defined by the cross-member 82. The cross-member 82 is secured to the sheets 62 of the bladder 14 at the bladder seam 58. In implementations where electronic chip 18 comprises one or more light emitters 124, cross-member 82 is formed from one or more translucent or transparent materials and/or includes openings there through allowing emitted light to pass through cross-member 82.

Referring to FIG. 20B, in another alternative implementation, the bladder 14 can be formed with one or more cross-members 82 extending across the bladder 14 along a plane defined by the cross-member 82 and by the bladder seam 58. Each of the cross-members 82 is positioned between the sheets 62 of the bladder 14 and is secured to the bladder 14 at the bladder seam 58. The cross-member 82 can include the first and second pockets 64A and 64B for receiving first and second electronic chips 18A and 18B. The first and second electronic chips 18A and 18B can be positioned at the opposite ends of the bladder 14. In implementations where electronic chip 18 comprises one or more light emitters 124, cross-member 82 and/or pockets 64A, 64B are formed from one or more translucent or transparent materials and/or includes openings there through allowing emitted light to pass through cross-member 82 and/or pockets 64A, 64B.

In this embodiment, the electronic chips 18A and 18B are suspended within the bladder 14 by the cross-member(s) 82 at a position that is close to the respective ends of the bladder 14. The distance between each of the electronic chips 18A and 18B and the bladder seam 58 is very small reducing the ability of the cross-member 82 and the electronic chip 18 to deflect during use, and enabling the electronic chips 18A and 18B to be maintained in a generally stable position within the bladder 14. The ends of the football 10 are inherently more rigid and stable than the central regions of the football 10 and deflect significantly less than the central regions of the football 10 upon impact. Therefore, the electronic chips 18A and 18B are less likely to be affected by impacts to the cover of the football 10.

In this embodiment, the first and second chips 18A and 18B are each similar to the single electronic chip described above with respect to FIG. 1A. In another implementation, the components supported are provided by chip 18 as seen FIG. 1A are apportioned between chips 18A and 18B. Chips 18A and 18B can be used together to accurately transmit and/or indicate the correct position, speed, rotation, acceleration, deceleration and movement of football 10. The two electronic chips 18A and 18B can be used to improve the accuracy and reliability of the monitoring system. Alternatively, the first and second chips 18A and 18B can be essentially the same with one chip providing redundancy, or serving as a backup, to the other in event of a chip failure. In this embodiment, a battery 130 can be secured to the bladder 14 preferably in a battery pocket 132. Alternatively, the battery 130 can be coupled to the bladder 14 through other means, such as for example, bonding or hook and loop fastening. The location of the battery pocket 132 and the battery 130 is at the multi-layered sheet 62 of the bladder 14, preferably at a location that will be beneath the lacing on a completely assembled football 10. Wires 134 or leads can be used to operably connect the battery 130 to the first and second chips 18A and 18B. The battery 130 provides a source of power to the first and second chips 18A and 18B.

Figure 22:
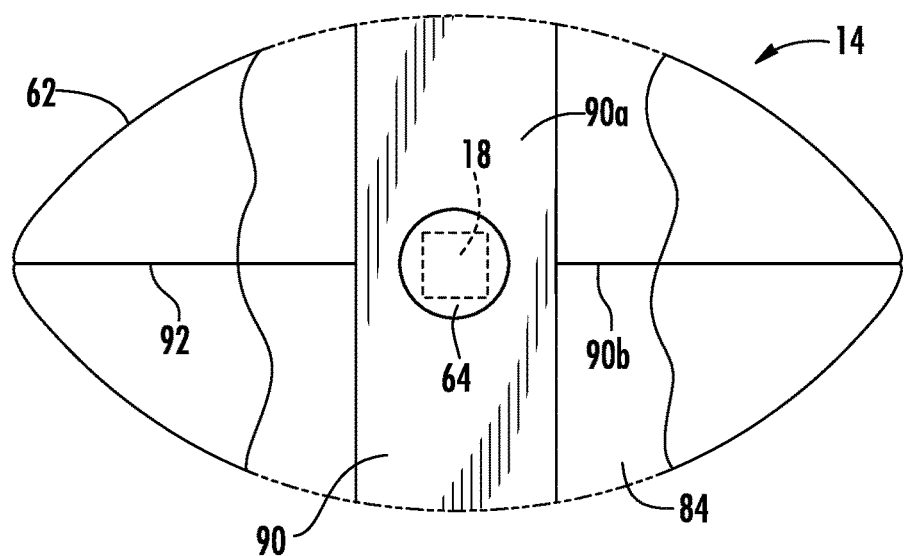
FIG. 22 is a side view of a bladder of a football in accordance with another alternative preferred embodiment of the present invention with a portion of the bladder removed to show the internal structure of the bladder.
Figure 23:
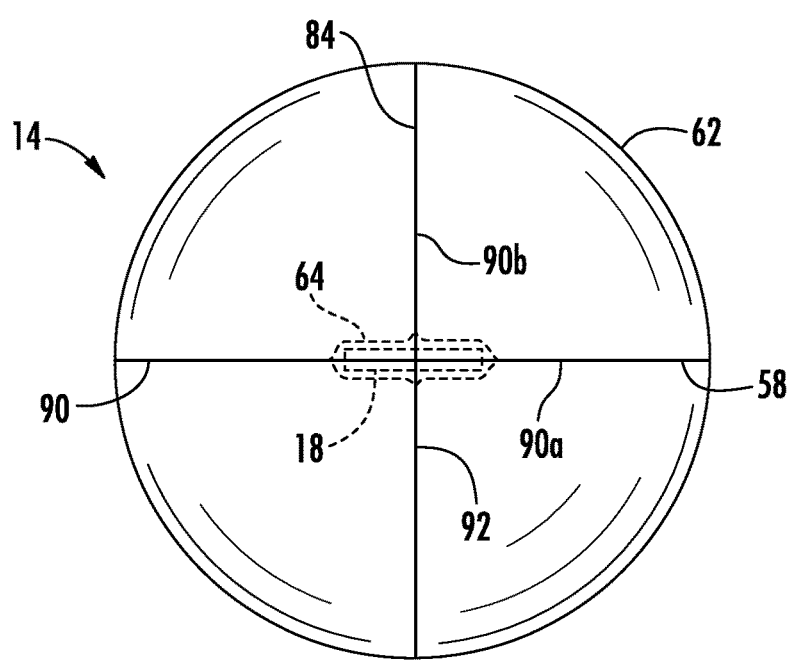
FIG. 23 is an end view of the bladder of the football of FIG. 22.

Referring to FIGS. 22 and 23, another alternative implementation is illustrated. In preceding embodiments, the cross-member 82 extends about a single plane providing two-dimensional support to the electronic chip 18. In other alternative embodiments, the three-dimensional cross-member 90 can be used. The cross-member 90 can include two or more planar sections that connect to multiple locations about the sheets 62 of the bladder 14. In one particularly preferred embodiment, the cross-member 90 includes a first section 90a that extends laterally across the bladder 14 about a plane defined by the bladder seam 58 and in a manner similar to the cross-member 82 of FIG. 19D, and a second section 90b that extends orthogonally from the first section 90a. The first section 90a includes the pocket 64 that retains the electronic chip 18. In an alternative preferred embodiment, the pocket can reside on the second section 90b. The openings 84 are formed in both sections 90a and 90b of the cross-member 90 to allow for air to move freely and readily equalize within the bladder 14. The second section 90b is secured to the bladder 14 by a second bladder seam 92 that secures the edges of the sheets 62 of the bladder 14. Accordingly, in the present implementation, the bladder 14 is formed of four separate multi-layered sheets 62 that are bonded together at first and second generally longitudinally extending bladder seams 58 and 92. The bladder seams 58 and 92 provide an effective, secure, reliable and durable means of attaching the cross-member 90 to the bladder 14. The three dimensional support of the electronic chip 18 provided by the cross-member 90 can substantially inhibit movement of the electronic chip during use. In implementations where electronic chip 18 comprises one or more light emitters 124, three-dimensional cross-member 90 is formed from one or more translucent or transparent materials and/or includes openings there through allowing emitted light to pass through three-dimensional cross-member 90.

In alternative implementations, some edges of the cross-member 90 can be secured to the bladder 14 through other means, such as for example, being bonded, fused, clipped, fastened via hoop and loop fasteners, buckles, or other fasteners. In such embodiments, the bladder can be formed without a bladder seam, with a single bladder seam, or two or more bladder seams. The three dimensional cross-member 90 can be arranged to form substantially 90 degree angles between the sections of the cross-member as illustrated. Alternatively, the sections of the cross member can extend at other angles from each other to provide three-dimensional support to the electronic chip positioned within the bladder 14. In another alternative implementation, the electronic chip 18 can be supported in a three-dimensional fashion through a plurality of threads, cords, wires, fibers, fabric strips, laces or combinations thereof.

Figure 23A:
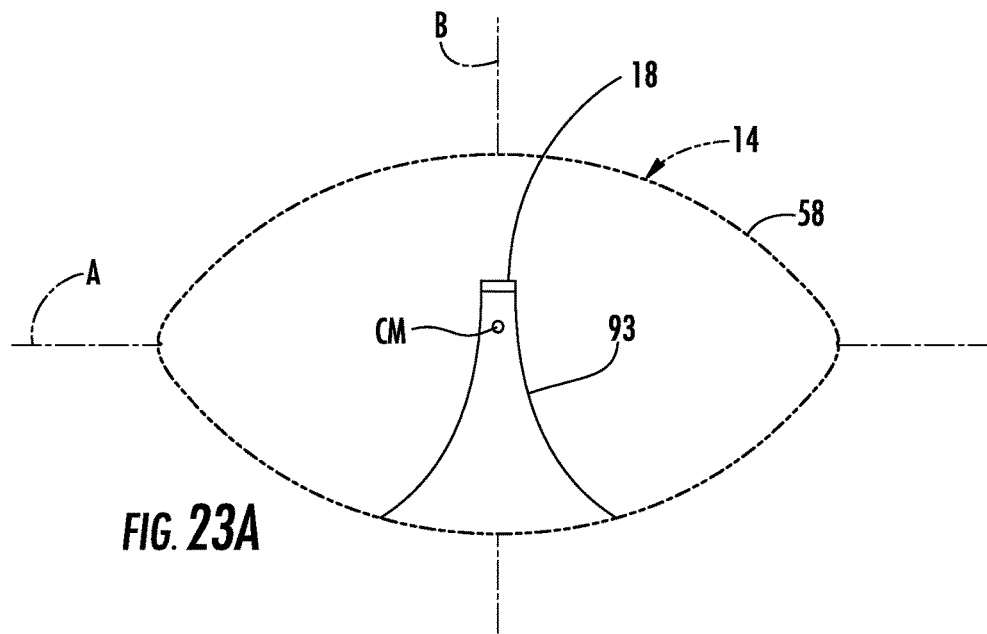
FIG. 23A is a cross-sectional view of an example bladder for the football of FIG. 1.
Figure 23B:
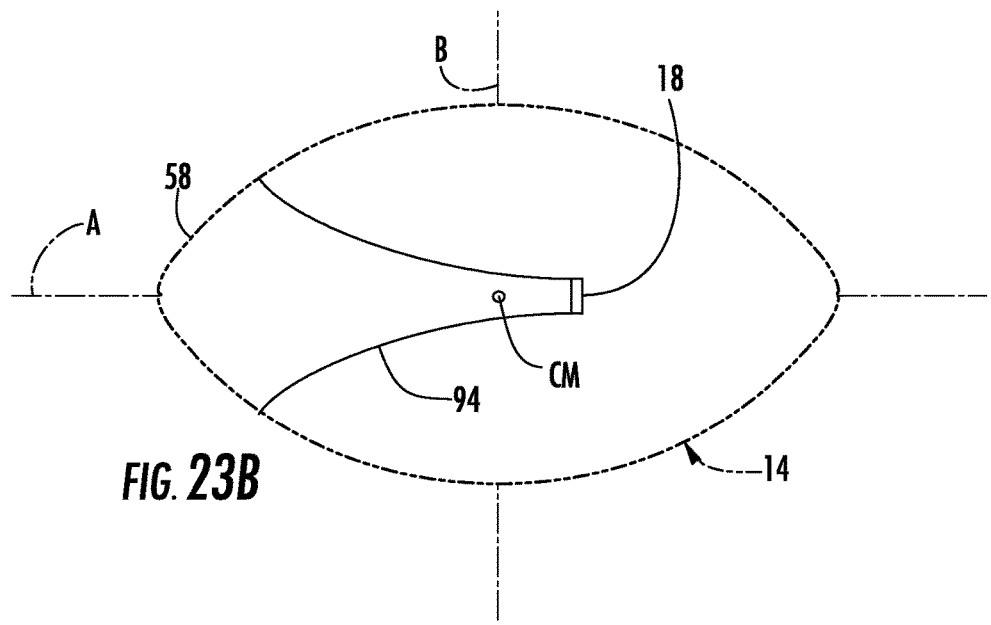
FIG. 23B is a cross-sectional view of another example bladder for the football of FIG. 1.

FIGS. 23A and 23B illustrate two alternative implementations of bladder 14 of football 10. In each of the implementation shown in FIGS. 23A and 23B, electronic chip 18 is supported by a tower extending within the interior of bladder 14. In the example shown in FIG. 23A, bladder 14 comprises an internal tower 93 supporting chip 18. In one implementation, tower 93 comprises a resiliently flexible structure welded, bonded, fused or integrally formed as part of the outer walls of bladder 14 and projecting into or towards a center of bladder 14. In the example illustrated, tower 93 widens at its base for greater stability. In other implementations, tower 93 may have other configurations. For example, the tower can be a narrow cylindrical structure. In other implementations, tower 93 may be rigid.

In the example illustrated, tower 93 extends from a side (versus a tip) of bladder 14 and extends beyond the axis A of bladder 14. Tower 93 extends beyond axis A by a sufficient distance such that, given the mass of chip 18 and the mass of tower 93, tower 93 and chip 18 do not alter a balance of bladder 14 or the ultimately formed football 10. In particular, the entire structure formed by tower 93 and chip 18 has a center of mass CM aligned with axis A and axis B. In other implementations, tower 93 and chip 18 may have a CM at other locations and may have other configurations. In one implementation, the air pressure with the bladder 14 maintains the chip 18 and the tower 93 in position and serves to inhibit movement of the chip 18 and/or the tower 93. In another implementation, the rigidity of the tower 93 and its connection to the bladder 14 can be used to inhibit movement of the chip 18 within the bladder 14. In other implementations, the tower 93 may extend only a short distance into the bladder less than axis A when from the side, and less than axis B if from one of the ends of the bladder 14.

In the example shown in FIG. 23B, bladder 14 comprises an internal tower 94 supporting chip 18. In one implementation, tower 94 comprises a resiliently flexible structure welded, bonded, fused or integrally formed as part of the outer walls of bladder 14 and projecting into or towards a center of bladder 14. In the example illustrated, tower 94 widens at its base for greater stability. In other implementations, tower 94 may have other configurations. In other implementations, tower 94 may be rigid.

In the example illustrated, tower 94 extends from a tip or end of bladder 14 and extends beyond the axis B of bladder 14. Tower 94 extends beyond axis B by a sufficient distance such that, given the mass of chip 18 and the mass of tower 94, tower 94 and chip 18 do not alter a balance of bladder 14 to ultimately form football 10. In particular, the entire structure formed by tower 94 and chip 18 has a center of mass CM aligned with axis A and axis B. In other implementations, tower 94 and chip 18 may have a center of mass at other locations and may have other configurations. With respect to the implementations of FIGS. 23A and 23B, the chip 18 may be positioned at the end of the tower 93 or 94 within the pressurized volume of the bladder 14 including one or more of the light emitters 124. In such implementations, the tower 93 or 94 provides support for the chip 18 and enables the chip 18 to be positioned with the light emitters 124 at the desired location within the bladder 14. In other implementations, the chip 18 can be within the tower 93 or 94 and the one or more light emitters 124 can be positioned at the end of the tower or adjacent the tower and the chip 18 but inside the pressurized volume of the bladder 14.

Figure 24A:
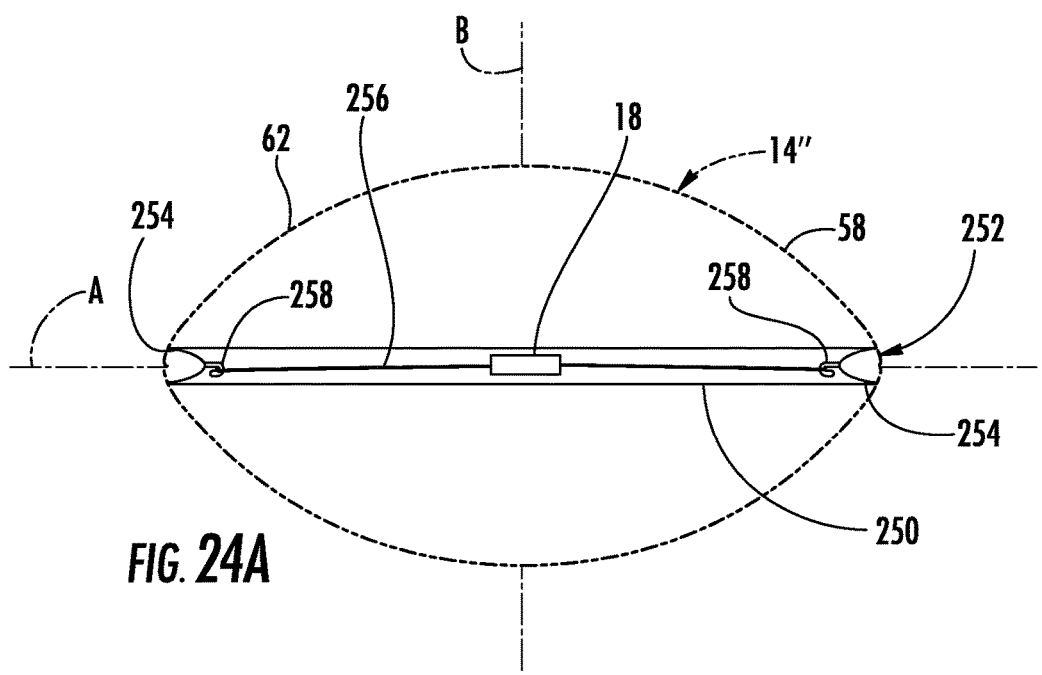
FIG. 24A is a cross-sectional view of an example bladder and chip mounting system for the football of FIG. 1.
Figure 24B:
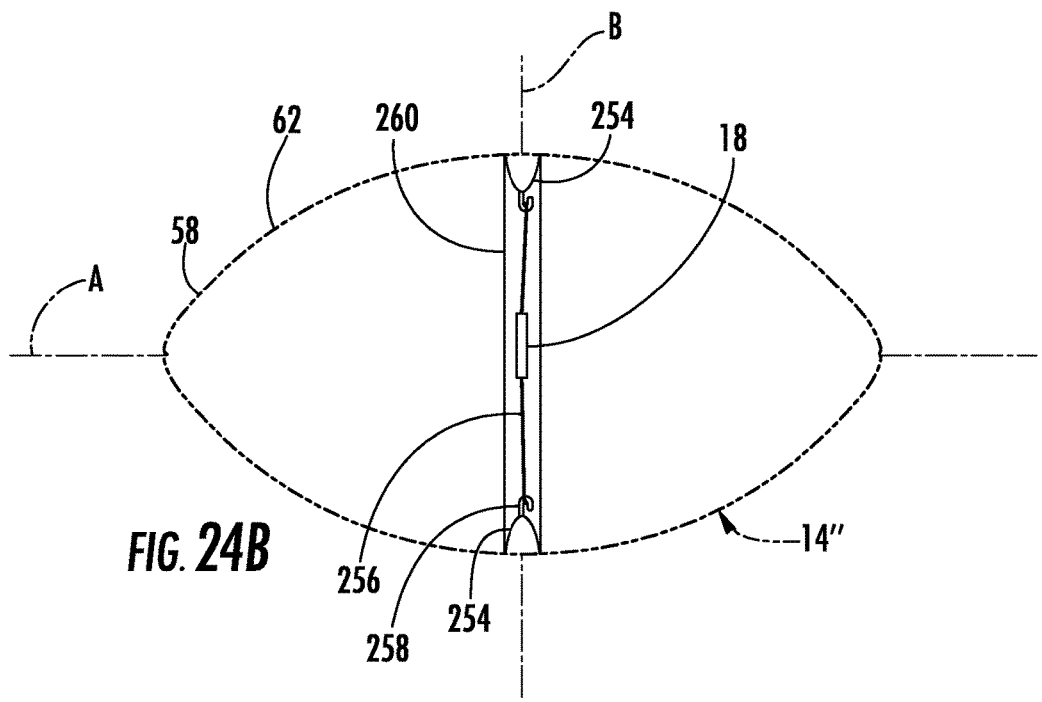
FIG. 24B is a cross-sectional view of another example bladder and chip mounting system for the football of FIG. 1.

FIGS. 24A and 24B illustrate alternative implementations for supporting chip 18. FIG. 24A is a sectional view illustrating a portion of football 10 specifically comprising bladder 14' in lieu of bladder 14 and additionally comprises chip mounting system 252. Although not illustrated in FIG. 24A, bladder 14' further comprises a valve mechanism 54, patch 56 and cover 24 (shown in FIGS. 3-4).

Bladder 14' is similar to bladder 14 (shown in FIG. 3) except the bladder 14' comprises an internal tubular portion 250 extending from opposite sides of the volume formed by sheets 62. Internal tubular portion to 50 comprises a flexible tubing extending through and intersecting a center point of bladder 14' along axis A between tips of bladder 14'. As a result, sheets 62 and tubular portion 250 form a donut-like inflatable interior which encircles tubular portion 250. Tubular portion 250 is sized receive electronic components, such as circuit chip 18 (described above). Tubular portion 250 facilitates insertion of circuit chip 18 within tubular portion 250 after bladder 14' has been inflated. Because tubular portion 250 continuously extends from a first side of bladder 14' to a second opposite side of bladder 14', circuit chip 18 and chip mounting system 252 may be strung or fished through bladder 14'. In other implementations, tubular portion 250 may comprise a blind tubular member or a tubular member having one closed off end, wherein the closed off end is secured in place within bladder 14'. In other implementations, tubular portion 250 may comprise a rigid inflexible tube or sleeve.

In implementations where circuit chip 18 comprises one or more of light emitters 124 such that light emitters 124 are located within tubular portion 250, those portions of tubular portion 250 about circuit chip 18 or adjacent to the one or more light emitters 124 are translucent or transparent. As a result, light emitted by such light emitters 124 pass-through tubular portion 250 and illuminate the interior bladder 14', wherein at least portions of sheets 62 of bladder 14' are also translucent or transparent. In implementations where light emitters 324 are omitted from electronic chip 18, tubular portion 250 may be opaque.

Chip mounting system 252 mounts and supports electronic component or chip 18 within bladder 14' and within tubular portion 250. Chip mounting system 252 comprises plugs 254 and flexible member 256. Plugs 254 are configured to be inserted and retained in opposite ends of tubular member 250 proximate an exterior of bladder 14'. In one implementation, sheets 62 further comprise an opening exposing plugs 254 access to the interior of tubular member 250 or include an openable or closable door, cover or flap providing access to plugs 254 for axis to the interior of tubular member 2502 insert, remove or replace chip 18. Because the interior of tubular portion 250 is isolated are sealed off from the interior of bladder 14', plugs 254 may be removed and chip 18 may be inserted, removed or replaced without deflation of bladder 14'.

Plugs 254 are each connected to an opposite end of flexible member 256. In the example illustrated, each of plugs 254 comprises a hook 258 about which flexible member 256 extends or is hooked. In other implementations, plugs 254 may be secured to flexible member 256 in other fashions.

Flexible member 256 comprises an elongate flexible string, line, band, strap, cable, rope, wire or the like extending between plugs 254. Flexible member 256 supports circuit chip 18 at a central location within tubular portion 250. In one implementation, flexible member 256 comprises a resiliently stretchable member, which when taught, resiliently holds circuit chip 18 in place. In other implementations, other structures which are not necessarily flexible or resilient may be positioned within tubular portion 250 to retain circuit chip 18 centrally in place within tubular portion 250. In some implementations, flexible member 256 may be omitted, wherein circuit chip 18 is positioned within tubular portion 250 while bladder 14' is either deflated or not fully inflated and wherein, upon fuller inflation of bladder 14', tubular portion 250 stretches and constricts about and into gripping contact with circuit chip 18 to retain circuit chip 18 in place.

In some implementations, additional components may be contained within tubular portion 250. In one implementation, tubular portion 250 may additionally receive and contain supplemental electronic componentry which is connected to electronic chip 18. For example, tubular portion 250 may receiving contain light emitters, sound emitters, batteries and the like. In one implementation, the multiple components may be strung together along or between portions of flexible member 256.

FIG. 24B illustrates bladder 14", another implementation of bladder 14'. Bladder 14" is similar to bladder 14' except the bladder 14" comprises a tubular portion 260 extending along an axis B, perpendicular to the axis A. Similar to tubular portion 250, tubular portion 260 forms a donut-like inflatable interior which encircles tubular portion 260. Tubular portion 260 is sized receive electronic components, such as circuit chip 18 (described above). Tubular portion 260 facilitates insertion of circuit chip 18 within tubular portion 260 after bladder 14" has been inflated. Because tubular portion 260 continuously extends from a first side of bladder 14" to a second opposite side of bladder 14", circuit chip 18 and chip mounting system 252 (described above) may be strung or fished through bladder 14". In other implementations, tubular portion 260 may comprise a blind tubular member or a tubular member having one closed off end, wherein the closed off end is secured in place within bladder 14". In other implementations, tubular portion 260 may comprise a rigid inflexible tube or sleeve.

In implementations where circuit chip 18 comprises one or more of light emitters 124 such that light emitters 124 are located within tubular portion 260, those portions of tubular portion 260 about circuit chip 18 or adjacent to the one or more light emitters 124 are translucent or transparent. As a result, light emitted by such light emitters 124 pass-through tubular portion 260 and illuminate the interior bladder 14", wherein at least portions of sheets 62 of bladder 14" are also translucent or transparent. In implementations where light emitters 124 are omitted from electronic chip 18, tubular portion 260 may be opaque.

Figure 25:
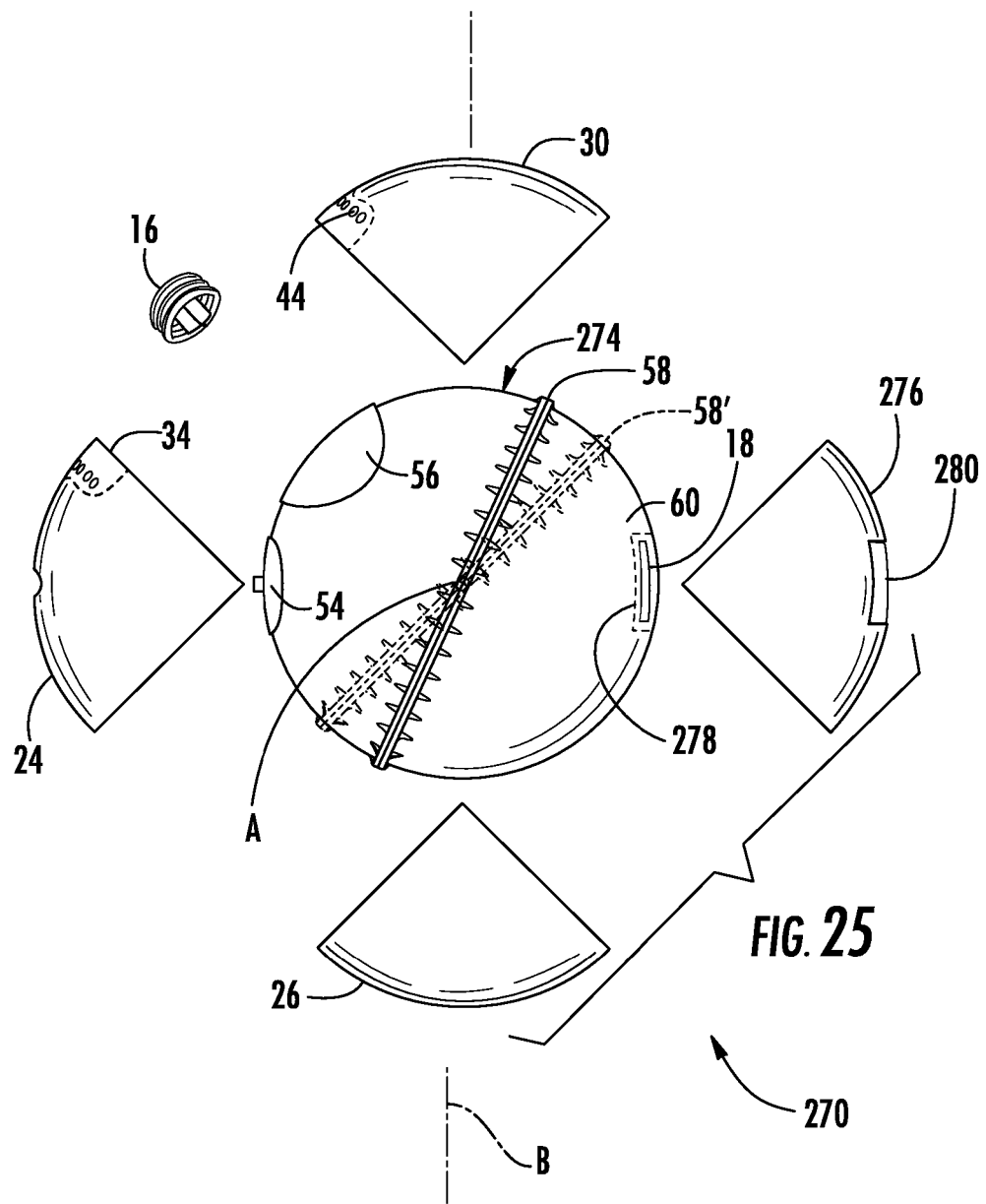
FIG. 25 is an exploded end view of an example implementation of the football of FIG. 1.

FIG. 25 is an exploded perspective view of football 270, another implementation of football 10. Football 270 is similar football 10 shown in FIGS. 1 and 6 except that football 270 comprises bladder 274 in lieu of bladder 14 and cover panel 276 in lieu of bladder 28. Bladder 274 is similar to bladder 14 except the bladder 274 comprises cavity, chamber, recess or pocket 278. Pocket 278 recesses into bladder 274 and is sized to receive electronic chip 18. In one implementation, pocket 278 is integrally formed into the shape of bladder 274.

Pocket 278 is located directly opposite to the valve mechanism 54, on an opposite side of football 270 as valve mechanism 54. In other words, pocket 278 is aligned with valve mechanism 54 in directions along both orthogonal axes A and B. Because pocket 278 is located directly opposite to the valve mechanism 54, electronic chip 18 additionally serves as a counterweight to valve mechanism 54, allowing for bladder 274 of greater balance of comprising electronic chip 18. In other implementations, pocket 278 may have other locations along the exterior of bladder 274. In still other implementations, pocket 27A may be formed external to bladder 14 between bladder 14 and one of cover panel 28 (shown in FIG. 6) while facilitating use of electronic chip 18 as a counterweight to valve mechanism 54.

Cover panel 276 is similar to cover panel 28 except that cover panel 276 as formed therein or additionally supports a door, cover or flap 280. Flap 280 extends opposite to pocket 278 and is actuated between open and closed states to provide access to pocket 278 and chip 18. Flap 280 facilitates inspection, repair or replacement of chip 18. In one implementation where chip 18 further comprises manual touch controls, flap 280 allows manual input of selections or controls. In implementations where chip 18 comprises one or more recharging ports, flap 280 allows access to such ports for charging of battery 122. In one implementation, the flap 280 may be accessed from the outer surface of the cover panel 276. In another implementation, the flap 276 may be accessed from an inner surface of the cover panel 276. In other implementations, the packet 278 and/or the flap 280 may be positioned on other cover panels. In other implementations, flap 280 may be omitted.

Figure 26A:
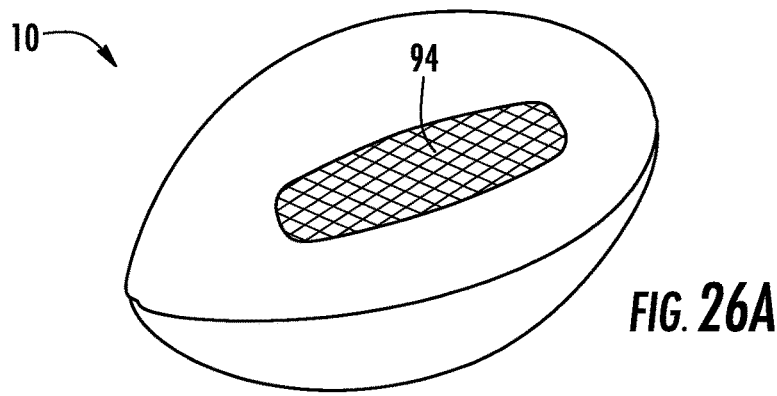
FIG. 26A is a side perspective view of an inner layer of a football in accordance with another alternative preferred embodiment of the present invention.
Figure 26B:
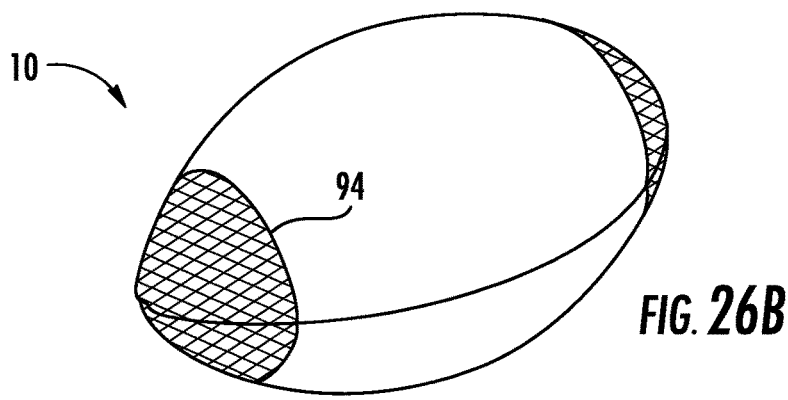
FIG. 26B is a side perspective view of an inner layer of a football in accordance with another alternative preferred embodiment of the present invention.
Figure 26C:
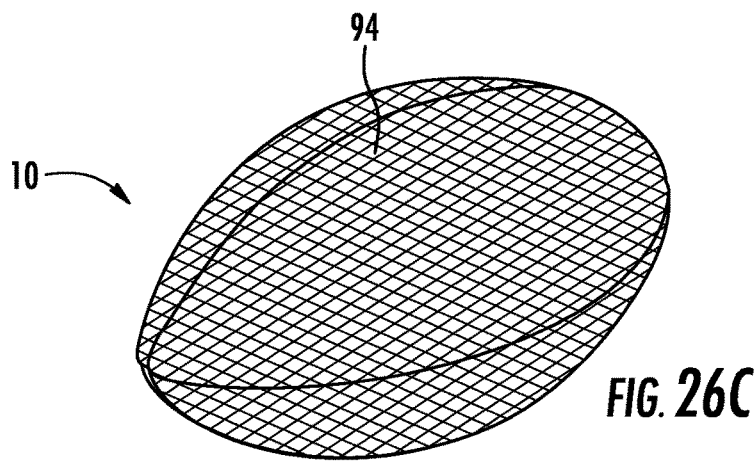
FIG. 26C is a side perspective view of an inner layer of a football in accordance with another alternative embodiment.
Figure 27A:
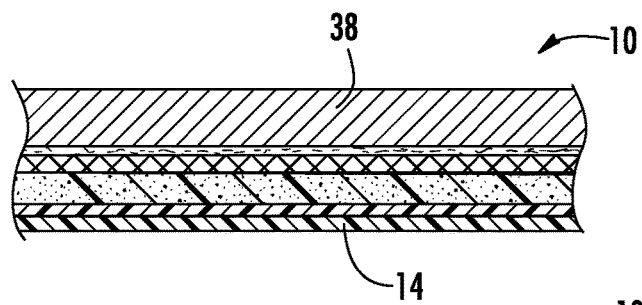
FIGS. 27A and 27B are cross-sectional views of a portion of a football in accordance with other alternative embodiments.
Figure 27B:
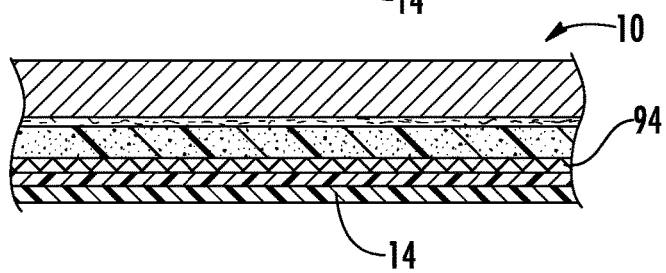

Referring to FIGS. 26A-26C, in alternative implementations, the electronic chip 18 is shown as a thin, flexible tag 94 that can be applied to the football, the bladder or an intermediate layer of the football as a patch (FIG. 24), a plurality of patches (FIG. 25), or an additional layer (FIG. 26). The tag 94 may support one or more of the electronic components on chip 18 and shown and described with respect to FIG. 1A. In one implementation, the tag 94 comprises a radio frequency identification (RFID) tag or chip which is in communication with controller 34 or which itself incorporates controller 34. The RFID tag is an integrated circuit for storing and processing information, and modulating and demodulating a radio-frequency (RE) signal. The RFID tag also includes at least one antenna for receiving and transmitting the signal. The tag can be passive or active, including a battery as a power source. In other alternative preferred embodiments, the tag 94 can be a wire mesh, or a pattern or a circuit configured to affect a magnetic field or create a voltage change at it moves through or about a sensing area. In other alternative preferred embodiments, the electronic chip is configured with one or more receivers, transmitters, transceivers, power sources, processors, microcontrollers and switches. Referring to FIGS. 24 through 27B, the tag 94 can be applied as a patch or a layer at any desired location about or within the football 10 including on the inner (FIG. 27A) or outer surface of the cover 12, within the cover 12, on (FIG. 27B) or within the bladder 14 or within other layers such as winding layers, linings, and padding layers.

Figure 28:
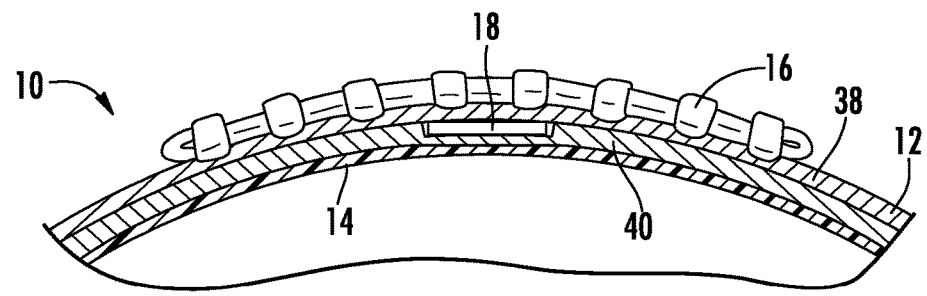
FIGS. 28-30 are cross-sectional views of a section of a football in accordance with other alternative embodiments.
Figure 29:
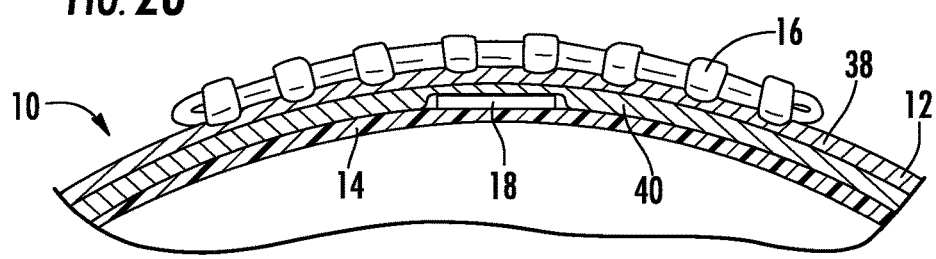
Figure 30:
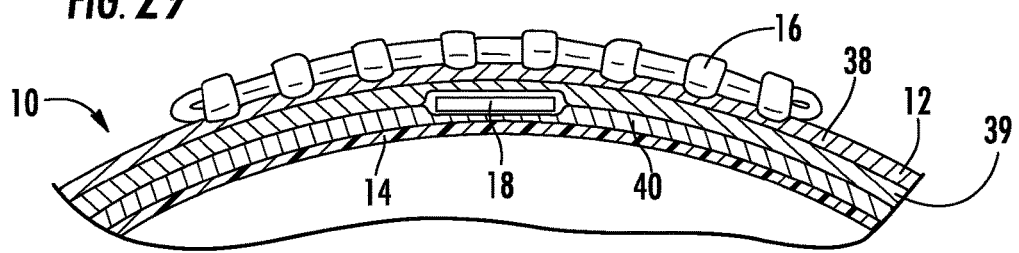

Referring to FIGS. 28 through 30, alternative implementations are illustrated. The electronic chip 18 can be positioned outside of the bladder 14 in other locations within the football 10. In FIG. 28, the electronic chip 18 is positioned within the cover 12 beneath the outermost surface 38 in a recess formed in the lining 40 of the cover 12. The electronic chip 18 can also be advantageously positioned beneath the lacing 16 for additional protection and positioning away from the kicking region of the football 10. Referring to FIG. 29, the electronic chip 18 can also be positioned on the inner surface of the lining 40 adjacent to the bladder 14. In another implementation, one or more intermediate layers 39 can be positioned between the liner 40 and the bladder 14. The electronic chip 18 can be positioned within the intermediate layer 39 or between the lining and the intermediate layer as shown in FIG. 30. If additional intermediate layers are employed in the football construction, the electronic chip can positioned over, under or within such intermediate layers. In each of such variations, at least portions of the layers between chip 18 and the exterior of football 10 are translucent, transparent and/or include openings to transmit light when chip 18 includes light emitters 124.

Figure 31:
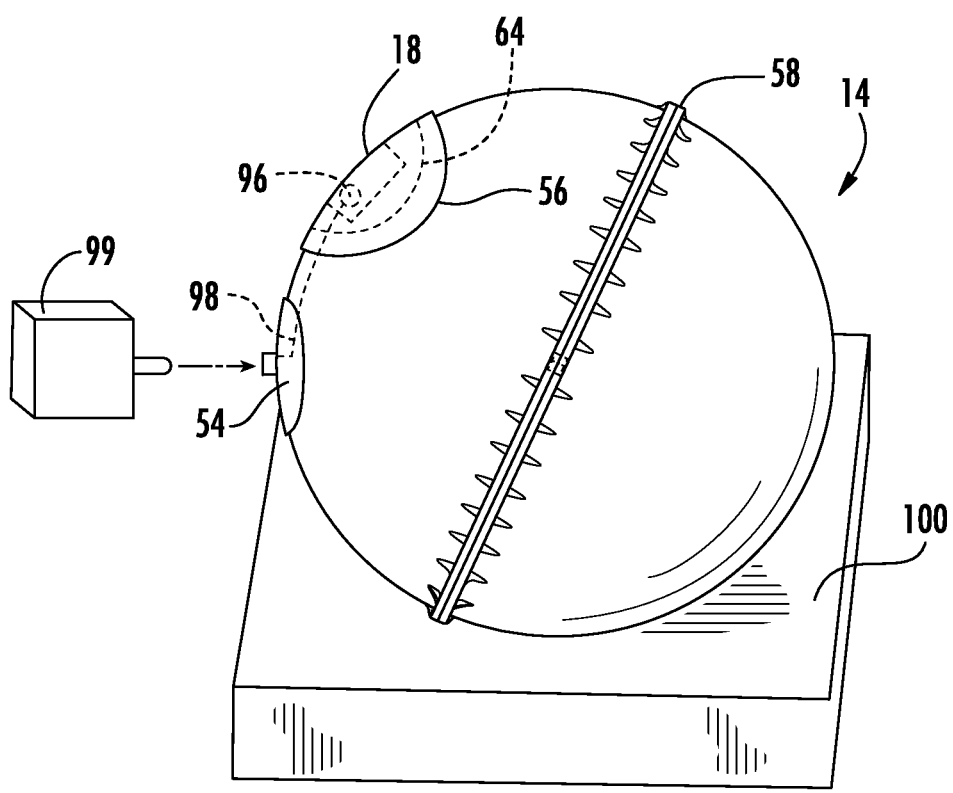
FIG. 31 is an end view of a bladder of a football in accordance with another alternative embodiment.

Referring to FIG. 31, the electronic chip 18 can be an active chip including a power source, such as a battery 122. In one implementation, the battery 122 can be a rechargeable battery. Leads 98 for charging the battery 122 can extend from the battery 122 toward the outer surface of the football 10 for engagement with a charging device. In one particularly preferred embodiment, the leads 98 can extend from the battery 96 into the valve assembly 54, which is adapted to receive a charging device 99 for operably engaging the leads 98. The charging device 99 provides a power source to the leads 98 for transfer to the battery 96. The charging device 99 can be self contained and wireless or wired to an electrical grid. In another alternative preferred embodiment, the football can be formed with a second opening and structure that resembles a valve assembly. An adapter coupled to the battery can be inserted into the second opening. The adapter can be configured for operably engaging a charging device. In another alternative preferred embodiment, the battery 122 can be charged wirelessly through a wireless charger 100 positioned near the football 10 during charging. The wireless charger 100 generates an electromagnetic field to recharge the battery 122 wirelessly. In another alternative preferred embodiment, the battery 122 can be positioned at or near the outer surface of the football to allow for its replacement. For example, the battery 122 can be positioned underneath the lacing, which can be configured to be repositioned to allow access to the battery for removal and replacement. In another example, the battery can be positioned within or accessible through the valve assembly.

Figure 32:
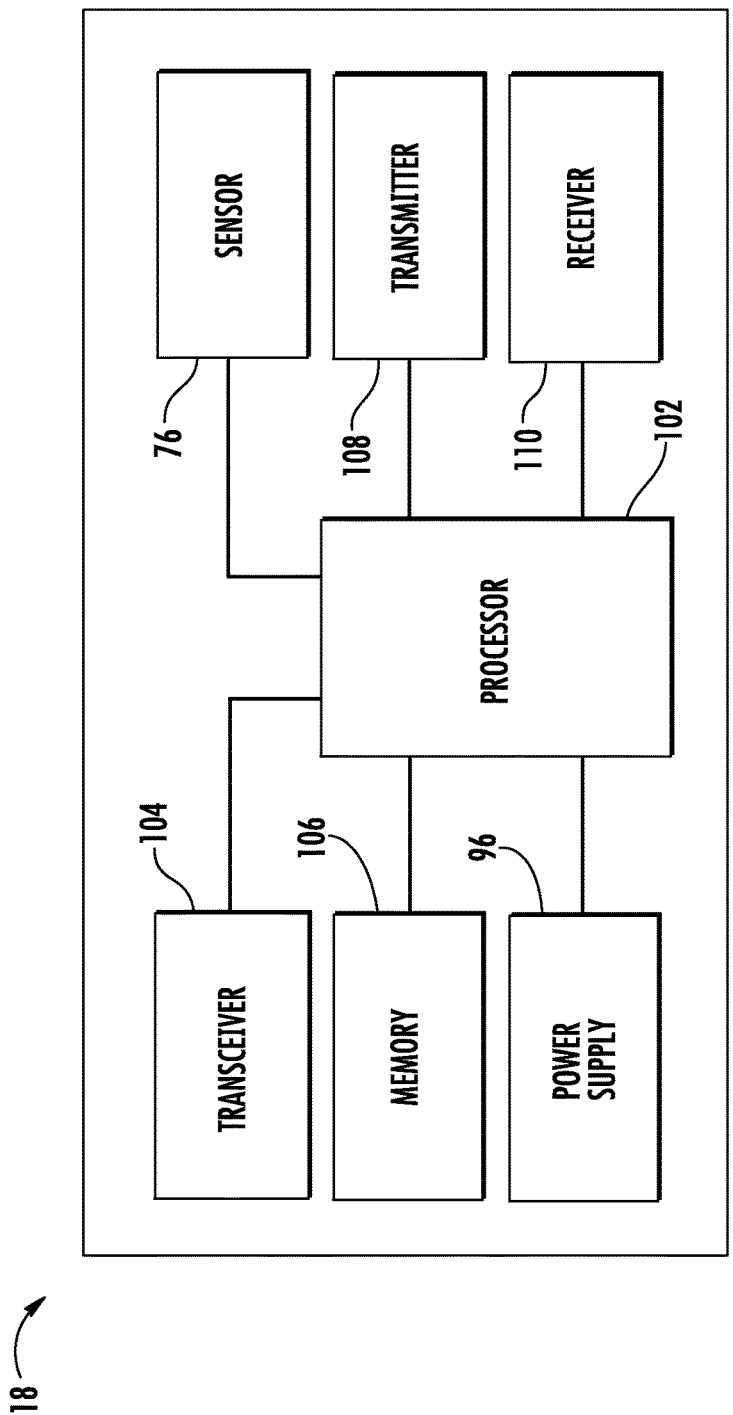
FIG. 32 is a diagram of an example of another electronic chip used on a football in accordance with an embodiment.

FIG. 32 illustrates electronic chip 18', another implementation of electronic chip 18 shown in FIG. 1A. The electronic chip 18' includes a plurality of electronic devices such as, for example, sensors, receivers, transmitters, transceivers, power supplies, memory, micro-processors, micro-controllers, analog to digital converters, and combinations thereof. The electronic chip 18' can be arranged with a wide range of combinations of one or more of these components. In one particular embodiment (FIG. 32), the electronic chip 18' includes a circuit board having a processor 102, a transceiver 104, memory 106, the sensor 76, a transmitter 108, a receiver 110 and the power supply (battery 122). The processor 102 is preferably a micro-processor or a micro-controller capable of processing algorithms, routines, programs and/or applications. The processor 102 can include a timer or sample rate capability. The memory 106 is operably associated with the processor 102 and is used to store data, instructions, programs, and files. The memory 106 can include read only memory and random access memory.

The transceiver 104 is a combination of a receiver and a transmitter that is operably coupled to the processor 102. The transceiver can be coupled to an antenna. The transceiver 104 can send or receive a signal, such as the electronic signal 66, and to exchange information and data with a remote outside sensor, a receiver, a server, a computer, a network of computers or the Internet. The transmitter 108 and the receiver 110 can also be used to send and receive, respectively, a signal representing information and data for communication with a remote sensor, transmitter, receiver, server, computer, computer network or the Internet. The transmitter 108 and receiver 110 along with the battery 96 and the sensor 76 are also operably coupled to the processor 102.

FIG. 33 illustrates football 210, an example implementation of football 10. Football 210 comprises multiple independently illuminated features facilitating overall illumination and communication. In the example illustrated, football 210 comprises panel lighting 212, stripe lighting 213, logo lighting 214, lace lighting 216, lace base lighting 217, and lace base border lighting 218. Panel lighting 212 provides overall illumination for football 210, allowing football 210 to be better seen in lowlight conditions. In the example illustrated, electronic chip 18, bladder 14, 14', 14", outer cover panels 24, 26, 28, 30 and the one or more intermediate panels between bladder 14, 14', 14" are configured to provide panel lighting 212. As shown by FIG. 33, electronic chip 18 (schematically shown in FIG. 1A and described above) is centrally supported within football 210. Electronic chip 18 comprises light emitters 124A. In the example illustrated, light emitters 124A comprise one or more light emitting diodes supported on opposite sides of substrate 120. Because the electronic chip 18 is centrally supported within football 210 and because light emitters 124A are provided on opposite sides of substrate 120, light emitters 124A may illuminate four sides of football 210. In the example illustrated, to further facilitate uniform lighting across football 210, light emitters 124 each further comprise diffusers 221. Diffusers 221 comprise domes about the light emitting diodes of light emitters 124A which diffuse or disperse light throughout the interior football 210. In other implementations, diffusers 221 may have other configurations or may be omitted. As noted above, in some implementations, light emitters 124A are provided independent of electronic chip 18 on separate support structures. In some implementations, light emitters 124A are centrally supported within football 210 while electronic chip 18 is non-centrally located, such as external to bladder 14, 14', 14".

Bladder 14, 14', 14", outer cover panels 24, 26, 28, 30 and the one or more intermediate panels between bladder 14, 14', 14" are configured so as to be translucent or transparent, facilitating the transmission of light from light emitters 124A there through. In one implementation, selected portions of the exterior football 210 may be illuminated. For example, in one implementation, less than all of panels 24, 26, 28 and 30 may be made translucent or transparent. In one implementation, panels 26 and 28 are translucent or transparent, wherein the majority of panels 24, 30 are opaque. In yet another implementation, two opposite panels 26, 30 or 24, 28 are translucent or transparent while the other two opposite panels are opaque. In some implementations, the selective illumination of panels 24-30 may alternatively be achieved by selectively configuring portions of bladder 14 and/or the one or more intermediate layers (such as liner 40) to be translucent/transparent or opaque. In other implementations, only a portion of one or more of the panels can be configured to facilitate the transmission of light.

Stripe lighting 213 provides illumination of stripes 20. FIG. 34 is fragmentary sectional view illustrating one example implementation of stripe lighting 213. As shown by FIG. 34, stripe panel portion 223 and light emitter 224A provide stripe lighting 213. Stripe panel portion 223 comprises a portion of each of cover panels 24, 30 which is translucent or transparent to facilitate transmission of light L. In one implementation, portion 223 comprises a distinct strip laid upon panels 24, 30 or a distinct strip placed upon liner (or lining) 40 in place of cutout portions of panels 24, 30. In one implementation, the distinct strip providing portion 223 may comprise the translucent or transparent foam. In one implementation, portion 223 may have the same transmissive properties as that of panels 24, 30, wherein the distinctness of light L is provided by light emitter 224A. In such an implementation, portions 223 may not be distinguishable or discernible from adjacent portions of panels 24, 26 without illumination. In such an implementation, stripes 20 may be selectively added (such as for a high school or college football) or removed (such as for a professional or National Football League football) through the control of the illumination provided by light emitter 224A. In one implementation, where cover panels 24, 30 are translucent or transparent, stripe panel portion 223 may comprise a layer coated upon panels 24, 30, wherein the layer has light transmission properties distinct or different from cover panels 24, 30. For example, in one implementation, portions 223 coated or overlying panels 24, 30 may alter a wavelength, angle or color of light being transmitted.

Light emitter 224A comprises one or more devices to emit and direct light through portion 223. Light emitter 224A emits light in response to receiving control signals from controller 134 on electronic chip 18. In the example illustrated, light emitter 224 is inset within an exterior side of intermediate layer 40. In another implementation, light emitter 224 may be formed upon bladder 14, 14', 14", inset within an interior side of layer 40 or another intermediate layer) or inset on an interior side of portion 223. In one implementation, light emitter 224A comprises a flexible panel or substrate supporting one or more light emitting diodes or other electrically powered and signal controlled light emitting devices. In another implementation, the light emitter 224 can be integrally formed with portion 223 as one integrated sheet or layer. In the example illustrated, each of stripes 20 is provided with stripe lighting 213. In one implementation, each of stripes 20 is illuminated independent of the other of stripes 20. In other implementations, one of stripes 20 may be provided with stripe lighting 213 or stripe lighting 213 may be omitted.

Logo lighting 214 provides illumination of stylized portion 22. FIG. 35A is a fragmentary sectional view illustrating one example implementation of logo lighting 214. As shown by FIGS. 35 and 35A, light transmitters 225 and light emitter 224B provide logo lighting 214. Light transmitters 225 comprise light transmissive portions formed in panel 24 in the shape, outline or form of stylized portion 22 (shown as a series of alphanumeric characters). In the example illustrated, each of light transmitters 225 comprises perforations, holes, apertures or openings 226 through panel 24 and opposite to the light emitter 224B. In the example illustrated in FIG. 35, at least some of openings 226 additionally comprise a translucent or transparent filler 227 or translucent cover 228. Filler 227 and cover 228 inhibit opening 226 from becoming plugged or filled with opaque substances, such as dirt and grime. In one implementation, filler 227 or cover 228 may have light filtering properties so as to alter the wavelength, angle or color of light L being transmitted through a corresponding openings 226. In some implementations, different openings 226 of light transmitters 225 are filled or covered with different fillers 227 or different covers 228 having different light transmissive properties to provide the illumination stylized portion 22 with multiple different colored portions. For example, a properly colored or light filtering fillers 2 to 7 and/or covers 228 alone or in combination with the color of light provided by light emitter 224B may provide stylized portion 22 with colors associated with a particular team. For example, light emitter 224B and the color filtering provided by fillers 227 and/or covers 226 may provide stylized portion 22 with a green and gold color (associate with the Green Bay Packers) or a blue and orange color (associated with the Chicago Bears).

Although light transmitters 225 are illustrated as being formed in cover panel 24 (or another of cover panels 26, 28, 30), in other implementations, light transmitters 225 may alternatively be formed in other layers of football 210 exterior to light emitter 224B, wherein the additional layers overlying and external to light emitters 225 are translucent or transparent. In some implementations, light emitter 224B may be omitted, wherein light emitters 225 utilize light emitters 124A as a light source.

Light emitter 224B comprises one or more devices to emit and direct light through light emitters 225. Light emitter 224B emits light in response to receiving control signals from controller 134 on electronic chip 18. In the example illustrated, light emitter 224B is inserted within intermediate layer 40 between and in contact with cover panel 24 and bladder 14, 14', 14". In another implementation, light emitter 224B may be formed upon bladder 14, 14', 14", partially inset within an interior side of layer 40 (or another intermediate layer) or inset on an interior side of panel 24. In one implementation, light emitter 224B comprises a flexible panel or substrate supporting one or more light emitting diodes or other electrically powered and signal controlled light emitting devices. In another implementation, the light emitter 224 can be integrally formed with the stylized portion 22 of the cover panel 24 as one integrated sheet or layer. In some implementations, logo lighting 214 may be omitted.

Lace lighting 216, lace-base lighting 217 and lace-base boundary lighting 218 are illustrated in FIGS. 36 and 37. Lace lighting 216 provides illumination of laces 16. As shown by FIGS. 36 and 37, laces 16 and light emitters 224C to provide lace lighting 216. Laces 16 are configured so as to be translucent or transparent, transmitting light provided by light emitters 224C. In one implementation, laces 16 have a uniform light transmissive property across the exterior of football 210. In other implementations, laces 16 have different portions with different light transmissive properties such that different portions of laces 16 may filter light differently to provide different colors along laces 16. For example, different portions of laces 16 may filter light differently to provide laces 16 with multiple colors associated with a particular football team or other sport organization or commercial organization/entity.

Light emitters 224C comprise one or more devices to emit and direct light through laces 16. Light emitters 224C emits light in response to receiving control signals from controller 134 on electronic chip 18. In one implementation in which laces 16 comprise tubes a flexible material laced across and through panels 24, 30, light emitters 224C comprise at least one string of light emitting elements extending within such tubes. In other implementations in which laces 16 comprise bumps, protrusions or other structures replicating strung laces and welded, bonded, adhered to or molded as part of the exterior for ball 210 in the shape of strung or laced lacing, light emitters 224C may be contained in such laces 16 or provided below such replicas of lacing 16. In one implementation, each of the light emitting elements forming light emitters 224C are under a single control so as to be actuated or changed in unison such that lighting throughout and entirety of laces 16 changes in unison. In another implementation, light emitters 224C may have distinctly controlled illumination elements (through multiple electrical lines or leads). For example, in one implementation, overlapping rib portion 230A of laces 16 may contain light emitting elements 231A (shown in FIG. 37) of light emitter 224C that emit a different light with a different characteristic (color, brightness etc.) as compared to light emitting elements 231B received within (or underlying) rib portion 230B of laces 16. Such different combinations of colors or other characteristics of different rib portions of laces 16 may indicate current operational settings for football 210, may have sets of colors associated with a particular team, or may indicate and provide instruction with regard to suggested finger placement or gripping of football 210. In some implementations, lace lighting 216 may be omitted.

Lace base lighting 217 illuminates region or portions 17 which underlie or extend about laces 16. As compared to other portions of football 210, portions 17 are more likely to be discerned due to their proximity to laces 16. As a result, information communicated through lace base lighting 217 is more likely to be seen. Such lighting further enhances visibility of laces 16, allowing laces 16 to be more quickly located in lowlight conditions.

As shown by FIGS. 36 and 37, cover panel portions 232, intermediate layer portion 234 and light emitter 224D provide lace base lighting 217. Portions 232 and 234 comprise translucent or transparent portions that are integral with, mounted upon, inset between or inset within outer cover panels 24, 30, and intermediate layer 40. In one implementation, portions 232 are no different than adjacent portions of panels 24, 26 outside of region 17. In other implementations, one or more of portions 232 and/or 234 have light filtering characteristics different than that of adjacent portions of panels 24, 26 or a layer 40 outside of region 17, wherein portions 232 and/or 234 change a color or other characteristic of the light passing there through. In some implementations where portions 232 and/or 234 have light changing or light filtering characteristics distinct from adjacent portions outside of region 17 and where separate control of the panel lighting 212 and lace base lighting 217 is not to be provided, light emitter 224D may be omitted, utilizing light emitters 124A as a source of light.

Light emitter 224D comprises one or more devices to emit and direct light through portions 232, 234. Light emitter 224D emits light in response to receiving control signals from controller 134 on electronic chip 18. In the example illustrated, light emitter 224B is inserted within a recess on an internal side of intermediate layer 40 and bladder 14, 14', 14". In another implementation, light emitter 224D may be inset on an interior side of panel 24. In one implementation, light emitter 224D comprises a flexible panel or substrate supporting one or more light emitting diodes or other electrically powered and signal controlled light emitting devices. In some implementations, lighting 217 may be omitted.

Lace base border lighting 218 illuminates a border about region 17. As shown by FIG. 36, border lighting 218 is provided by light emitter 224E. Light emitter 224D emits light in response to our based upon control signals received from controller 134 on electronic chip 18. In one implementation, light emitter 224D comprises a string of light emitting elements along a border of region 17. In another implementation, light emitter 224D comprises a flexible tube, string, optical fiber, line or other continuous elongate member formed from a light transmitting material, such as acrylic or other polymers, so as to function as a light pipe or light tube 233. In such an implementation, the light pipe 233 is stitched into at least cover panels 24, 30 along a border region 17 and transmits light received from an internal light source 234 located at an axial end of the light pipe. In one implementation, the light source to the light pipe comprises one or more light emitting diodes which operate under the control of controller 134. In other implementations, the light pipe can be positioned at other locations about the football 210 other than the border of region 17.

Panel lighting 212, stripe lighting 213, logo lighting 214, lace lighting 216, lace base lighting 217 and lace base border lighting 218 may be illuminated in any one of a multitude of different manners depending upon a selected mode of operation under the control of controller 134. Controller 134 selects which of the multiple modes to implement in response to signals received through transceiver 133, in response to signals received through grip sensor 132 or through an embedded microphone informal 210 and speech recognition software or programming.

According to a first mode of operation, controller 134 actuates light emitters 124A from an off state to an on state in response to control inputs from a person to illuminate football 210 as desired in lowlight conditions. For example, in response to receiving inputs through grip sensors 132, controller 134 may turn on light emitters 124A. In another implementation, controller 134 generates control signals for light emitters 124A in response to or based upon signals received from light sensors 127 to provide overall lighting for football 210. For example, in response to receiving signals from light sensor 127 indicating that ambient lighting or environmental lighting has fallen below a predefined threshold, controller 134 may generate control signals turning on light emitters 124A. In some implementations, in response to receiving signals from light sensors 127, controller 134 may actuate light emitters 124A between one of multiple different lighting levels. For example, as ambient lighting darkens below each of a series of thresholds, controller 134 may generate control signals increasing the brightness or intensity of light being emitted by light emitters 124A in a stepwise or continuous fashion. This may be achieved by increasing the wattage of the light being emitted or by increasing the number of light emitting diodes or other lighting elements that are providing light. Similar adjustments to the brightness or intensity of light being emitted by any of the light emitters of football 210 may made by controller 134 based upon the sensed a detected ambient lighting conditions. As ambient lighting conditions become darker, controller 134 may generate control signals causing the light emitted by any of the various light emitters of football 210 to be brighter. In another implementation, the light emitters 124 can be actuated through a remote electronic device.

According to the first mode of operation, controller 134 utilizes stripe lighting 213 to communicate or indicate momentary performance and aggregate performance. Controller 134 generates control signals adjusting lighting characteristics of stripe lighting 213 suspected one of stripes 20 to indicate momentary performance and adjust lighting characteristics of stripe lighting 213 associated with the other of stripes 20 to indicate long-term or aggregate performance. Lighting characteristics of stripe lighting 213 of one of stripes 20 communicate momentary performance results such as football travel velocity or spiral efficiency based upon signals from motion sensor 128 or location sensor 131. Other examples of momentary performance results that may be indicated by adjustment of the lighting characteristics of stripe lighting 213 include, but not limited to, a miss or make determination for a field goal (based upon signals from location sensor 131), surpassing a particular hang time goal on a punt (based upon signals from time are 123 and motion sensor 128), surpassing a particular distance threshold on a kickoff or punt (based upon signals from location sensor 131), and landing a kickoff or punt at a particular location (within the 10 yard line) (based upon signals from location sensor 131).

Controller 134 further generate control signals adjusting lighting characteristics of stripe lighting 213 with respect to the other of stripes 20 to communicate aggregate performance. For example, in one implementation, controller 134 tracks field goal makes versus attempts, wherein controller 134 generates different control signals causing stripe lighting 213 to emit a different characteristic light (such as a different color, frequency, brightness etc.) based upon the current field-goal percentage of a person using football 10. For example, when a player achieves a field-goal percentage of at least 50% from a particular yardage, controller 134 generates control signals causing a first color light to emitted by stripe lighting 213 and when the player achieves a second greater field-goal percentage from the same yardage of say, at least, 60%, controller 134 generates control signals causing a second different color light to be emitted by stripe lighting 213 football 10. If a player's field-goal percentage falls below a predefined threshold, controller 134 generates control signals once again changing the color of light emitted by football 10. In such an implementation, the color, pulse frequency, brightness etc. of football 10 provides the player with a visual motivational tool. In some implementations, the visible color may further indicate to others, such as a player's coach, the current field-goal percentage, offering additional opportunities for encouragement. In addition to tracking field-goal percentages, controller 134 may be configured to track and adjust lighting characteristics based upon other statistics such as average or maximum punt distances, average or maximum kickoff distances, average or maximum kickoff trajectories, average or maximum throw distance, average or maximum throw velocity, average spiral efficiency, maximum spiral efficiency, minimum spiral efficiency and the like. In some implementations, the color of the particular stripe 20 provided by stripe lighting 213 may serve as a badge or reward for achieving one or more milestones.

According to the first mode, controller 134 utilizes logo lighting 134 to illuminate logo or stylized portion 22 for product recognition and additionally utilizes logo lighting 134 to indicate a detected pressure level within bladder 14, 14', 14". For example, when the detected pressure within bladder 14, 14', 14" is within a predefined acceptable range, logo 14 may have a predefined illumination characteristics or may not be illuminated at all. However, upon receiving signals from pressure sensor 130 indicating that football 210 is underinflated or overinflated, controller 134 generates control signals causing the lighting characteristics of light emitter 224B to change. For example, if football 210 is underinflated or deflated, controller 134 may illuminate stylized portion 22 with a red light. If football 210 is overinflated, controller 134 may illuminate stylized portion 22 with a yellow light. In yet other implementations, football 210 may include a surface located digital display by which controller 134 provides a numerical pressure value for inflation value of football 210.

According to the first mode of operation, controller 134 utilizes lace lighting 216 to communicate other momentary or aggregate performance results. According to the first mode of operation, controller 134 utilizes lace boundary lighting 217 to communicate time information. Such as the expiration of a predefined length of time following a snap of the football (indicating when a quarterback should have passed the football to avoid a sack, indicating when a pass rush may be initiated, such as in-flight football, indicating when a kick or punts should have been completed or the like) (as determined by signals from motion sensor 128 and timer 123). Because such information is communicated by adjusting lighting characteristics of region 217, adjacent to laces 16, the likelihood that the timing information will be timely seen is enhanced. For example, when controller 134 utilizes lace base lighting 216 to indicate when a quarterback should have released the football after the snap, the cornerback is more likely to see such lighting when positioned around laces 16 as compared to other portions of football 210.

According to the first mode of operation, controller 134 utilizes lace base boundary lighting 218 to indicate a detected location of football 210. For example, controller 134 may adjust a lighting characteristic of lighting 218 when controller 134 determines that football 210 has passed a first down marker or is crossed the goal line based upon signals from location sensor 131. The illumination of boundary lighting 218 may remain in a particular state for a predefined period of time following the time after which ball 10 has crossed the goal line or the first down marker. In one implementation, the characteristic of lighting 218 may change from a non-turnoff state in response to a location threshold being passed by football 210. In another implementation, characteristics of lighting 218 may change from a first on lighting state to a second on lighting state when a location threshold are marker has been passed by football 210.

In other implementations, controller 134 may operate under other chosen modes wherein panel lighting 212, stripe lighting 213, logo lighting 214, lace lighting 216, lace base lighting 217 and lace base boundary lighting 218 have lighting characteristics adjusted by controller 134 to communicate other information or provide other lighting effects, such as, for example the implementations described herein. In some implementations, panel lighting 212 may be omitted, wherein football 210 is illuminated at the predefined portions of stripes 20, logo or stylized portion 22, laces 16, lace base region 17 and the boundary of lace base region 17. In some implementations, one or more of the light emitters 224 may be omitted, wherein the associated lightings 213, 214, 216, 217, 218 utilizes light from light emitter 124A (or from light emitters 124B, 124C). In one implementation, as shown by FIG. 33, one or more of lightings 213, 214, 216,

217, 218 may utilize light from light emitter 124B instead of the associated above-described light emitters 224, wherein light emitter 124B includes a lens or other optical element 219 which focuses or concentrates light from light emitter 124B to a particular portion of football 210. In the example illustrated, logo lighting 214 may utilize light LL from light emitter 124B and focused upon the region of football 210 including light transmitters 225 such that light emitter 224B may be omitted.

FIG. 37 further illustrates one example implementation of grip sensors 132. Grip sensors 132 comprise a touch, pressure, optical or contact sensors located in configured to sense a person's hand gripped against or least partially about football 210. In the example illustrated, grip sensors 132 comprise multiple sensor elements 236 located along laces 16. In one implementation, sensor elements 236 located between adjacent ribs 230 of laces 16. As a result, ribs 230 of laces 16 serve as locators for indicating a position centered over and associated sensor element 236. In one implementation, sensor element 236 is provided as part of a string of sensor elements 236 extending within the tubular material of laces 16 extending beneath ribs 230. In other implementations, sensor elements 236 may be formed beneath laces 16 or within the layers of football 210 underlying laces 216. Each sensor element 236 provides a distinct signal when a person's finger overlies, is in contact with or applies pressure to the particular sensor element 236. As noted above, sensing elements 236 of grip sensor 132 are used by controller 134 to receive commands or inputs, such as which mode of operation controller 134 is to operate, as well as to sense how a person is gripping football 210. In some implementations, grip sensor 132 may further indicate when a person has thrown or released a football (as an alternative or a confirmation of such a determination by motion sensor 128 and location sensor 131).

Figure 38:
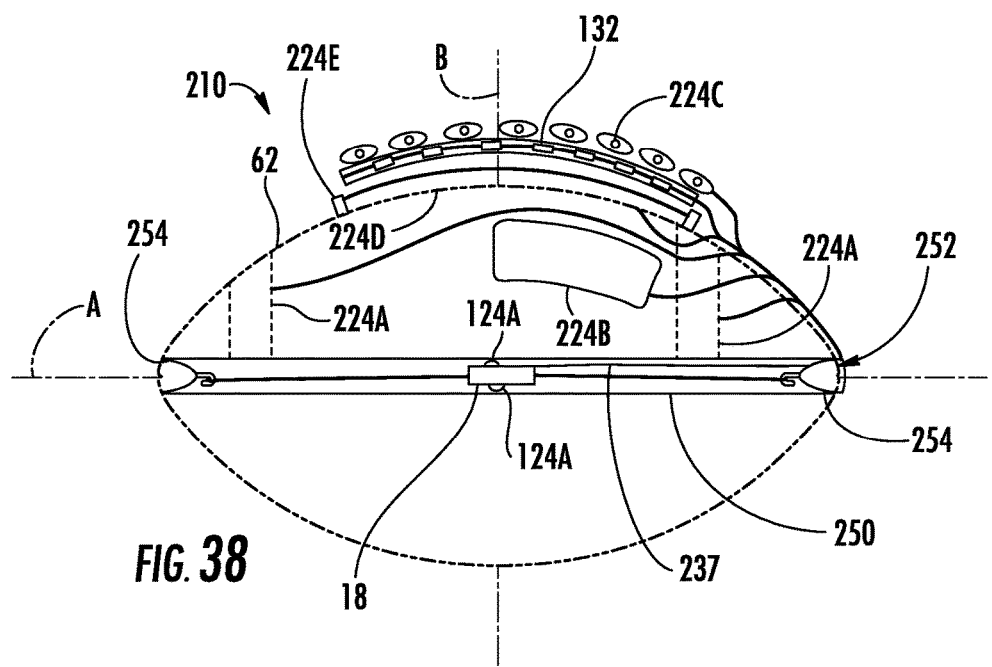
FIG. 38 is a sectional view of another example implementation of the football of FIG. 1.

FIG. 38 illustrates portions of one embodiment of football 210, wherein football 210 employs bladder 14'. FIG. 38 illustrates one example implementation by which circuit chip 18, located at a central portion of football 210, communicates with light emitters 224A, 224B, 224C, 224D and 224E (collectively referred to as light emitters 224), and grip sensor 132. In the example illustrated, electronic chip 18, including controller 134, communicates with light emitters 224 and grip sensor 132 in a wired fashion using multi-lead wire 237 which extends from the electronic chip 18, through tubular portion 250, between tubular portion 250 and plug 254 and along an exterior of bladder 14' to each of light emitters 224 and grip sensor 132. In one implementation, wire 237 extends along and in contact with exterior surface of bladder 14'. In another implementation, wire 237 extends between any of the various layers between bladder 14' and outer cover 12 (shown in FIG. 2). As shown by FIG. 38, tubular portion 250 of bladder 14' facilitates location of light emitters 124A and electronic chip 18 at a central portion within football 210 and facilitates communication between chip 18 and light emitters 224 and grip sensor 132, external to bladder 14', without wire 237 passing through wall of bladder 14'. As a result, wire 237 is less likely to impair the structural integrity of bladder 14'.

Figure 39:
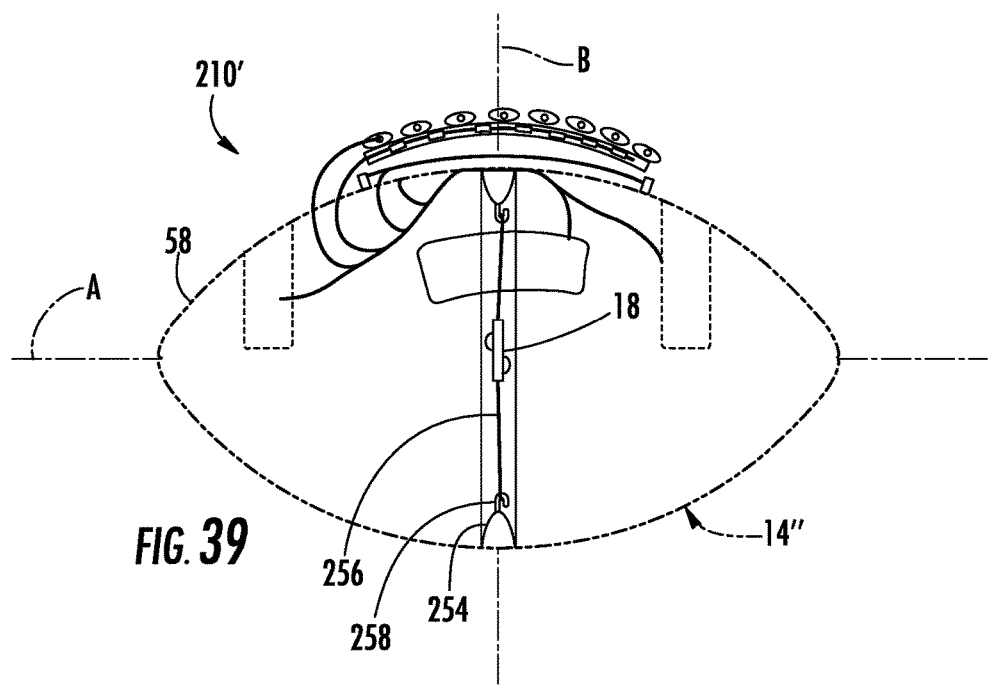
FIG. 39 is a sectional view of another example implementation of the football of FIG. 1.

FIG. 39 illustrates football 210', another implementation of football 210. Football 210' is similar to football 210 except of football 210' comprises bladder 14" in place of bladder 14'. As with bladder 14', bladder 14" of football 210' facilitates location of light emitters 124A and electronic chip 18 at a central portion within football 210 and facilitates communication between chip 18 and light emitters 224 and grip sensor 132, external to bladder 14", without wire 237 passing through wall of bladder 14". As a result, wire 237 is less likely to impair the structural integrity of bladder 14".

Figure 40:
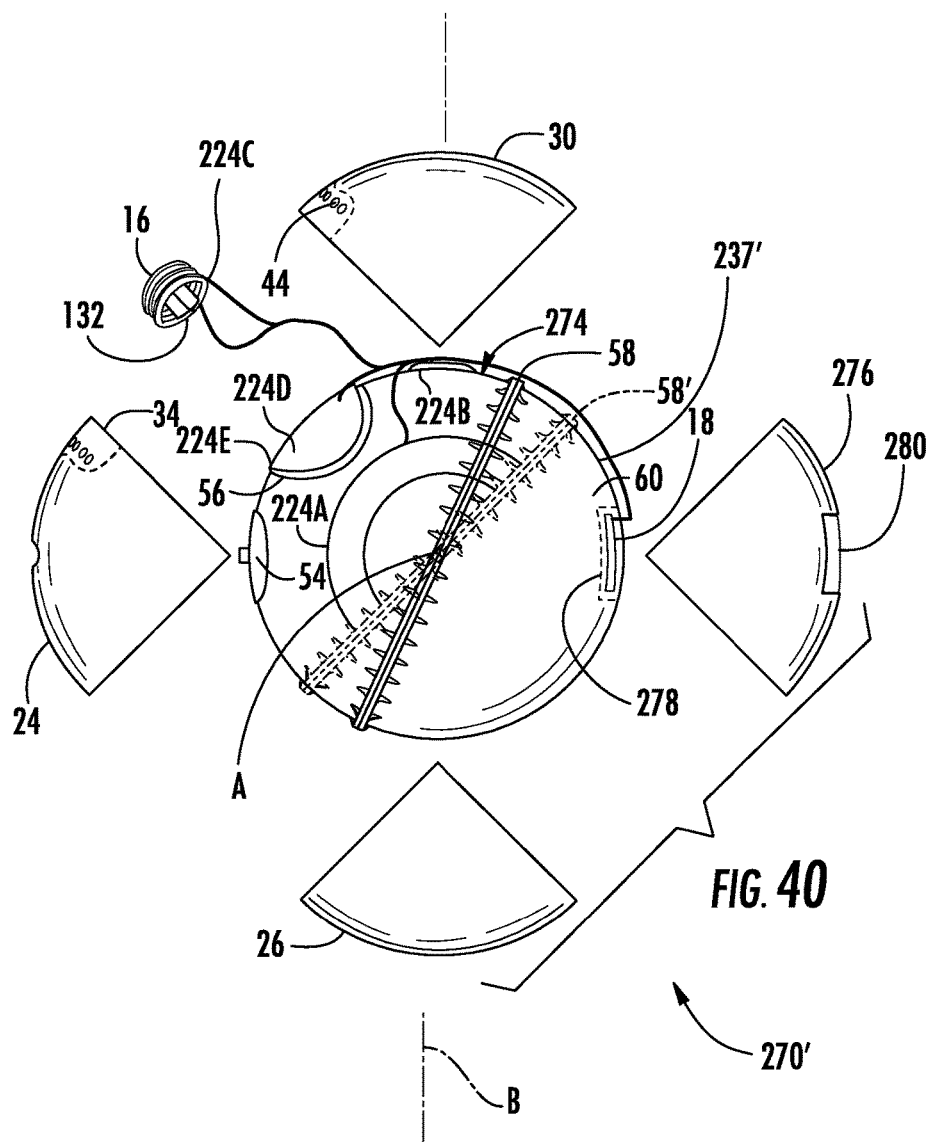
FIG. 40 is an exploded end view of an example implementation of the football of FIG. 1.

FIG. 40 illustrates football 270', an implementation of football 270 specifically illustrated as including stripe lighting 213, logo lighting 214, lace lighting 216, lace base lighting 217, lace base boundary lighting 218 and grip sensor 132 shown and described above with respect to football 210. As shown by FIG. 40, electronic chip 18 is located within pocket 278 and communicates with each of light emitters 224 in a wired fashion utilizing multi-lead cable or wire 237'. In the example illustrated, wire 237' extends from chip 18 out-of-pocket 278 and along an exterior of bladder 274 to each of light emitters 224 and grip sensor 132. In one implementation, wire 237' extends along and in contact with exterior surface of bladder 274. In another implementation, wire 237' extends between any of the various layers between bladder 14' and outer cover 12 (shown in FIG. 2). In yet other implementations, controller 134 on chip 18 may communicate with wire transmitters 224 in a wireless fashion, such as through Bluetooth communication or RFID communication, wherein emitters 224 are connected to a local communication antenna or transceiver.

Figure 41:
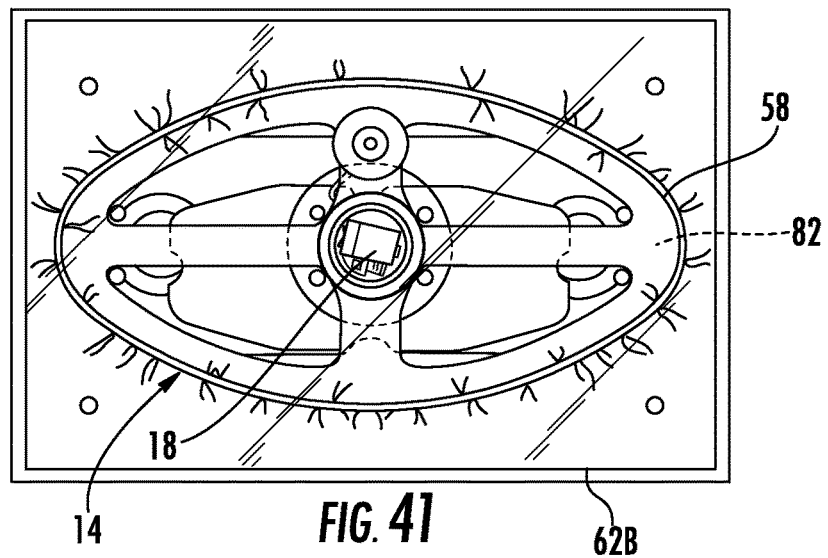
FIGS. 41 through 43 are top views of a completed bladder in accordance with an example method.
Figure 42:
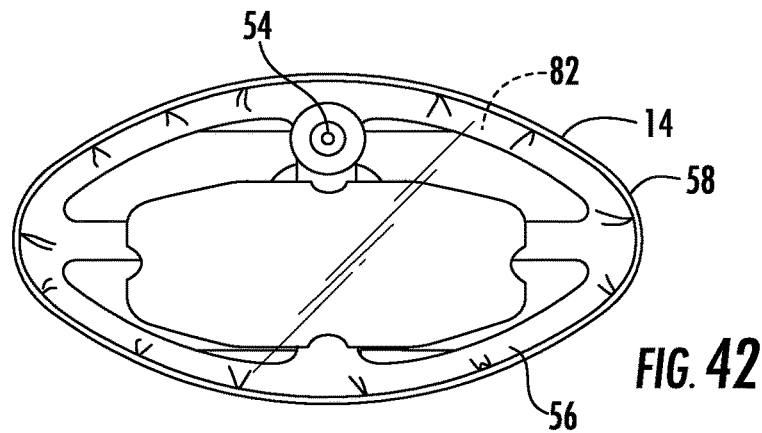
Figure 43:
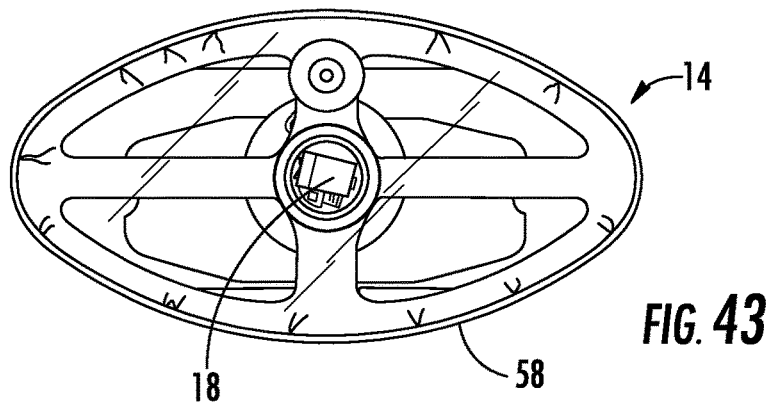

FIGS. 41-43 illustrate the bladder 14 in a deflated state following the removal of the second bladder die 240 after the press and RF welding is completed. The excess material of the first and second sheets 62A and B outside of the bladder seam 58 is then removed, and preferably recycled. As in the formation of the pocket 64, in one preferred method, a series of perforations can be formed in the sheets 62A and 62B just outside of the bladder seam 58 to facilitate the trimming or removal of the excess material of the sheets 62A and 62B from the completed bladder 14.

Figure 44:
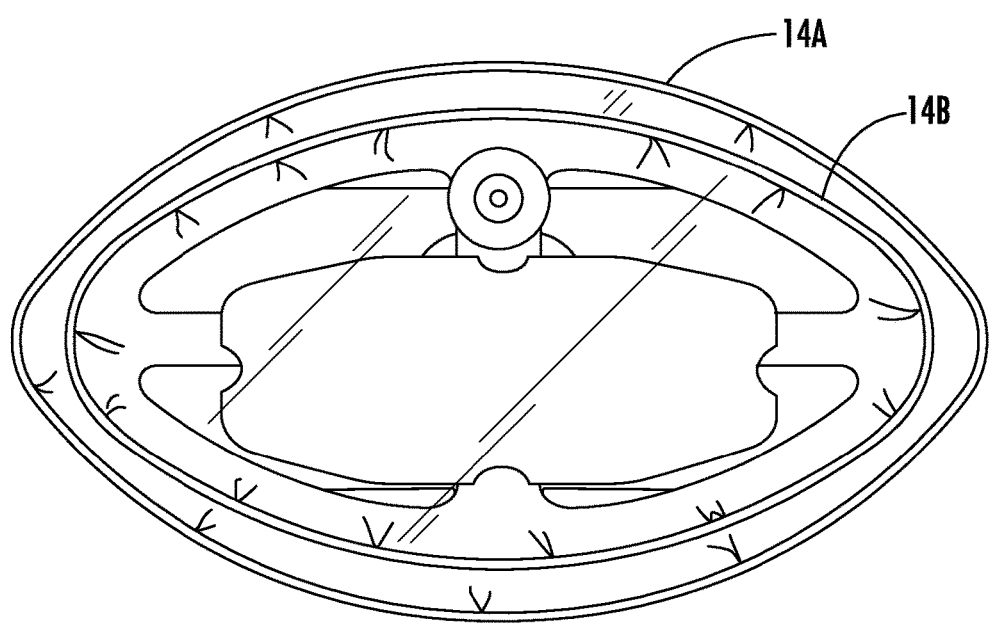
FIG. 44 a side view of two deflated bladders produced in accordance with an example method.

Referring to FIG. 44, two completed bladders 14A and 14B are shown. The bladders are formed of two different sizes. Both bladders 14A and 14B are configured to be inserted within regulation sized American-style football covers. Once assembled within the football 10, the bladder 14A or 14B within the football 10 expands when inflated and the sheets 62 or outer side walls of the bladder 14A or 14B bear against the lining 40 of the cover 12 of the football 10. The bladder 14A represents a traditionally sized bladder for an Official NFL® Football. The bladder 14B, when measured in a deflated condition, has extends over a two dimension area that is up to 40% smaller than a regulation sized bladder (such as the bladder 14A). In one particularly preferred embodiment, the bladder 14B when deflated extends over a two-dimensional area that is approximately 25% smaller than a regulation sized bladder, such as the bladder 14A. In other preferred embodiments, other predetermined bladder sizes relative to the size of the volume within the cover of a football are contemplated for producing varying amounts or a desired amount of tension onto the cross-member of the bladder.

Because the bladder 14A or 14B takes the shape of the internal surface of the cover 12 when fully assembled and inflated, the size of the bladders 14A and 14B including the cross-members 82 can be used to adjust the tautness or stiffness of the fully assembled bladder 14 within the football 10. The bladder 14B is smaller than the bladder 14A and therefore can expand a greater amount within the football 10 until it bears against the inside of the cover 12. This increased expansion of the bladder 14B, t and the cross-member 82 increases the tension applied to the cross-member 82 as the bladder 14B and the bladder seam 58 expand within the football 10. When the football 10 is pressurized, the stretched or expanded cross-member 82 bonded to the sheets 62 at the bladder seam 58 produces sufficient tension and tautness to the cross-member 82 that the electronic chip 18 remains generally fixed in a predetermined position. The movement of the electronic chip 18 upon shaking or impacting the football 10 is significant reduced by increasing the stiffness, tension, or tautness of the cross-member 82 in this manner. This innovative method of increasing tension on the cross-member 82 by expanding the bladder 14 within the cover 12 of the football 10 provides for the proper and sufficient positioning of the electronic chip 18 within the bladder 14 without having to use heavier materials or adding addition support structure within the bladder or the football to retain the electronic chip in a predetermined position during use.

Figure 45:
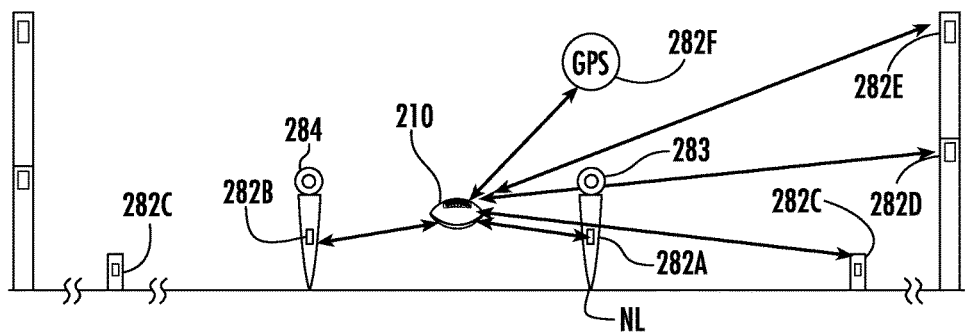
FIG. 45 is a side elevational view of an implementation for indicating a location of the football of FIG. 33.
Figure 46:
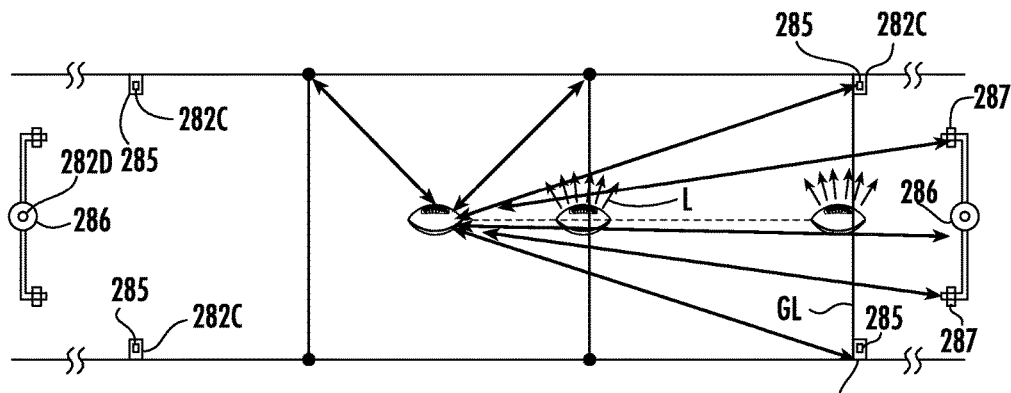
FIG. 46 is a top view of the implementation of FIG. 45 are indicating a location of the football of FIG. 33.

FIGS. 45 and 46 illustrate one example implementation of football 210 being selectively illuminated by controller 134 and one or more light emitters 124, 224 to indicate the position or location of football 210. In one implementation controller 134 changes lighting characteristics of football 210 in response to: football 210 crossing a first down marker, in response to football 210 crossing the goal line and in response to football 210 passing through goalposts during a field goal or extra point. In one implementation, to determine when football 210 has passed a first down marker (also known as the "necessary line"), location sensor 131 of football 210 utilizes one or more location identifiers. In the example illustrated, location sensor 131 (schematically shown in FIG. 1A) utilizes signals received from one or more of location identifiers 282A, 282B, 282C, 282D, 282E and/or 282F (collectively referred to as identifiers 282). Location identifier 282A comprise a device carried by first down marker 283 at the end of the chain that emits signals that are used by location sensor 131 in a determination of the location of football 210 relative to the first down marker or necessary line. Location identifier 282B comprise a device carried by the trailing marker at the beginning of the chain which indicates initial line of scrimmage for a set of downs, wherein location identifier 282B emits signals that may be used by location sensor 131 in a determination of the location of football 210 relative to the initial line of scrimmage and therefore the location of football 210 relative to the necessary line. In one implementation, location sensor 131 receives signals from both identifiers 282A and 282B using transceiver 133 in determining the location of football 210 relative to the necessary line NL (first down). In other implementations, location sensor 131 may utilize only one of identifiers 282A and 282B.

As shown by FIG. 46, in response to determining that some portion of football 210 has crossed the necessary line, controller 134 generates control signals changing the illumination characteristics of football 210. In the example illustrated in which lace base boundary lighting 218 is utilized to indicate positioning of football 210, controller 134 changes the illumination characteristics of lighting 218. In one implementation, once controller 134 has determined that football 210 has crossed the necessary line, lighting 218 is activated or turned on to emit light L. In another implementation, once controller 134 has determined that football 210 has crossed the necessary line, lighting 218 changes color, brightness or pulse frequency.

By changing illumination characteristics of football 210 during a play to indicate whether the necessary line has been crossed, controller 134 facilitates use of a replay to determine when in time the football crossed the necessary line, reducing the likelihood that the first down indication will be provided as a result of movement of the football after a play has ended. In other implementations, to reduce a likelihood that the first down indication will be provided as a result of movement of the football after a play is ended, controller 134 may receive signals indicating when a play has ended, wherein any further movement of football 210 after the play has ended will not result in lighting characteristics being changed by controller 134. For example, in one implementation, controller 134 may receive signals through transceiver 133 indicating when the whistle was blown or the play is ended. Such signals may be provided by a referee or other person using an electronic device remote from football 210. In yet another implementation, sound emitter 126 may additionally comprise a microphone for sensing sound such as a whistle, allowing controller 134 to determine when a play has officially ended.

In one implementation, the changed state of lighting 218 is maintained for a predetermined time following the time at which football 210 crosses the necessary line. In yet another implementation, the change of the illumination state of lighting 218 to indicate a first down may occur on a delayed basis so as to not distract actual play during a play. For example, the change of the illumination state of lighting 218 to indicate a first down may occur after a first down is achieved and after signals from motion sensor 128 indicate stationery positioning of football 210 for a predetermined period of time. The change of illumination state of lighting 218 to indicate a first down may alternatively be delayed or not present at all until controller 134 receives an input or command requesting a first down status illumination display. For example, if after a play, there is a question as to whether or not football 210 crossed the necessary line, a referee or other person may request a first down illumination status by transmitting a request signals from an external electronic device to controller 134 through transceiver 133. Alternatively, a referee or other person may request a first down illumination status by manually inputting a request using grip sensor 132.

Location identifiers 282 comprise devices associated with or carried by goal line pylons 285 that are configured to emit signals that are used by location sensor 131 in a determination of the location of football 210 relative to the goal line. In one implementation, location sensor 131 receives signals from both each of identifiers 282C using transceiver 133 in determining the location of football 210 relative to the goal line. In other implementations, location sensor 131 may utilize less than all four of identifiers 282C when making such a goal line determination.

Location identifiers 282D comprise devices associated with or carried by goal posts 286 that are configured to emit signals that are used by location sensor 131 in a determination of the location of football 210. In one implementation, signals from location identifiers 282 are used by location sensor 131 and controller 134 in determining whether football 210 has crossed the goal line GL. In some implementations, signals from location identifiers 282 are for the use by location sensor 131 and controller 134 in determining whether football 210 has passed through or above the bars of the goalpost 286.

As shown by FIG. 46, in response to determining that some portion of football 210 has crossed the goal line, controller 134 generates control signals changing the illumination characteristics of football 210. In the example illustrated in which lace base boundary lighting 218 is utilized to indicate positioning of football 210, controller 134 changes the illumination characteristics of lighting 218. In one implementation, once controller 134 has determined that football 210 has crossed the goal line, lighting 218 is activated or turned on to emit light L. In another implementation, once controller 134 has determined that football 210 has crossed the goal line, lighting 218 changes color, brightness or pulse frequency. In circumstances where football 10 crosses both the necessary line and the goal line in a single play, controller 134 indicates the crossing the goal line but does provide the indication of whether the football as crossed the necessary line.

By changing illumination characteristics of football 210 during a play to indicate whether the goal line has been crossed, controller 134 facilitates use of a video replay to determine when in time the football crossed the goal line, reducing the likelihood that the touchdown indication will be provided as a result of movement of the football after a play has ended. In other implementations, to reduce a likelihood that the touchdown indication will be provided as a result of movement of the football after a play is ended, controller 134 may receive signals indicating when a play has ended, wherein any further movement of football 210 after the play has ended will not result in lighting characteristics being changed by controller 134. For example, in one implementation, controller 134 receives signals through transceiver 133 indicating when the whistle was blown or the play is ended. Such signals may be provided by a referee or other person using an electronic device remote from football 210. In yet another implementation, sound emitter 126 may additionally comprise a microphone for sensing sound such as a whistle, allowing controller 134 to determine when a play has officially ended.

When it has been determined that football 210 has crossed the necessary line, in one implementation, the changed state of lighting 218 is maintained for a predetermined time following the time at which football 210 crosses the goal line. In yet another implementation, the change of the illumination state of lighting 218 to indicate a touchdown may occur on a delayed basis so as to not distract actual play during a play. For example, the change of the illumination state of lighting 218 to indicate a touchdown may have occurred after a first down is achieved and after signals from motion sensor 128 indicate stationery positioning of football 210 for a predetermined period of time. The change of illumination state of lighting 218 to indicate a first down may alternatively be delayed or not present at all until controller 134 receives an input or command requesting a touchdown status illumination display. For example, if after a play, there is a question as to whether or not football 210 crossed the goal line, a referee or other person may request a touchdown illumination status by transmitting a request signals from an external electronic device to controller 134 through transceiver 133. Alternatively, a referee or other person may request a touchdown illumination status by manually inputting a request using grip sensor 132.

In one implementation, football 210 may similarly use signals received from one or more of locations identified as 282C and/or 282D to determine whether football 210 has passed the goal line from the other direction so as to determine whether a safety should be rewarded to the defense.

Location identifiers 282E comprise devices mounted upon, within or otherwise carried by each of the two vertical bars 287 of goalpost 286. Identifiers 282E emit signals which are received by controller 134, utilizing transceiver 133, to determine whether football 210 has passed between the pair of vertical bars 287 of goalpost 286. In one implementation, signals from identifiers 282E are also used to determine a height of football 210 as it crosses the horizontal bar of goalpost 286. In other implementations, signals from identifier 282D may additionally or alternatively be utilized by controller 134 to determine whether football 210 has passed through goalposts 286 for a made field-goal or extra point.

Location identifier 282F comprises a global positioning system (GPS) which communicates with football 210. In such an implementation, location sensor 131 comprises a GPS antenna or receiver. Location identifier 282 is used to further confirm the positioning of football 210 with respect to necessary line NL, goal line GL or goalpost 286. In some implementations, location identifier 282F may be utilized in place of one or more of identifiers 282A, 282B, 282C and 282D. In other implementations, identifier 282F may be omitted.

In some implementations, controller 134 utilizes signals received from each of identifiers 282 to determine the position of football 210 relative to necessary line NL, goal line GL or goalposts 286. In some implementations, controller 134 may utilize signals received from additional location identifiers for enhanced positional accuracy or redundancy. In some implementations, in lieu of submitting signals which are received by controller 134 through transceiver 133 or location sensor 131 and in lieu of communicating with controller 134, location identifiers 282 may alternatively comprise ferromagnetic or magnetic markers which are sensed to determine positioning of football 210 relative to necessary line NL, goal line GL or goalpost 286. For example, location sensor 131 may additionally or alternatively comprise a magnetometer which sensors magnetic fields or polar magnetic fields to determine a location or position of football 10. In one implementation, the application instructs the user to stand at the approximate distance from a ferromagnetic goalpost or other ferromagnetic reference structure such as a ferromagnetic pylon 285 or a ferromagnetic marker 284. The user indicates where he or she is located (yard line) or distance from the ferromagnetic reference structure. The user is then instructed to throw the football or carry the football towards the ferromagnetic reference structure. The system uses the first location as a reference point and the first throw/carry as reference throw/carry (alternatively, the user can also indicate where the ferromagnetic reference structure is located). But with the reference throw/carry the system knows when it reaches the reference structure (the magnetometer senses the polar magnetic field, but also field from the metallic reference structure). The ferromagnetic reference structure creates the equivalent of some noise or alters the polar magnetic force slightly.

Once the system knows the initial throw position. It knows that the user was facing the reference structure at a known distance feet away, and that the user was directly in front of the reference structure. The location and throw/carry are subsequently utilized as a reference. Then, with all subsequent positions for football 10, such references are used to determine subsequent locations of the football. In one implementation, subsequent passes/throws, punts, kicks and other ball travel or positioning are analyzed using 6 degree of freedom sensors (one sensor covers 3 directions of ball movement with respect to the x, y and z axes, the second sensor is referencing gravitational pull with respect to the x, y and z axes, and the distance to the ground, and the magnetometer measures the strength of the magnetic field to know where it is in relation to north) and the magnetometer. Sensors can also be used to detect spin of the football 210 about the x, y and z axes.

Figure 47:
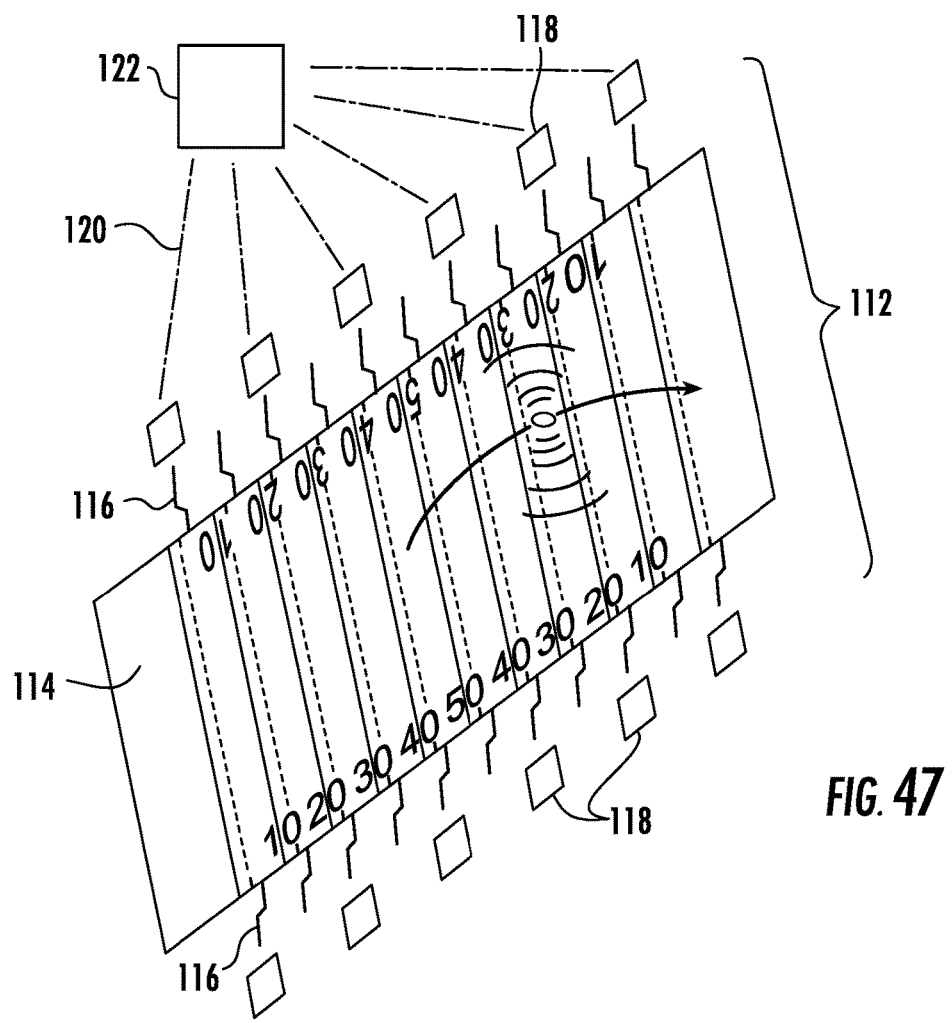
FIG. 47 is a schematic representation of a monitoring system for monitoring a football including electronics in accordance with a preferred embodiment of the present invention.

FIG. 47 illustrates football 210 (or football 10) used in association with a monitoring system 112 that monitors the football 210 over an entire football field 114. The football field 114 can be configured with an array of wires 116 for creating a magnetic field about the football field 114. Preferably, the array of wires 116 is configured to run beneath the football field 114. The array 116 can extend from one side of the field to the other at spaced apart intervals. The intervals can range from being quite small (within inches) to larger distances (100 yards apart or greater). Alternatively the array can take other paths about or beneath the field. A plurality of sensors 118 can be positioned adjacent the array of wires 116 beneath, over or near the football field 114. The sensors 118 also transmit one or more signals 120 representative of data or information relating to changes in the magnetic field due to movement of the football 10, 210 with respect to the field. The signals 120 are received by a receiver 122 which can be coupled to a remote reader, microprocessor, computer, transmitter, server, network of computers and/or the Internet. The sensors 118 and/or the receiver 122 can also process the signal 120 to desired usable information. The monitoring system can be used to monitor, detect and report: the exact position of the football 10, 210 on the football field 114; the movement of the football 210 on and about the football field 114; the speed, acceleration, deceleration, rotation, and path of the football 210; the forces applied to the football 10, 210 during use; the distance traveled by the football 10, 210; and the trajectory of the football 10, 210. The accuracy of the system 112 can be improved by the number and orientation of the array of wires 116 and the number of sensors under, on or about the football field 114. The system 112 can be configured to detect movement of a football 10, 210 on the football field 114 to within the nearest 10 millimeters. In other preferred embodiments, the electronic chip can include a GPS transmitter, receiver and/or transceiver. As noted above, in such implementations, controller 134 may generate control signals directing light emitters 124 and/or sound emitter 126 to provide specific visible or audible indicators communicating information regarding the motion of football 10, 210 or information with respect to the location of football 10, 210.

The football 10, 210 is configured to enable the electronic chip 18 to work under all foreseeable football game conditions, including rain, snow, mud, cold temperatures and hot temperatures. The football 10, 210 is also configured to perform reliably and accurately throughout play conditions including during and after kick-offs, punts, field goal attempts, passes, tackling and other football activities. The unique positioning of the electronic chip 18 within the football 10, 210 in the embodiments of the present invention allows for the football 10, 210 to withstand all foreseeable game conditions and game-related impacts.

Footballs 10 built in accordance with the present application are specifically configured for providing optimum performance in all levels of competitive, organized play. For example, the footballs built in accordance with the present application fully meet the football rules and/or requirements of one or more of the following basketball organizations: the National Football League ("NFL"); the National Collegiate Athletic Association ("NCAA"); the Football Rules of the National Federation of State High School Associations ("NFHS"); and the Football Rules of the Pop Warner Little Scholars, Inc. Leagues. Accordingly, the term "football configured for organized, competitive play" refers to a football that fully meets the football rules and/or requirements of, and is fully functional for play in, one or more of the above listed organizations.

Footballs built in accordance with the present invention will allow for more information about the game, and in particular the football, to be available to players, coaches, officials, football league representatives and fans. The present invention can be used to significantly improve the accuracy and integrity of official's decisions regarding important game issues such as determining whether the football crossed the goal line during a play and the forward progress of the football during a play. The present invention will enable an official to access such information quickly and easily. Footballs built in accordance with the present invention will also allow for additional important parameters of the football game to be available to officials, players, coaches and fans to improve the entertainment value of the game. The information obtained from footballs of the present invention can be used to provide a potential source of revenue for a football league. Information such as the speed of a thrown football, distance of a thrown or kicked football, etc. can be used to evaluate a player's performance level and can be useful for the growing fantasy football activity.

Footballs built in accordance with the present invention can be used to reduce the number of plays that require a replay review, or can be used to shorten the timeframe used to review a play. The present invention will reduce the likelihood of an incorrect call being made during a game that can improperly affect the outcome of a game. The present invention allows the accurate position of the football 10, 210 to be determined regardless if: the official had the proper view of the play; the replay cameras had a proper angle of the play; the players' bodies obscured the view of the football; and/or the player(s) repositioned the football after the play had been ruled dead.

Footballs built in accordance with the present invention will allow for important data to be communicated to a monitoring system without negatively affecting the play, feel and/or performance of the football. Footballs built in accordance with the present invention will possess the same durability and reliability of existing footballs, and provide the transmission and communication of information relating to the football under different weather conditions including rain, snow, and extreme temperature conditions. These important improvements to a football can be obtained under the present invention without departing from the football's traditional design.

Figures 48, 48A:
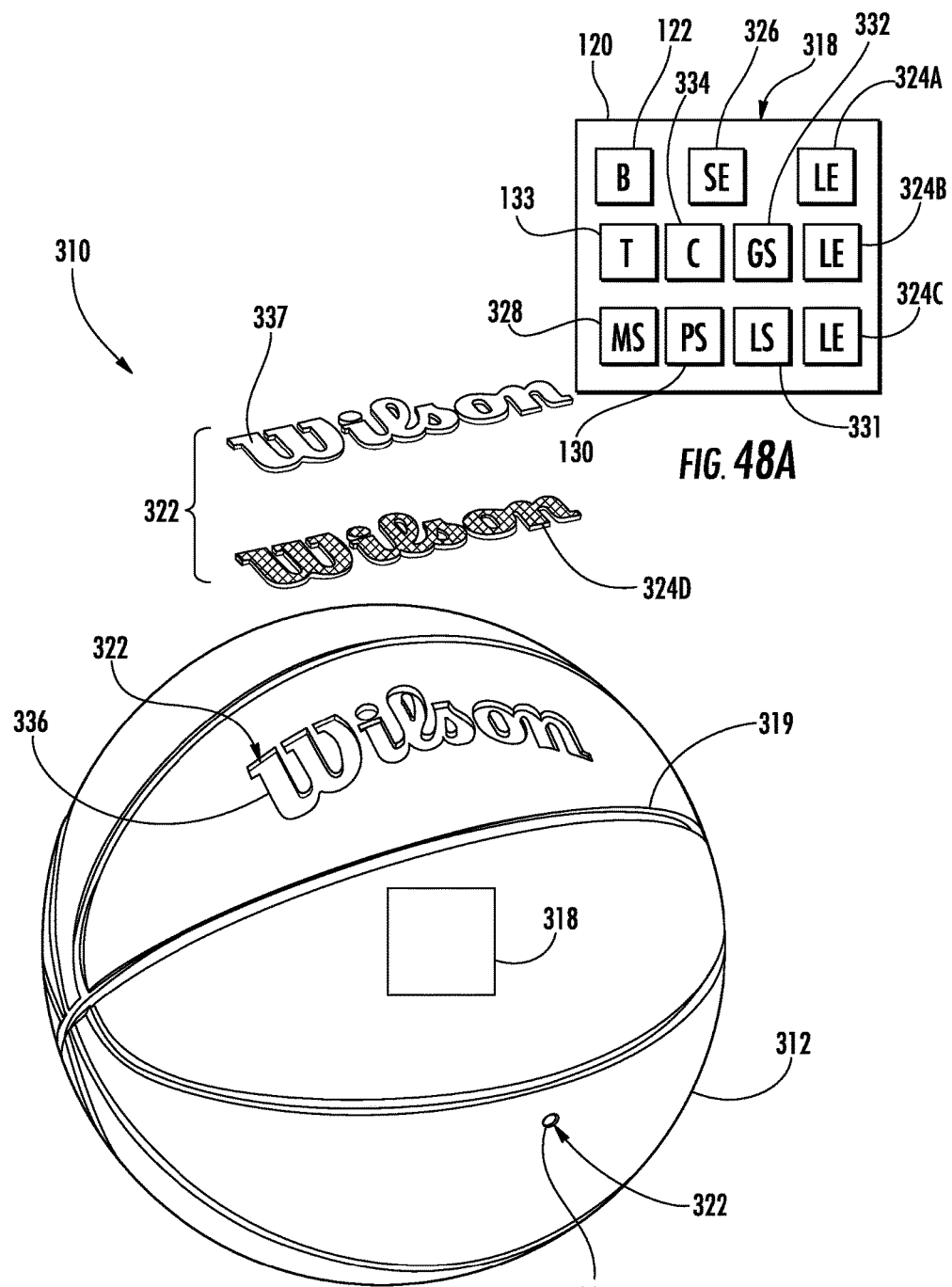
FIG. 48 is an exploded perspective view of an example basketball.
FIG. 48A is a schematic illustration of an example electronic circuit chip of the basketball of FIG. 48.

FIG. 48 illustrates basketball 310, another example of a sports or game ball. The basketball 310 is a generally spheroidal shaped inflatable object. The basketball 310 is configured to be grasped, dribbled, passed and shot by a player during use. As shown by FIG. 37, basketball 310 comprises bladder 314 (FIG. 48), windings 315, cover 316, and electronic chip 318. In some embodiments, the basketball 310 can also include one or more logos 322.

Bladder 314 comprises an inflatable sphere formed from materials such as butyl rubber, natural rubber, a combination of butyl and natural rubber, urethane, polymeric films, and other elastic materials. Bladder 314 can be formed in the same manner as bladder 14. The disclosure above with respect to bladder 14 can be applied to bladder 314. In one implementation, bladder 314 is made from 80% butyl rubber and 20% natural rubber. As will be described hereafter, in some implementations, some portions of bladder 14 or windows formed in bladder 14 may be formed from one or more transparent or translucent materials. The bladder 314 can be formed of a single layer or can be formed of two or more layers of material.

Windings 315 comprise a layer of wound reinforcing thread wound about or over bladder 314. In one implementation, prior to the application of cover 316, the reinforcing thread may be further coated or covered with a viscous material, such as a latex or adhesive. In one implementation, the reinforcing thread is passed through a viscous adhesive material prior to being wound about bladder 314. In one implementation, the thread forming windings 315 comprises nylon 66. In other implementations, the thread are material forming windings 315 may comprise other materials. As will be described hereafter, in some implementations, portions of the layer of windings 315 can be translucent or transparent. In one implementation, the windings 315 can be replaced with a layer of woven or unwoven fabric patches that are place about the bladder and attached to each other by an adhesive.

Figure 49:
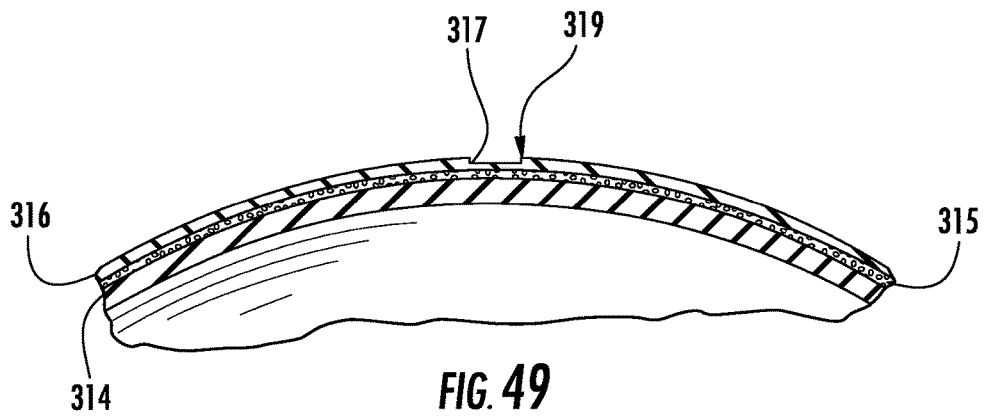
FIG. 49 is a sectional view of an example implementation of the basketball of FIG. 48.

Cover 316 comprises a layer of elastic material over and about windings 315. The cover 316 can also be referred to as the outer layer of the carcass of the basketball 310. In one implementation, cover 316 comprises a natural rubber, a butyl rubber, a sponge rubber or a combination thereof as described in U.S. Pat. No. 5,681,233. In one implementation, cover 316 is formed by laying panels or sheets of material over windings 315 and by molding or fusing the panels into a continuous integral unitary homogenous layer over windings 315. In another implementation, cover 316 formed by injection molding or other fabrication techniques. As shown by FIG. 49, in one implementation, during the formation of cover 316 by molding or melting, the exterior surface of cover 216 is molded are shaped to include valleys 317 defined by inner edges of cover 316. In one implementation in which cover 316 also serves as the exterior surface of basketball 310, the valleys 317 formed in cover 316 can provide grooves 319 (shown in FIG. 48) on the exterior of basketball 310 to facilitate gripping. In such an implementation where cover 316 serves as the exterior surface basketball 310, the exterior service of cover 316 may additionally have molded thereon outwardly projecting pebbles between valleys 317 and logo 322. In FIG. 49, the ball can also be referred to as a carcass, and the cover 316 can be the outer surface of the carcass.

Figure 50:
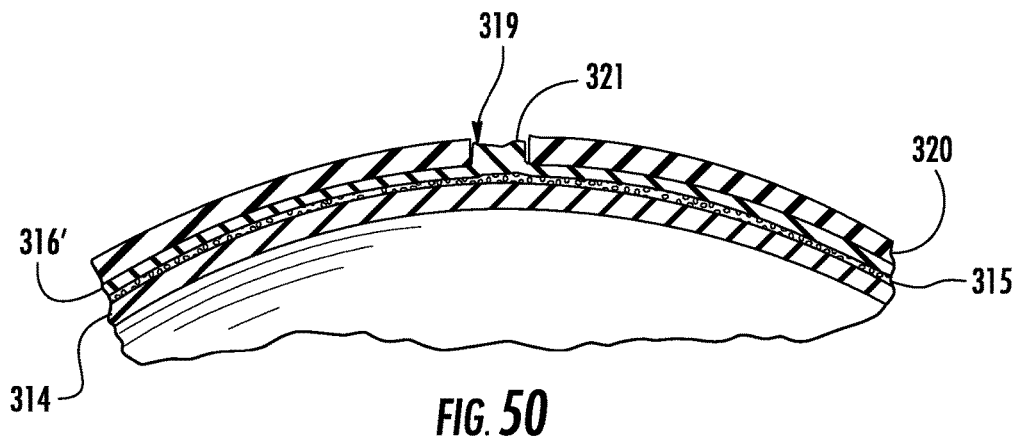
FIG. 50 is a sectional view of another example implementation of the basketball of FIG. 48.

FIG. 50 is a sectional view of another implementation of basketball 310, wherein basketball 310 comprises cover 316' in lieu of cover 316 and additionally comprises outer cover panel 320. In the implementation of basketball 310 shown in FIG. 50, bladder 314, windings 315 and the alternative cover 316' (or outer elastic layer of the carcass) serve as a carcass for supporting the outer cover panel 320 which provide a majority of the outer surface of basketball 310 shown in FIG. 48. Cover 316' can be similar to cover 316. In one implementation, the exterior surface of cover 316' can be alternatively shaped or molded to include outwardly or radially projecting walls, ribs or dividers 327 in place of valleys 317. Dividers 327 partition the exterior of cover 316 into recesses, cavities or channels receiving outer cover panel 320. In such an implementation where outer cover panel 320 extends over cover 316', the formation of pebbles in cover 316' may be omitted. As with cover 316, portions of cover 316' are translucent or transparent in some implementations. In one implementation, those portions of cover 316 forming one or more of dividers 327 are transparent or translucent to allow light to pass through dividers 327 while other portions of cover 316 are opaque or have different light transmissive properties.

Outer cover panel 320 comprises panels of material secured within the channels or cavities formed by dividers 327 along an exterior of basketball 310. In one implementation, cover panel 320 is formed from materials such as leather, synthetic leather, rubber and the like. In one implementation, the exterior surface of such cover panels 320 includes a pebbled texture. Each cover panel may additionally comprise the fabric backing coated with an adhesive prior to being secured to cover 316 which may also be alternatively coated with an adhesive. In some implementations, at least portions of one or more of cover panels 320 are translucent or transparent.

Figure 51:
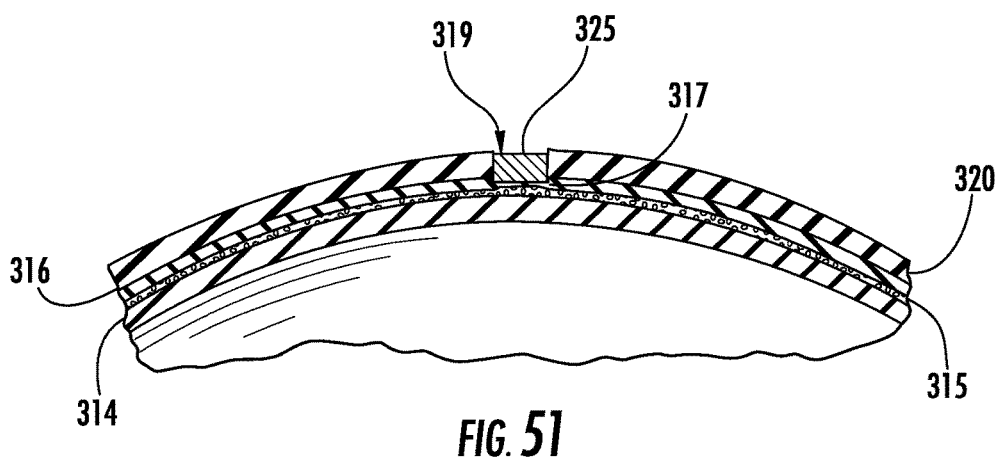
FIG. 51 is a sectional view of another example implementation of the basketball of FIG. 48.

FIG. 51 is a sectional view of yet another implementation of basketball 310, wherein basketball 310 is similar to the basketball shown in FIG. 50, but additionally comprises outer cover panels 320 and strips 325. In the implementation of basketball 310 shown in FIG. 51, bladder 314, windings 315 and cover 316 serve as a carcass for supporting the outer cover panels 320 and strips 325 which provide the outer surface of basketball 310 shown in FIG. 49. Outer cover panels 320 comprise panels of material secured to cover 316 between valleys 317 along an exterior of basketball 310.

Strips 325 comprise elongate bands, tubes, cords or the like secured within valleys 317 and extending upwardly along adjacent opposite sides of cover panel 320. The material of strips 325 has good grip-ability and relatively high coefficient of friction. One implementation, material of the strips 325 is chosen to match grip and feel of cover panels 320 so that the grooves 319 of the basketball 310 do not include areas of reduced grip-ability on the surface of basketball 310. The strips 325 can be formed in the same manner as cover panels 320. In other implementations, characteristics of the strips 325, such as grip-ability, color, texture, material can different from the characteristics of the cover panels 320. The color of the material of strips 325 can contrast the color of the cover panel 320 provide visible evidence of grooves 319. One implementation, strips 325 are black. In one implementation, strips 325 comprise urethane-coated microfiber having a thickness of about 1.5 mm. In one implementation, the bottom of such strips 325 is coated with adhesive so as to adhere to cover 316 (or carcass) during a final molding step. In one implementation, the material strips 325 can be translucent or transparent.

As shown by FIG. 48, basketball 310 additionally comprises a valve assembly 321 secured to an exterior bladder 314 (shown in FIG. 48) and terminating at an inflation tube 323 which extends from the valve assembly 321 through cover 316 and through cover panels 320 (if provided as seen in FIGS. 50 and 51). The valve assembly 321 is configured to allow air to enter the bladder through use of an inflation needle (not shown) and, when removed, retain the air within the bladder 314.

Figure 52:
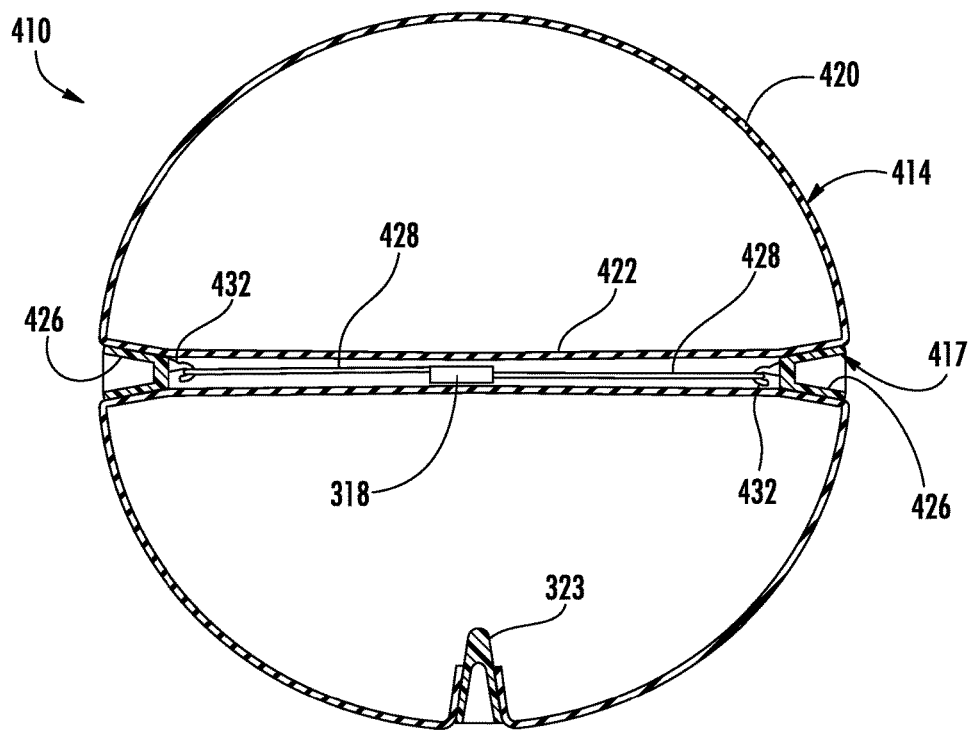
FIG. 52 is a sectional view of another implementation of the basketball of FIG. 48.

Referring to FIG. 48, an electronic chip 318 is shown in association with the basketball 310. The electronic chip 318 is configured to actively transmit one or more electronic signals used to indicate the location, movement, speed, acceleration, deceleration, rotation and/or temperature of the basketball. The electronic chip 318 can be configured can include any of the implementations and disclosure of chips 18 and 18' described above. Although the disclosure above regarding chip 18 and 18' relates to a football, many of the aspects and implementations of chip 18 and 18' are directly applicable also to basketballs. Accordingly, the disclosure of chip 18 and 18' is applicable to chip 318. Alternatively, the electronic chip 18 can include a passive circuit that allows for the detection of the location, movement, speed, acceleration, deceleration, rotation and/or temperature of the basketball to be ascertained when subjected to a magnetic field or other sensing system. The electronic chip 18 has a weight of less than 1 ounce, and more preferably, a weight of less than 0.5 ounce. In one implementation, the electronic package or electronic chip 318 is suspended within an interior of basketball 310 by a tube, such as shown in FIG. 52. In another implementation, electronic chip 318 is supported along an exterior of basketball 310, such as below the outermost cover of basketball 310, between layers of basketball 310 or along an underside of an innermost layer of basketball 310.

FIG. 48A schematically illustrates one example of electronic chip 318. As shown by FIG. 36A, in one implementation, electronic chip 318 is similar to electronic chip 18 in that electronic chip 318 comprises a substrate 120, battery 122, timer 123, light emitters 324A, 324B, 324C (collectively referred to as light emitters 324), sound emitter 326, motion sensor 328, pressure sensor 330, location sensor 331, gripping sensor 332, transmitter 133, and controller 334. Substrate 120 comprises a chip, platform or panel to support one or more of battery 122, light emitters 324, sound emitter 326, light sensors 127, motion sensor 328, pressure sensor 330, transmitter 133 and controller 334. In one implementation, substrate 120 includes several distinct portions which collectively support the aforementioned components. In one implementation, one or more of such components are supported independent of substrate 120. For example, in one implementation, controller 334 may be supported by chip 318, wherein light emitters 324 are supported by different structures at different locations within or throughout basketball 310. The components 324, 324A, 324B, 324C, 326, 328, 330, 331, 332 and 334, are directly applicable to components 124, 124A, 124B, 124C, 126, 128, 130, 131, 132 and 134. Accordingly, the disclosure above regarding components 124, 124A, 124B, 124C, 126, 128, 130, 131, 132 and 134 with respect to a football is applicable to components 324, 324A, 324B, 324C, 326, 328, 330, 331, 332 and 334 as applied to a basketball.

Battery 122 comprises an energy storage device with supplies electrical power to one or more of the remaining electronics 318, such as light emitters 124. Timer 123 comprises one or more devices that track the passage of time. In one implementation, timer 123 comprises timer circuitry which electronically or digitally tracks time. Light emitters 324 comprise devices configured to emit visible light or electromagnetic radiation, wherein the emitted visible light illuminates portions of basketball 310. The light emitters 324 can be supported within an interior basketball 310 defined by bladder 314, at least portions of which are translucent or transparent, portions of windings 315, cover 316 (and cover panels 320) can also be at least partially formed from one or more translucent or transparent materials. As a result bladder 14, winding 315, cover 316 and optional cover panel 320 allow light emitted by light emitters 324 to pass there through. In one implementation, the entirety of basketball 310 is translucent or transparent.

In another implementation, selected portions of basketball 310 are translucent or transparent. In one implementation, the carcass formed by bladder 314, winding 315 and cover 316 are translucent while particular panels 320 are translucent or transparent and other of panels 320 are not translucent or transparent. In one implementation, the layers of materials along grooves 319 are translucent or transparent such that light is only committed through such grooves 319 or such that the light seen along such grooves 319 has different characteristics, such as a different color or different brightness, as compared to light passing through other portions of basketball 310. The illumination of individual covers or panels 320 or grooves 319 visibly indicates rotation of basketball 310.

In another implementation, stylized portions of basketball 310 are translucent or transparent while adjacent portions of basketball 310 are opaque, blocking light. As a result, when light emitters 324 are emitting light, the stylized portions are emphasized and highlighted. In the example illustrated, basketball 310 includes a stylized portion shown as a logo 322 of alpha-numeric characters. In one implementation, logo 322 is translucent or transparent while adjacent portions adjacent to logo 322 are not translucent or transparent. In other implementations, basketball 310 may be provided with other stylized portions which are translucent or transparent while surrounding adjacent portions are opaque. Such stylized portions may be in the form of other logos, designs, graphics, phrases and the like. In one implementation, portions of basketball 310 adjacent to logo 322 may also be translucent or transparent, wherein those portions of basketball 310 adjacent logo 322 have a different degree, level or light transmissive characteristic as compared to the surrounding portions. For example, logo 322 and adjacent portions of best will 310 may transmit light to different degrees or may change the color or wavelength of the light differently as compared to one another.

In each of the aforementioned implementations, light emitters 324 may alternatively be supported external to bladder 314, between bladder 314 and the exterior of basketball 310. In such implementations, light emitters may be supported adjacent or in near vicinity to those particular portions of basketball 310 which are translucent or transparent. In some implementations, light emitters 324 are supported directly along the exterior surface of basketball 310 or within and interior portion of basketball 310, wherein at least portions of basketball 310 outside of the light emitter are translucent or transparent.

In one implementation, the outermost surface of basketball 310 (whether it be cover 316 as shown in FIG. 49 or cover panels 320 as shown in FIGS. 50 and 51) is formed therein a depressed or recessed portion 336 in the shape of the stylized portion or logo. In such an implementation, basketball 310 additionally comprises light emitter 324D and protective overlay 337. Light emitter 324D comprises a patch or substrate, also in the shape of the stylized portion and the shape of recessed 336, that supports a plurality of light emitting points such as a plurality of light emitting diodes or other individual light emitters. Light emitter 324D is secured within recess 336 and receives power from battery 122 under the control of controller 334. Protective overlay 337 has the shape corresponding to the stylized shaped recess 336 and is secured within recess 336 over light emitter 324D to protect light emitter 324D. In other implementations, recessed portion 336, light emitter 324D and overlay 337 have different shapes and may have shapes different than one another. In some implementations, light emitter 324D may be provided by a string of lights simply deposited or secured within recess 336 without the underlying substrate support. In another implementation, overlay 337 may be omitted, wherein light emitter 324D is coated with a protective layer or is otherwise sufficiently durable to withstand wear during use of basketball 310.

In some implementations, light emitters 324 may be supported at different locations in or with respect to basketball 310. For example, in one implementation, light emitter 324A is supported along grooves 319, light emitter 324B is supported within an interior of bladder 14 and light emitter 324C is supported between bladder 314 and the exterior of basketball 310 at a particular region of basketball 310, such as adjacent to stylized portion 322. For example, light emitter 324A may comprise a string of light emitters extending along one or more of grooves 319. As noted above, the different light emitters may output or emit light in different fashions with respect to one another depending upon location of such light emitters. For example, in one implementation, grooves 319 may be more brightly illuminated as compared to cover panels 320 or stylized portion 322, providing enhanced illumination of basketball 310 and highlighting rotation of basketball 310. Logo 22 may be illuminated with a different color as compared to cover panels 320 or grooves 319. In one implementation, one or more of cover panels 320, grooves 319 or stylized portion 322 may be illuminated at different frequencies (continuous or intermittent). For example, grooves 319 may be intermittently illuminated at a first frequency, cover panels 320 may be intermittently illuminated at a second different frequency and stylized portion 322 may be continuously illuminated. By intermittently illuminating a selected portion or portions of basketball 310 or providing such portions with a lower level of illumination, battery power may be conserved. Moreover, by intermittently illuminating selected portions of basketball 310 or providing such portions with a lower level of illumination as compared to other portions, distractive impacts occurring when certain portions of basketball 310 are illuminated may be avoided or reduced.

Sound emitter 326 comprises a device, such as a speaker, to emit auditable sounds in response to control signals from controller 334. In one implementation, sound emitter 326 may emit words, such as words of status, such as a number indicating a rotational speed of basketball 310, words of encouragement such as "nice shot" or words of instruction such as "change grip", "increase backspin", or "inflate" in response to a control signals from controller 334 based upon sensed values from motion sensor 328, pressure sensor 130, location sensor 331, or in response to signals received via transceiver 133. In some implementations, sound emitter 326 is omitted from basketball 310, wherein sounds are not generated or wherein separate and distinct sound emitters outside of basketball 310 and remote from basketball 310 are utilized to emit sounds in response to signals transmitted by basketball 310.

Light sensors 127 comprise one or more light sensors that detect ambient lighting with respect to basketball 310. The detected lighting is transmitted to controller 334. Motion sensor 328 comprises one or more sensors to detect motion of basketball 310. In one implementation, sensor 328 comprises an accelerometer, such as a dual axis accelerometer. In one implementation, sensor 328 comprises a sensor to detect 6 degrees of freedom of motion, or 9 degrees of freedom of motion. Conditions detected by sensor 328 are transmitted to controller 334. Signals from motion sensor 328 may indicate a rotation or spin of basketball 310, its travel arc, arc height and the like.

Pressure sensor 130 comprises one or more sensors to detect an internal pressure within bladder 314. One implementation, sensor 130 comprise a pneumatic sensor that detects air pressure changes within bladder 314. The sensor 130 can be used to monitor air pressure within the bladder 314 and serve to activate the electronic circuit when a pressure fluctuation is sensed. In this manner, the sensor 130 can be used as part of the control logic of the electronic chip 318 to maximize available battery life of the electronic sensor and/or circuit. The electronic chip 318 can include shutdown logic that places the electronics of the electronic chip 318 into a standby or sleep mode until the basketball 310 is put into play. When the basketball 310 is moved, passed, kicked or punted, the air pressure within the basketball 310 can fluctuate or change. This change in air pressure is sensed by the sensor 130, which then activates the electronic chip 318 and places it in an operating mode. In an alternative example implementation, the sensor 130 can be a piezoelectric sensor.

The air pressure sensor 130 can also be used to indicate the air pressure within the bladder 314 and therefore the pressure of the basketball 310 itself. The signal produced through the sensor 130 and from the electronic chip 18 can be used to confirm that the air pressure is within a desired range or at a specific desired setting. For example, NBA basketballs have a recommended air pressure of 9.5 psi. If the game balls have the pressure sensor 130, one could use this information to select the most properly inflated basketball. The electronic chip 18 can also include a temperature sensor for monitoring the temperature of the basketball 310. In some implementations, pressure sensor 130 is omitted.

Location sensor 331 comprise one or more sensors to detect a location of basketball 310. In one implementation, location sensor 331 comprises a global positioning system (GPS) sensor/receiver. In another implementation, location sensor 331 may additionally or alternatively comprise a magnetometer which sensors magnetic fields or polar magnetic fields to determine a location or position of basketball 310

In one implementation, the user is instructed to stand at the approximate distance from a ferromagnetic basketball rim or other ferromagnetic reference structure. The user indicates where he or she is located or distance from the ferromagnetic reference structure. The user is then instructed to shoot the basket towards the ferromagnetic reference structure. The system uses the first location as a reference point and the first shot as reference throw (alternatively, the user can also indicate where the ferromagnetic reference structure is located). With the reference shot, the system knows when it reaches the reference structure (the magnetometer senses the polar magnetic field, but also field from the metallic reference structure). The ferromagnetic reference structure creates the equivalent of some noise or alters the polar magnetic force slightly.

Once the system knows the initial shot position. It knows that the user was facing the reference structure at a known distance feet away, and that the user was directly in front of the reference structure. The location and shot are subsequently utilized as a reference. Then, with all subsequent positions for basketball 310, such references are used to determine subsequent locations of the basketball. In one implementation, subsequent shots are analyzed using 6 degree of freedom sensors (one sensor covers 3 directions of ball movement with respect to the x, y and z axes, the second sensor is referencing gravitational pull with respect to the x, y and z axes, and the distance to the ground, and the magnetometer measures the strength of the magnetic field to know where it is in relation to north) and the magnetometer. In some implementations, one or more of motion sensor 328, position sensor 330, or location sensor 331 are omitted.

Grip sensor 332 comprises one or more sensors located in or on basketball 310 to detect manual gripping of basketball 310. For example, in one implementation, grip sensors 332 comprise pressure, contact other types of sensors on the surface of or within grooves 18. Such sensors provide electrical signals to chip 218 and controller 334 indicating that basketball 310 is being manually gripped along grooves 18 or how grooves 18 are currently being contacted or gripped by a person's hand. In other implementations, gripping sensors 332 may be omitted.

Controller 334 comprises one or more integrated circuits or processing units to generate control signals directing the operation of light emitters 324 and sound emitter 326 based upon information received from sensors 127, 328, 330, 331, 332 and control or data signals received through transceiver 133. In one implementation, controller 334 generates control signals that control the emission of light by light emitters 324.

According to a first mode of operation, controller 334 actuates light emitters 324A from an off state to an on state in response to control inputs from a person to illuminate basketball 310 as desired in lowlight conditions. For example, in response to receiving inputs through grip sensors 332, controller 334 may turn on light emitters 324A. In another implementation, controller 334 generates control signals for light emitters 324A in response to her based upon signals received from light sensors 127 to provide overall lighting for basketball 310. For example, in response to receiving signals from light sensor 127 indicating that ambient lighting or environmental lighting has fallen below a predefined threshold, controller 334 may generate control signals turning on light emitters 324A. In some implementations, in response to receiving signals from light sensors 127, controller 334 may actuate light emitters 324A between one of multiple different lighting levels. For example, as ambient lighting darkens below each of a series of thresholds, controller 334 may generate control signals increasing the brightness or intensity of light being emitted by light emitters 324A in a stepwise or continuous fashion. This may be achieved by increasing the wattage of the light being emitted or by increasing the number of light emitting diodes or other lighting elements that are providing light. Similar adjustments to the brightness or intensity of light being emitted by any of the light emitters of basketball 310 may made by controller 334 based upon the sensed a detected ambient lighting conditions. As ambient lighting conditions become darker, controller 334 may generate control signals causing the light emitted by any of the various light emitters of basketball 310 to be brighter.

In one implementation, controller 334 generates control signals causing light emitter 324A to turn on and emit light in response to signals from motion sensor 328 indicating motion of basketball 310 satisfying a predefined criteria or threshold. For example, in one implementation, controller 334 generates control signals causing light emitter 324A (or additional light emitters 324) to begin to emit light during a basketball shot or free-throw when basketball 310 is rotating about its axis above a predefined minimum velocity or backspin.

In one implementation, controller 334 first determines whether basketball 310 is being shot, such as during a field goal attempt or during a free-throw, versus when basketball 310 is merely being dribbled or passed. In one implementation, controller 334 determines whether travel of a ball is a shot or such travel is merely the ball being dribbled or being passed based upon whether the ball is traveling to a parabolic path having an arc that satisfies a predefined threshold. In another implementation, controller 334 determines whether travel of a ball is a shot or such travels merely ball being dribbled or being passed based upon a maximum height of the ball travel. For example, controller 334 may identify travel of the ball as a shot of the ball if controller 334 receive signals from motion sensor 328 or location sensor 331 indicating that the ball is above a height of the basketball rim or has a trajectory estimated by controller 334 to achieve a height above the basketball rim.

Once controller 334 has determined that the travel of the ball is a shot, versus a dribble or pass, controller 334 utilizes additional signals from motion sensor 328 to determine a rotational velocity and/or backspin of basketball 310. When the rotational velocity or backspin of basketball 310 falls below the predefined threshold, controller 334 terminates emission of light by light emitter 324A. For example, in one implementation, controller 334 may generate control signals causing light emitter 324A to emit light when the detected backspin from motion sensor 328 is greater than five RPMs.

In one implementation, controller 334 adjusts the nonzero emission of light by light emitter 324A dependent upon signals from motion sensor 328. For example, controller 334 may generate control signals causing light emitter 324A to increase an intensity of light being emitted as the speed of backspin increases. This light intensity adjustment may be made in a continuous ramped fashion or may be made in a stepwise fashion as predefined thresholds are satisfied.

In yet another implementation, controller 334 adjusts the frequency or duration of pulses of light emitted by light emitter 324A (and/or other light emitters 324) dependent upon the sensed motion of basketball 310. For example, controller 334 may generate control signals causing light emitter 324A to emit light pulses having a frequency or duration upon a predefined minimum rotational velocity being detected. In such an implementation, controller 334 may further generate control signals causing the intensity and/or duration of the light pulses to be increased as the rotational velocity or backspin of basketball 310 increases.

In one implementation, controller 334 generates control signals adjusting both the pulse frequency/duration and the light brightness or intensity to indicate different detected characteristics. For example, in one implementation, controller 334 may adjust or control the frequency/duration of the pulses based upon rotational velocity and the brightness or intensity of such pulses based upon a detected are or parabolic path of basketball 310. In other implementations, controller 334 may adjust or control the frequency/duration of pulses based upon the detected arc of basketball 310 and the brightness or intensity of such pulses based upon rotational velocity or backspin.

In yet another implementation, controller 334 generates control signals controlling a color of light being emitted by light emitters 324 based upon detected motion of basketball 310. For example, controller 334 may cause light emitters 324 to emit a first color of light upon a predefined threshold for rotational velocity or backspin being satisfied and may cause light emitters 324 to emit different colors of light as different rotational velocity or backspin thresholds are satisfied. Similarly, in another implementation, controller 334 may cause light emitters 124 to emit a first color of light upon a predefined threshold for art being satisfied and may cause light emitters 324 to emit different colors of light as different arc thresholds are satisfied or exceeded. In some implementations, each of light intensity/brightness, pulse duration/frequency and light color may be controlled and adjusted to indicate when each of different predefined motion thresholds (velocity, arc of travel and the like) are being satisfied.

In one implementation, controller 334 generates control signals causing light emitter 324B to differently emit light based upon signals received from pressure sensor 130. For example, in response to receiving signals from pressure sensor 130 indicating the internal pressure within bladder 314, controller 334 may generate control signals causing light emitter 324B to emit different colors of light dependent upon inflation level of bladder 314. Controller 334 may cause light emitter 324B to emit a red light when basketball 310 has a pressure below a predefined minimum to indicate basketball 310 being underinflated. Similarly, controller 334 may cause light emitter 324B to emit a green light when basketball 310 other pressure above the predefined minimum to indicate basketball 310 being appropriately inflated.

In a similar fashion, controller 334 may alternatively control light intensity or pulse/duration characteristics to indicate inflation levels for bladder 314 and basketball 310.

In one implementation, controller 334 generates control signals causing light emitter 324C to differently emit light based upon a detective positioning of basketball 310, based at least partially upon signals received from location sensor 331. For example, controller 334 may generate control signals adjusting an on-off state, a light brightness, a color or a pulse frequency/duration dependent upon the momentary positioning of basketball 310 (horizontal distance or height) or traveling velocity of basketball 310. In one implementation, controller 134 generates control signals causing light emitter 324C to turn on and emit light for a predefined period of time when signals from location sensor 331 indicate that basketball 310 has satisfied a predetermined location threshold, such as when basketball 310 has passed through the rim/hoop. In another implementation, controller 134 generates control signals causing the light emitted by light emitter 124C to change in brightness, color or pulse frequency/duration, for a predetermined time period, after such location thresholds have been satisfied. For example, based upon signals received from motion sensor 328 and motion of basketball 310, controller 334 may determine the initiation of a shot. If during the play or down, controller 334 further receives signals from location sensor 331 indicating that basketball 310 has traveled through the hoop or rim, controller 334 may generate control signals causing basketball 310 (or portions of basketball 310) to change from a darkened to an illuminated state, to change from a continuous illumination to a flashing illumination, to change from a first color to a second color or to change from a first brightness to a second brightness, or combinations thereof.

In yet other implementations, controller 334 may include an internal timer or may receive signals from transducer 133 indicating time periods associated with the game being played. Based upon such signals, controller 334 generates control signals adjusting illumination provided by one or more of light emitters 324. For example, in one implementation, controller 334 generates control signals adjusting illumination provided by light emitter 324B based upon shot clock timing. For example, controller 334 may change the color of light being an emitted from one or more portions of basketball 310 as an end of a shot clock period is approaching. In another implementation, controller 334 may adjust a frequency or duration a light pulses being emitted by basketball 310 as an end of a shot clock time period approaches. Similar adjustments may be made by controller 334 based upon time allotments for inbounding a basketball or based upon approaching end of a quarter or half. In yet other implementations, controller 334 may additionally or alternatively generate control signals making light adjustments that indicate the actual end of a time period, such as the end of a shot clock time period or the end of a quarter or half. In such an implementation, basketball 310 may be utilized to provide shot clock timing, ball possession limitations or game timing for informal basketball games at playgrounds or other basketball court facilities where shot clock or game clocks may not be available. In such an implementation, controller 334 may receive inputs through transceiver 133 or through contact sensors on ball 310 establishing a custom shot clock time period or game. For such informal basketball games.

In some implementations, controller 134 may adjust lighting characteristics of basketball 310 based upon a comparison of detected motion or travel of basketball 310 (as determined using signals from motion sensor 328, pressure sensor 330 and location sensor 331) with stored or obtained ball travel results achieved by a celebrity. For purposes of this disclosure, a "celebrity" shall mean a person who has attained notoriety for his or her performance in the sport. Examples of such celebrities include college and professional basketball players. Although controller 334 may include a memory serving as a celebrity storage for storing user data pertaining to travel of the ball, in other implementations, controller 334 may obtain celebrity ball travel characteristics or results from a remote location using transceiver 133. For example, celebrity ball travel results are characteristics may be alternatively provided at a remote server which may be accessed across a local or wide area network.

Based upon signals received from one or more of motion sensor 328, pressure sensor 330 and location sensor 331, compares a person's results with that of a celebrity and adjust lighting characteristics of basketball 310 accordingly. For example, in one implementation, controller 334 may compare detected parameters or characteristics of a user's backspin and/or arc of a basketball with a celebrity's shot of the basketball. For example, controller 334 may compare of a user's basketball shot with the basketball shot by a popular basketball celebrity such as Lebron James of the Miami Heat or former player Michael Jordan of the Chicago Bulls. Based upon this comparison, controller 334 generates control signals causing one or more lighting characteristics of basketball 310 to be adjusted. For example, if a particular basketball shot by user has characteristics that satisfy predefined thresholds typical of a celebrity college or professional basketball player, controller 334 may change the color of light being emitted by basketball 310 during the basketball shot and/or for a predetermined period of time following the basketball shot, providing a user with a reward or complement and encouragement. In such an implementation, controller 334 and the light being emitted by basketball 310 provide a user with a motivational tool by allowing the user to visually determine or see how his or her individual parameters pertaining to travel of the basketball compare to the same individual parameters of a celebrity having above-average skills in the sport. Similar implementations may be made with respect to other aspects such as free throws.

In some implementations, controller 334 stores and keeps track of results, wherein controller 334 adjusts lighting characteristics of basketball 310 as different predetermined thresholds or milestones are met. For example, in one implementation, controller 334 tracks free-throw makes versus attempts, wherein controller 334 generates different control signals causing basketball 310 to emit a different characteristic light (such as a different color, frequency, brightness etc.) based upon the current free-throw percentage of a person using basketball 310. For example, when a player achieves a free-throw percentage of at least 50%, controller 334 generates control signals causing a first color light to emitted by basketball 310 and when the player achieves a second greater free-throw percentage of say, at least, 60%, controller 334 generates control signals causing a second different color light to be emitted by basketball 310. If a player's free-throw percentage falls below a predefined threshold, controller 334 generate control signals once again changing the color of light emitted by basketball 310. In such an implementation, the color, pulse frequency, brightness etc. of basketball 310 provides the player with a visual motivational tool. In some implementations, the visible color may further indicate to others, such as a player's coach, the current free-throw percentage, offering additional opportunities for encouragement. In addition to tracking free throw percentages, controller 334 may be configured to track and adjust lighting characteristics based upon other statistics such as three point shot percentage and two point shot/field goal percentages.

In one implementation, transceiver 133 is configured to read or receive player identification signals, wherein controller 334 associates and stores data for multiple players in a game or practice. For example, in one implementation, each of multiple players may include a distinct radio frequency identification (RFID) tag. Transceiver 133 or another RFID reading device provided as part of basketball 310 is configured to read the particular player RFID tag when the particular player is currently handling basketball 310. If the particular player shoots the basketball, data such as make/miss, backspin, arc and the like, sensed by one or more sensors of basketball 310, is stored in a memory on chip 318. Such data may be subsequently transmitted by transceiver 133 to an external or remote portable electronic device for further statistical analysis and visual representation. As a result, basketball 310 allows individual players in a practice or an informal pickup game to later view their statistics (shot attempts, field-goal percentage, three-point shots, free-throw percentage, shot mapping) on their portable electronic devices, on a website or computer.

In one implementation, controller 134 additionally controls one or more light emitters 324 based upon signals received from grip sensor 332. In one implementation, in response to receiving signals indicating that grooves 18 are being manually contacted or gripped, controller 334 actuates one or more of sensors 328, 330, 331 from a standby or sleep mode or state to an active state, effectively turning on several the functions of basketball 310. In such an implementation, battery power is conserved. In one implementation, in response to receiving signals indicating grooves 319 are no longer being manually contacted or gripped, controller 334 initiates or begins countdown of a timer counting down to termination of lighting of one or more of light emitters 324. In such an implementation, after prolonged periods of nonuse or undetected gripping of grooves 18 or other portions of basketball 310, light emitters 324 are turned off to conserve power.

In yet other implementations, controller 334 may utilize signals received from grip sensor 332 for receiving input, commands or selections. For example, grip sensor 332 may comprise a plurality of individual pressure or contact sensors, wherein different combinations of touches (as detected by pressure or contact) correspond to different commands or selections. In one implementation, controller 334 may offer a person with a variety of selectable options or settings such as options as to predefined sets of settings based upon a person's current skill level (beginner, amateur, high school, college, professional), wherein a person may select one of the set of settings by contacting grooves 319 in a predefined manner at predefined locations or in a predefined order during a setup phase. In another implementation, controller 134 may offer a person with a variety of selectable options or settings as to how information is communicated (if at all) through light emitters 324 or sound emitter 326, whether through changes in on-off states, color, duration, pulse frequency or duration, sound and the like, wherein a person may select one or more of the communication options by contacting laces 16 in a predefined matter at predefined locations or in a predefined order during a setup phase. In another implementation, controller 334 may alternatively or additionally offer a person with a variety of selectable officer settings as to what portions of basketball 310 are illuminated or as to what portion of basketball 310 is assigned to communicating particular information through illumination, wherein a person may select one or more of the basketball portion illumination options by contacting grooves 319 or logo 322 in a predefined matter at predefined locations or in a predefined order during a setup phase. For example, by contacting logo 322 in a first particular manner during a setup phase, a person may establish a first setting wherein grooves 319 communicate backspin and logo 22 communicates shot clock information through illumination and by contacting logo 322 in a second different particular manner during a setup phase, a person may establish a second setting wherein lighting of grooves 319 communicate shot clock information while logo 22 communicates backspin or arc information through illumination. In such implementations, once selections or commands are made, controller 334 may generate control signals causing light emitters 324 or sound emitter 326 to confirm the selection using illumination or sound.

Transceiver 133 comprises a device to transmit and receive communication signals. In one implementation, transceiver 133 is configured to facilitate communication between controller 334 and an external electronic device. In one implementation, controller 334 utilizes transceiver 133 to communicate with a portable electronic device so as to allow a person to receive data or information regarding basketball 310 and to further potentially store such information for later review or analysis. For example, controller 334 may utilize transceiver 133 to communicate information pertaining to motion of basketball 310 such as backspin or arc, inflated pressure of bladder 314 of basketball 310, the success of the free-throw or other shot, allowing correlation between motion of basketball 310 (such as backspin and/or arc) to success of a shot or free-throw.

In other implementations, in lieu of communicating with external or remote electronic devices in a wireless fashion, transceiver 133 may alternatively facilitate communication using contact or induction. For example, transceiver 133 and alternatively to indicate using an RFID tag or through an electrical jack or plug. In one implementation, an electrical contact may be situated along or about inflation port 322 (or a separate independent port), allowing a jack or plug-in to be inserted into port 322 and into contact with the electrical contacts to facilitate "wired" communication with controller 334. In other implementations, transceiver 133 may be omitted.

FIG. 52 is a sectional view illustrating a portion of basketball 410, an example implementation of basketball 310. Basketball 410 is similar basketball 310 except that basketball 410 is illustrated as specifically including bladder 414 in lieu of bladder 314 and additionally comprises chip mounting system 417. Although not illustrated in FIG. 40, basketball 410 additionally comprises one of the basketball configurations shown in FIGS. 37-39.

Bladder 414 is similar to bladder 314 except the bladder 414 comprises a spherical inflatable outer wall 420 and an internal tubular portion 422. Internal tubular portion 422 comprises a flexible tubing extending through an intersecting a center point of basketball 410 and outer wall 420. As a result, outer wall 420 and tubular portion 422 form a donut-like inflatable interior which encircles tubular portion 422. Tubular portion 42 is sized receive electronic components, such as circuit chip 318 (described above). Tubular portion 422 facilitates insertion of circuit chip 318 within basketball 410 after bladder 414 has been inflated. As a result, in some implementations, the positioning of circuit chip 318 within basketball 410 may be performed after one or more of cover 316, 316" and panels 320 have been formed upon the inflated bladder 414. As a result, circuit chip 318 may avoid being subjected to substantially high temperatures during the forming of cover 316, 316" and panels 320. Because tubular portion 422 continuously extends from a first side of bladder 414 to a second opposite side of bladder 414, circuit chip 318 and chip mounting system 417 may be strong through bladder 414. In other implementations, tubular portion 422 may comprise a blind tubular member or a tubular member having one closed off end, wherein the closed off end is secured in place within bladder 414. In another implementation, the tubular portion 422 may extend only partially within the bladder 414. In one implementation the tubular portion 422 may extend three inches or less into the bladder 414, and include a closed end. In one implementation, the tubular portion 422 may be positioned opposite of the valve or inflation tube 323.

In implementations where circuit chip 318 comprises one or more of light emitters 324 such that light emitters 324 are located within tubular portion 422, those portions of tubular portion 422 about circuit chip 318 or adjacent to the one or more light emitters 324 are translucent or transparent. As a result, light emitted by such light emitters 324 a pass-through tubular portion 422 and illuminate the interior bladder 414, wherein at least portions of wall 420 of bladder 414 are also translucent or transparent. In implementations where light emitters 324 are omitted, tubular portion 422 may be opaque.

Chip mounting system 417 mounts and supports electronic component or chip 318 within bladder 414 and within tubular portion 422. Chip mounting system 417 comprises plugs 426 and flexible member 428. Plugs 426 are configured to be inserted and retained in opposite ends of tubular member 422 proximate an exterior of bladder 414. Plugs 426 are each connected to an opposite end of flexible member 428. In the example illustrated, each of plugs 426 comprises a hook 432 about which flexible member 428 extends. In other implementations, plugs 426 may be secured to flexible member 428 in other fashions.

Flexible member 428 comprises an elongate flexible string, line, band, strap, cable, rope, wire or the like extending between plugs 426. Flexible member 428 supports circuit chip 318 at a central location within tubular portion 422. In one implementation, flexible member 428 comprises a resiliently stretchable member, which when taught, resiliently holds circuit chip 318 in place. In other implementations, other structures which are not necessarily flexible or resilient may be positioned within tubular portion 422 to retain circuit chip 318 centrally in place within tubular portion 422. In some implementations, flexible member 428 may be omitted, wherein circuit chip 318 is positioned within tubular portion 422 and wherein, upon stretching of tubular portion 422, tubular portion 422 constricts about and into gripping contact with circuit chip 318 to retain circuit chip 318 in place.

In the example illustrated, chip mounting system 417 additionally comprises multi-lead wire 437. Multi-lead wire 437 extends from the electronic chip 318, through tubular portion 422, between tubular portion 422 and plug 426 and along an exterior of bladder 414 to light emitter 324D and any grip sensors 132. In one implementation, wire were 437 extends along and in contact with exterior surface of bladder 414. In another implementation, wire 437 extends between any of the various layers between bladder 414 and outer cover 312 (shown in FIG. 48). As shown by FIGS. 48A and 52, tubular portion 422 of bladder 414 facilitates location of light emitters 324 and electronic chip 318 at a central portion within basketball 410 and facilitates communication between chip 318 and light emitter 324D and/or grip sensor 332, external to bladder 414, without wire 437 passing through wall of bladder 414. As a result, wire 437 is less likely to impair the structural integrity of bladder 414.

Figure 53:
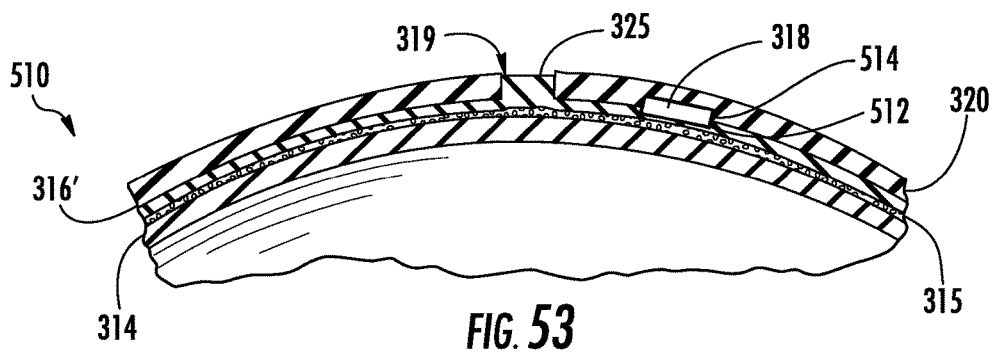
FIG. 53 is a sectional view of another implementation of the basketball of FIG. 48.

FIG. 53 is a sectional view illustrating basketball 510, another example implementation of basketball 310. Basketball 510 is similar to basketball 310 except that basketball 510 is specifically illustrated as having circuit chip 318 located external to bladder 314. In the example illustrated, circuit chip 318 is supported adjacent to windings 315 within recesses formed within cover 316' and cover panel 320. In some implementations, depending upon a thickness of cover 316' and cover 318, circuit chip 318 may be supported entirely within a recess of cover 316' or of cover panel 320. In one implementation, circuit chip 318 and light emitters 324 are located behind logo 322. In one implementation, light emitters 324 may illuminate an entire region of at least one of panels 320. In some implementations, the circuit chip 318 shown in FIG. 41 may be added to basketball 410 shown in FIG. 40, where basketball 410 comprises two circuit chips 318 or wherein basketball 40 comprises two separate light emitters at different locations, one light emitter centrally located within tubular portion 422 and other light emitter outwardly located between winding 315 and cover panel 320.

In one implementation, basketball 410 is formed by molding recess 512 within cover 316' and forming recess 514 in panel 320 such that circuit chip 318 is captured between cover 316' (or windings 315 where recess 512 extends completely through cover 316') and cover panel 320. In other implementations, circuit chip 318 may be secured adjacent to bladder 414, wherein windings 315 extend about and over circuit chip 318. In yet other implementations, circuit chip 318 and/or light emitters 324 may be secured at other locations.

Figure 54:
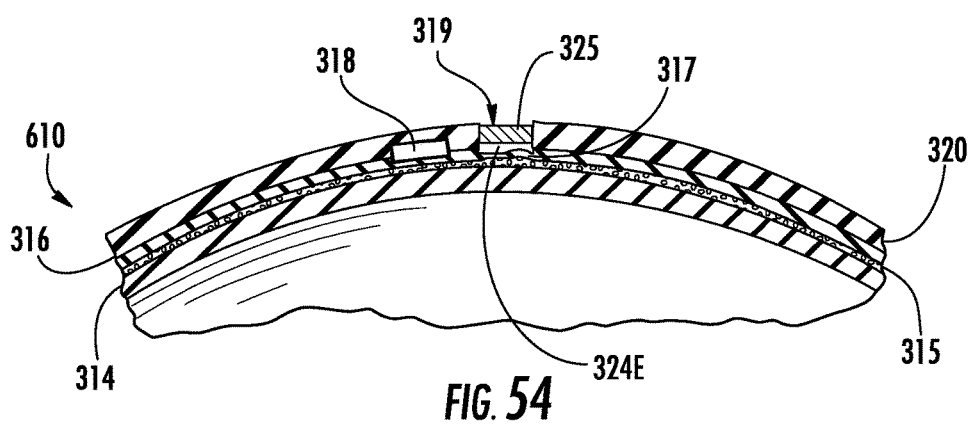
FIG. 54 is a sectional view of another implementation of the basketball of FIG. 48.

FIG. 54 is a sectional view illustrating basketball 610, another example implementation of basketball 310. Basketball 610 is similar to basketball 310 except that basketball 510 is specifically illustrated as having circuit chip 318 located external to cover 316 and is having a light emitter 324E within valley 317 below strip 325. In the example illustrated, circuit chip 318 is supported adjacent to cover panel 320 within recesses formed within cover panel 320. In one implementation, circuit chip 318 and light emitters 324 are located behind logo 322 (shown in FIG. 48).

Light emitter 324E comprises a device to emit light in response to control signals from controller 334 located on circuit chip 318. In the example illustrated, light emitter 324E is located within valley 317 (described above with respect to FIG. 48) below strip 325 so as to illuminate groove 318. In such an implementation, at least portions of strip 325 are translucent or transparent. In one implementation, light emitter 324E (schematically shown) comprises a string of multiple light emitting elements such as a string of light emitting diodes. Although basketball 610 is illustrated as including light emitter 324E in a single groove 318, light emitters may also be provided in other grooves 319 of basketball 610.

In some implementations, basketball 610 may additionally comprise the circuit chip 318 and chip mounting system 417 shown and described above with respect to FIG. 52. In such an implementation, light emitters provided on the centrally located circuit chip 318 within tubular portion 422 illuminates larger more expansive areas while light emitters located within groove 318 or adjacent to cover 320 may illuminate specific designated portions of basketball 610.

Figure 55:
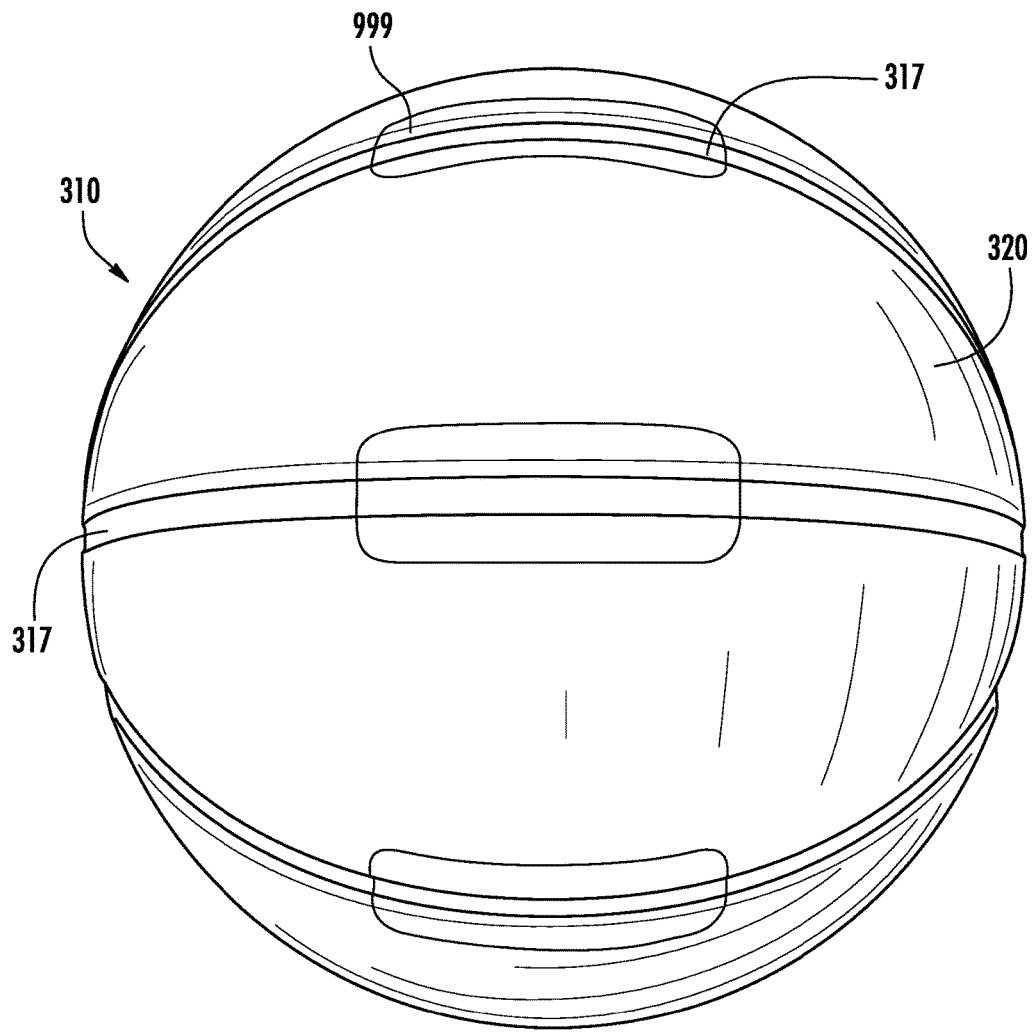
FIG. 55 is front view of a basketball of another implementation of the present invention.
Figure 56:
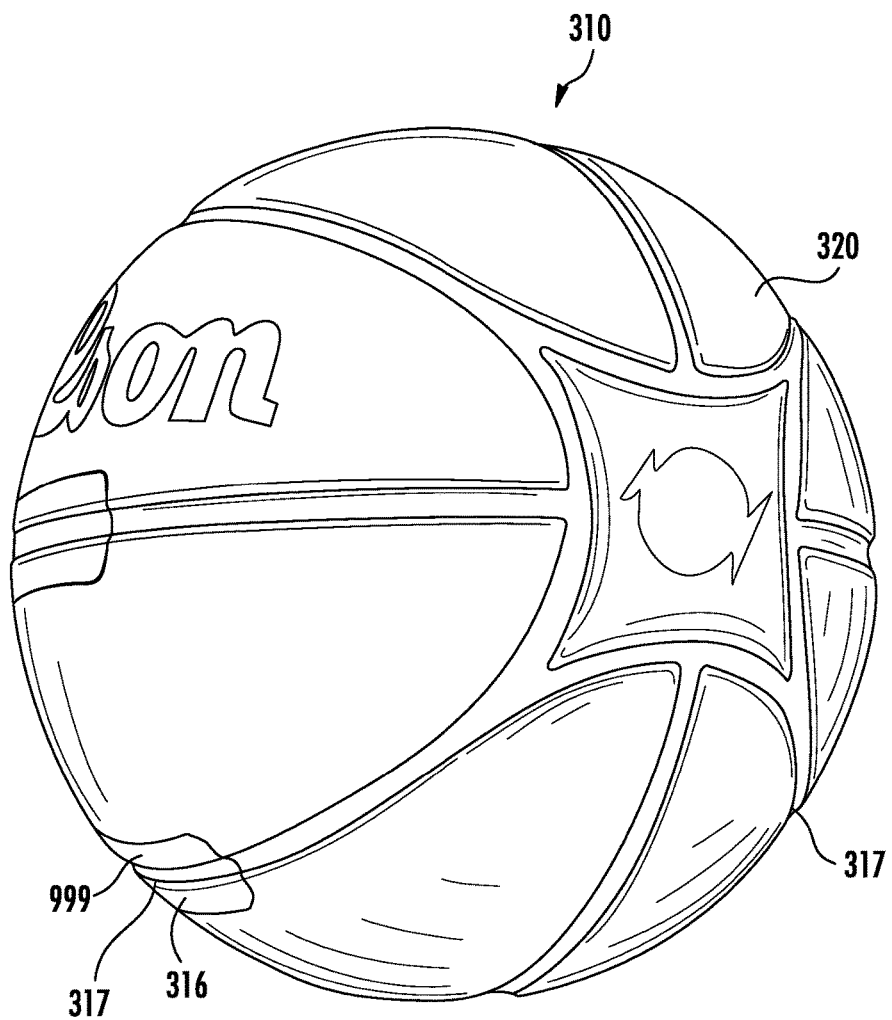
FIG. 56 is a side perspective view of the basketball of FIG. 55.

The basketball 310, 510 and 610 can additionally comprises one of the basketball configurations shown in FIGS. 49-51. FIGS. 55 and 56 illustrate images of a basketball in which portions 999 of the carcass 316 or molded so that they project outward from the remaining portions of the carcass 316. The portions 999 are made of translucent, transparent, semi-translucent or semi-transparent material that enable light from light emitters 124 to pass through and been seen from the exterior of basketball 310. The cover panels 320 are positioned around the portions 999 of the carcass 316. The portions 999 also include portions of the channels 317 that are formed of the same translucent, transparent, semi-translucent or semi-transparent material. When the basketball 310 is rotated above a predetermined spin rate, the portions 999 can light up from light emitted from light emitters 124. In other implementations, portions 999 can take other shapes or sizes and can extend over other areas or locations of the ball 310 or the entire ball. The light can be from the light emitters within the bladder or in other locations within ball 310 as described herein.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Although the various features, attributes, implementations and concepts are discussed with respect to the use of game balls (footballs and basketballs) with lighting and/or audible signals, such features, attributes implementations, concepts discussed above, such as the method by which electronic are supported within the game ball, or how data or signals are transmitted between an electronic chip or other electronic package and an outside electronic device may be used with game balls that do not have lighting or audible sound. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompasses a plurality of such particular elements.

What is claimed is:

1. An American style football comprising:
   an inflatable bladder;
   a cover surrounding the bladder, the cover including a translucent portion and a second translucent portion, the second translucent portion being different than the first translucent portion;
   a battery carried by the football;
   a light emitter carried by the football and electrically connected to the battery; and
   a second light emitter carried by the football and electrically connected to the battery;
   a sensor; and
   a controller operably connected to the light emitter, the second light emitter and the sensor, the controller configured to:
   (A) determine, based on signals from the sensor, a number of rotations of the football per unit time about an axis of the football;
   (B) in response to determining the number of rotations, independently actuating the light emitter, wherein the light emitter transmits light through the translucent portion of the cover indicating a first type of information associated with the number of rotations; and
   (C) independently actuate the second light emitter, wherein the second light emitter transmits light through the second translucent portion of the cover indicating a second type of information, wherein the second type of information is different from the first type of information.

2. The football of claim 1, wherein the cover comprises laces through which light from the light emitter is transmitted, wherein portions of the cover surrounding the laces block light.

3. The football of claim 1, wherein the cover comprises panels through which light from the light emitter is transmitted.

4. The football of claim 3, wherein the cover comprises a pair of stripes partially encircling an axis of the football, wherein the stripes comprise panel portions through which light is transmitted differently from remaining portions of the cover.

5. The football of claim 1, wherein the light emitter emits light from within the bladder and wherein at least portions of the bladder are at least translucent.

6. The football of claim 1, wherein the cover comprises a stylized portion through which light from the light emitter is transmittable.

7. The football claim 6, wherein the stylized portion comprises an alphanumeric symbol.

8. The football of claim 1, wherein the light emitter is configured to emit different colors of light.

9. The football of claim 1, wherein the bladder comprises a pocket receiving the light emitter.

10. The football of claim 1, wherein the controller actuates the light emitter to emit a first color of light in response to a first sensed rotation of the football and to emit a second color light in response to a second sensed rotation of the football.

11. The football of claim 1, wherein the controller actuates the light emitter to emit a first brightness of light in response to a first sensed rotation of the football and to emit a second brightness of light in response to a second sensed rotation of the football.

12. The football of claim 1, wherein the controller actuates the light emitter to emit flashes of light at a first frequency in response to a first sensed rotation of the football and to emit flashes of light at a second frequency in response to a second sensed rotation of the football.

13. The football of claim 1, further comprising a sound emitting device, wherein the controller actuates the sound emitting device based upon sensed rotation of the football.

14. The football of claim 13, wherein the controller actuates the sound emitting device to emit a first sound in response to a first sensed rotation of the football and to emit a second sound in response to a second sensed rotation of the football.

* * * * *